(12) United States Patent
Rafsky et al.

(10) Patent No.: US 9,009,336 B2
(45) Date of Patent: *Apr. 14, 2015

(54) METHOD AND SYSTEM FOR PACING, ACKING, TIMING, AND HANDICAPPING (PATH) FOR SIMULTANEOUS RECEIPT OF DOCUMENTS

(71) Applicant: Acquire Media Ventures, Inc., Roseland, NJ (US)

(72) Inventors: Lawrence C. Rafsky, Livingston, NJ (US); Robert E. Ungar, Randolph, NJ (US); Thomas B. Donchez, Bethlehem, PA (US); Lonne F. Katz, Parsippany, NJ (US); Christopher W. Lea, Brooklyn, NY (US)

(73) Assignee: Acquire Media Ventures, Inc., Roseland, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,862

(22) Filed: Oct. 15, 2014

(65) Prior Publication Data

US 2015/0032902 A1 Jan. 29, 2015

Related U.S. Application Data

(63) Continuation of application No. 14/243,143, filed on Apr. 2, 2014, now Pat. No. 8,892,765, which is a (Continued)

(51) Int. Cl.
*G06F 15/16* (2006.01)
*H04L 29/08* (2006.01)
*G06Q 10/10* (2012.01)
*G06Q 40/06* (2012.01)

(Continued)

(52) U.S. Cl.
CPC ............ *H04L 67/1097* (2013.01); *G06Q 10/10* (2013.01); *G06Q 40/06* (2013.01); *H04L 29/06095* (2013.01); *H04L 47/10* (2013.01); *H04L 47/263* (2013.01); *H04L 47/32* (2013.01); *H04L 67/06* (2013.01); *H04L 67/26* (2013.01); *G06F 17/30581* (2013.01)

(58) Field of Classification Search
CPC . H04L 29/06095; H04L 47/10; H04L 47/263; H04L 47/32
See application file for complete search history.

(56) References Cited

U.S. PATENT DOCUMENTS

| | | | | |
|---|---|---|---|---|
| 6,754,228 B1 * | 6/2004 | Ludwig | | 370/468 |
| 6,810,386 B1 * | 10/2004 | Yurino et al. | | 705/35 |
| 2009/0182886 A1 * | 7/2009 | McCartie et al. | | 709/230 |

*Primary Examiner* — Thomas Dailey
*Assistant Examiner* — Nam Tran
(74) *Attorney, Agent, or Firm* — Lowenstein Sandler LLP

(57) ABSTRACT

A computing device determines impactful content in transmittable content. The computing device assigns the impactful content in the transmittable content to one or more impactful block units. Each impactful block unit comprises a determined numbers of characters. The computing device extracts the one or more impactful block units from the transmittable content. The computing device places the one or more impactful block units at the end of the transmittable content. The computing device transmits the transmittable content to a plurality of intended recipients. Each character, or a small packet set of sequential characters, of the determined number of characters of the one or more impactful block units is transmitted using a time delay for a particular intended recipient and a pacing method. The one or more impactful block units are to be received substantially simultaneously by the plurality of intended recipients.

19 Claims, 23 Drawing Sheets

Related U.S. Application Data continuation of application No. 13/198,795, filed on Aug. 5, 2011, now Pat. No. 8,738,798.

(60) Provisional application No. 61/371,379, filed on Aug. 6, 2010, provisional application No. 61/371,412, filed on Aug. 6, 2010, provisional application No. 61/371,444, filed on Aug. 6, 2010, provisional application No. 61/371,487, filed on Aug. 6, 2010, provisional application No. 61/373,034, filed on Aug. 12, 2010, provisional application No. 61/379,961, filed on Sep. 3, 2010, provisional application No. 61/448,925, filed on Mar. 3, 2011, provisional application No. 61/479,182, filed on Apr. 26, 2011.

(51) Int. Cl.
| | |
|---|---|
| *H04L 12/825* | (2013.01) |
| *G06F 17/30* | (2006.01) |
| *H04L 29/06* | (2006.01) |
| *H04L 12/801* | (2013.01) |
| *H04L 12/823* | (2013.01) |

208   230
  \    /
<block type="NI"><?xml version="1.0"?>       216
<document>                                    /
<nitf>

<head>
<title>Met-Pro Corporation Declares Quarterly Dividend</title>
</head>

<body>

<body.head>

<hedline>
<hl1>Met-Pro Corporation Declares Quarterly Dividend</hl1>
</hedline>

<distributor>PR Newswire</distributor>

</body.head>

204  206    236      238
<body.content>
<p>HARLEYSVILLE, Pa., <chron>Dec. 4</chron> /PRNewswire-FirstCall/ -- Raymond J. De Hont, Chairman and Chief Executive Officer of <org>Met-Pro Corporation</org> (NYSE: <em>MPR</em>), announced today that the Company' s Board of Directors, at their meeting on <chron>December 3, 2008</chron>, declared a quarterly dividend of </block><block  — 232
212—type="I"><money>$0.06</money> per share</block><block type="NI"> payable on  234
242 <chron>March 12, 2009</chron> to shareholders of record at the close of business on
    <chron>February 26, 2009</chron>. This dividend represents a </block><block    218
    type="I">9.1% increase</block><block type="NI"> over the same period last year.</p>
<p></p>   214  210  244    246          240
<p>This is the thirty-fourth consecutive year that <org>Met-Pro Corporation</org> has paid either a cash or stock dividend.</p>
220 <p></p>
<p><em>About Met-Pro</em></p>
<p><org>Met-Pro Corporation</org>, with headquarters at 160 Cassell Road, Harleysville,

FIG. 3A

<location>Pennsylvania</location>, was recently recognized, for the third consecutive year, as one of America's "200 Best Small Companies" by <em>Forbes</em> magazine. The Company was also named earlier this year as one of the world's "Top Small to Midsize Manufacturers" by <em>Start-It</em> magazine for the second year in a row. Through its business units, in the <location>United States</location>, <location>Canada</location>, <location>Europe</location> and The People's Republic of <location>China</location>, a wide range of products and services are offered for industrial, commercial, municipal and residential markets worldwide. These include product recovery and pollution control technologies for purification of air and liquids; fluid handling technologies for corrosive, abrasive and high temperature liquids; Mefiag filtration technologies for harsh, corrosive liquid filtration applications; and filtration and purification technologies which include proprietary water treatment chemicals and filter products for air and liquid filtration. For more information, please visit <em><a href="http://www.met-pro.com">www.met-pro.com</a></em>.</p>
<p></p>
<p>The Private Securities Litigation Reform Act of 1995 provides a "safe harbor" for forward-looking statements. Certain information included in this news release, and other materials filed or to be filed with the <org>Securities and Exchange Commission</org> (as well as information included in oral or other written statements made or to be made by the Company), contain statements that are forward-looking. Such statements may relate to plans for future expansion, business development activities, capital spending, financing, the effects of regulation and competition, or anticipated sales or earnings results. Such information involves risks and uncertainties that could significantly affect results in the future and, accordingly, such results may differ from those expressed in any forward-looking statements made by or on behalf of the Company. These risks and uncertainties include, but are not limited to, those relating to, the cancellation or delay of purchase orders and shipments, product development activities, computer systems implementation, dependence on existing management, the continuation of effective cost and quality control measures, retention of customers, global economic and market conditions, and changes in federal or state laws.</p>
<p></p>
<p>Met-Pro common shares are traded on the <org>New York Stock Exchange</org>, symbol <em>MPR</em>.</p>
<p></p>
<p>To obtain an Annual Report or additional information on the Company, please call 215-723-6751 and ask for the <org>Investor Relations Department</org>, or visit the Company's website at <em><a href="http://www.met-pro.com">www.met-pro.com</a></em>.</p>
<p></p></block>

FIG. 3B 200 230 216

<block type="NI">Met-Pro Corporation Quarterly Dividend

PR Newswire -- December 4, 2008

234 212 204 206 236

HARLEYSVILLE, Pa., Dec. 4 /PRNewswire-FirstCall/ - Raymond J. De Hont, Chairman and Chief Executive Officer of Met-Pro Corporation (NYSE/MPR), announced today that the Company's Board of Directors, at their meeting on December 3, 2008, declared a quarterly dividend of </block><block type="I">$0.06 per share</block><block type="NI"> —238
232 — payable on March 12, 2009 to shareholders of record at the close of business on February 26, 2009. This dividend represents a </block><block type="I">9.1% increase</block><block
220 type="NI"> over the same period last year. 218
240 242 214 208 210 244 246

This is the thirty-fourth consecutive year that Met-Pro Corporation has paid either a cash or stock dividend.

About Met-Pro

Met-Pro Corporation, with headquarters at 160 Cassell Road, Harleysville, Pennsylvania, was recently recognized, for the third consecutive year, as one of America's "200 Best Small Companies" by Forbes magazine. The Company was also named earlier this year as one of the world's "Top Small to Midsize Manufacturers" by Start-It magazine for the second year in a row. Through its business units, in the United States, Canada, Europe and The People's Republic of China, a wide range of products and services are offered for industrial, commercial, municipal and residential markets worldwide. These include product recovery and pollution control technologies for purification of air and liquids; fluid handling technologies for corrosive, abrasive and high temperature liquids; Mefiag filtration technologies for harsh, corrosive liquid filtration applications; and filtration and purification technologies which include proprietary water treatment chemicals and filter products for air and liquid filtration. For more information, please visit www.met-pro.com.

The Private Securities Litigation Reform Act of 1995 provides a "safe harbor" for forward-looking statements. Certain information included in this news release, and other materials filed or to be filed with the Securities and Exchange Commission (as well as information included in oral or other written statements made or to be made by the Company), contain statements that are

FIG. 3C forward-looking. Such statements may relate to plans for future expansion, business development activities, capital spending, financing, the effects of regulation and competition, or anticipated sales or earnings results. Such information involves risks and uncertainties that could significantly affect results in the future and, accordingly, such results may differ from those expressed in any forward-looking statements made by or on behalf of the Company. These risks and uncertainties include, but are not limited to, those relating to, the cancellation or delay of purchase orders and shipments, product development activities, computer systems implementation, dependence on existing management, the continuation of effective cost and quality control measures, retention of customers, global economic and market conditions, and changes in federal or state laws.

Met-Pro common shares are traded on the New York Stock Exchange, symbol MPR.
To obtain an Annual Report or additional information on the Company, please call 215-723-6751 and ask for the Investor Relations Department, or visit the Company's website at www.metpro.com.

Contact: Investor Contact:
    Gary J. Morgan,
    Senior Vice President of Finance, CFO
    215-723-6751, gmorgan@met-pro.com Joseph Hassett, VP
    Gregory FCA Communications
    610-228-2110

SOURCE Met-Pro Corporation

Subject Codes: PT/lang.en, IN/BIO, IN/CHM, IN/CPR, IN/ENV, IN/FIN,
       SU/DIV, RE/Pennsylvania, PC/contact, PC/website Company Codes: NYSE:MPR</Block> ~248

FIG. 3D

Plain Text Format

Company A earnings statement.
Company A reported earnings of 354 million dollars for fiscal year 2010.
Analysts had been looking for earnings of 389 million to 406 million dollars for fiscal year 2010, but actual results were disappointing.
Decreasing earnings was the result of their sales numbers.

FIG. 5A

HTML Format

```
<html><body>
<h1>Company A Earnings statement</h1>
<p>Company A reported earnings of 354 million dollars for fiscal year 2010. </p>
<p>Analysts had been looking for earnings of 389 million to 406 million dollars for fiscal year 2010, but actual results were disappointing.</p>
<p>Decreasing earnings was the result of their sales numbers.</p>
</body></html>
```

FIG. 5B

1- Demarcated Text

<block type="NI">Met-Pro Corporation Quarterly Dividend

PR Newswire -- December 4, 2008

HARLEYSVILLE, Pa., Dec. 4 /PRNewswire-FirstCall/ -- Raymond J. De Hont, Chairman and Chief Executive Officer of Met-Pro Corporation (NYSE:MPR), announced today that the Company's Board of Directors, at their meeting on December 3, 2008, declared a quarterly dividend of </block><block type="I">$0.06 per share</block><block type="NI"> payable on March 12, 2009 to shareholders of record at the close of business on February 26, 2009. This dividend represents a </block><block type="I">9.1% increase</block><block type="NI"> over the same period last year.

This is the thirty-fourth consecutive year that Met-Pro Corporation has paid either a cash or stock dividend.</Block>

FIG. 7A

Document x1

```
<block type="Nl">Company A earnings statement.
Company A reported earnings of </block><block type="I">354 million
dollars</block><block type="Nl"> for fiscal year 2010.
Analysts had been looking for earnings of </block><block type="ISub">389 million
to 406 m</block><block type="ISub">illon dollars</block><block type="Nl">for
fiscal year 2010, but actual results were </block><block type="I">disappointing.
Decreasing</block><block type="Nl"> earnings was the result of their sales
numbers.</block>
```

FIG. 9A

Document x2

```
<block type="Nl"><html><body>
<h1>Company A Earnings statement</h1>
<p>Company A reported earnings of </block><block type="I">354 million
dollars</block><block type="Nl"> for fiscal year 2010.</p>
<p>Analysts had been looking for earnings of </block><block type="ISub">389 million
to 406 m</block><block type="ISub">illon dollars</block><block type="Nl"> for
fiscal year 2010, but actual results were </block><block type="I">disappointing.
Decreasing</block><block type="Nl"> earnings was the result of their
sales numbers.</p>
</body></html></block>
```

FIG. 9B

Document x1

Block 1
<block type="Nl">Company A earnings statement.
Company A reported earnings of </block>
Block 2
<block type="I">354 million dollars</block>
Block 3
<block type="Nl"> for fiscal year 2010.
Analysts had been looking for earnings of </block>
Block 4
<block type="ISub">389 million to 406 m</block>
Block 5
<block type="ISub">illion dollars</block>
Block 6
<block type="Nl"> for fiscal year 2010,
but actual results were </block>
Block 7
<block type="I">disappointing.
Decreasing</block>
Block 8
<block type="Nl"> earnings was the result
of their sales numbers.</block>

FIG. 10A

Document x2

Block 1
<block type="Nl"><html><body>
<h1>Company A Earnings statement</h1>
<p>Company A reported earnings of </block>
Block 2
<block type="I">354 million dollars</block>
Block 3
<block type="Nl"> for fiscal year 2010.</p>
<p>Analysts had been looking for earnings of </block>
Block 4
<block type="ISub">389 million to 406 m</block>
Block 5
<block type="ISub">illion dollars</block>
Block 6
<block type="Nl"> for fiscal year 2010,
but actual results were </block>
Block 7
<block type="I">disappointing.</p>
<p>Decreasing</block>
Block 8
<block type="Nl"> earnings was the result of
their sales numbers.</p>
</body></html></block>

FIG. 10B

Document x1
Non-Impactful Content Block 1
Company A earnings statement.
Company A reported earnings of
Impactful Content Block 2
354 million dollars
Non-Impactful Content Block 3
for fiscal year 2010.
Analysts had been looking for earnings of
Impactful Content Block 4
389 million to 406 m
Impactful Content Block 5
illion dollars
Non-Impactful Content Block 6
for fiscal year 2010, but actual results were
Impactful Content Block 7
disappointing.
Decreasing
Non-Impactful Content Block 8
earnings was the result of their sales numbers.

FIG. 11A

Document x2
Non-Impactful Content Block 1
<html><body>
<h1>Company A Earnings statement</h1>
<p>Company A reported earnings of
Impactful Content Block 2
354 million dollars
Non-Impactful Content Block 3
for fiscal year 2010.</p>
<p>Analysts had been looking for earnings of
Impactful Content Block 4
389 million to 406 m
Impactful Content Block 5
illion dollars
Non-Impactful Content Block 6
for fiscal year 2010, but actual results were
Impactful Content Block 7
disappointing. </p>
<p>Decreasing
Non-Impactful Content Block 8
earnings was the result of their sales numbers.</p>
</body></html>

FIG. 11B

**Welcome *Trader's Name*:**

To enter an Action Markup, please fill out the information below:
⎿ 1405

| Company: | | (e.g., IBM, GOOG, MSFT) |
|---|---|---|
| Type of Element : ⎿1410 | ○ current_earnings<br>○ sales_figures | |
| Condition : ⎿1415 | ○ equal to<br>○ less than<br>○ less than or equal to<br>○ greater than<br>○ greater than or equal to | |
| Target Value : | ⎿1420 | (e.g., 1,200,000, 1.2 million) |
| Action : ⎿1425 | ○ Buy<br>○ Sell<br>○ Hold<br>○ Research<br>○ Other: | ⎿1430 |

METHOD AND SYSTEM FOR PACING, ACKING, TIMING, AND HANDICAPPING (PATH) FOR SIMULTANEOUS RECEIPT OF DOCUMENTS

CROSS-REFERENCES TO RELATED APPLICATIONS

This application is a continuation of U.S. patent application Ser. No. 14/243,143, filed Apr. 2, 2014, which is a continuation of U.S. patent application Ser. No. 13/198,795, filed Aug. 5, 2011, now U.S. Pat. No. 8,738,798, which claims the benefit of U.S. provisional patent applications Nos. 61/371,379, filed Aug. 6, 2010, 61/371,412, filed Aug. 6, 2010, 61/371,444, filed Aug. 6, 2010, 61/371,487, filed Aug. 6, 2010, 61/373,034, filed Aug. 12, 2010, 61/379,961, filed Sep. 3, 2010, 61/448,925, filed Mar. 3, 2011, and 61/479,182, filed Apr. 26, 2011, the disclosures of which are incorporated herein by reference in their entirety.

FIELD OF THE INVENTION

The present invention relates generally to a method and system for an information distribution service. More specifically, the present invention relates to providing simultaneous receipt of impactful information by a plurality of recipients over either a "push" or a "pull" network of multiple servers.

BACKGROUND OF THE INVENTION

Many businesses, particularly financial institutions, are dependent upon timely reception of information from government agencies (e.g., unemployment statistics) and from press release services reporting information and announcements concerning publicly traded companies (e.g., earnings reports, merger offers and possibilities, etc.). In many instances involving the distribution of material or sensitive information (e.g., information that may have an impact on the economy, markets, or a company's financial outlook/status), if one intended recipient receives the disclosed information even a relatively short time before another, then the one recipient may gain an unfair advantage (e.g., a financial advantage) over the other intended recipient(s) of the information. In such cases, information distribution services may desire or be required to guarantee "simultaneous disclosure" of the information (e.g., a press release or other form of communication) to all or a subset of the intended recipients.

"Simultaneous disclosure" as used herein includes the distribution of information in a 'bias free' manner (i.e., distribution which "plays no favorites") and wherein the disclosed information is received by all of the intended recipients within a 'tight time tolerance' (i.e., the intended recipients receive the information at substantially the same time within a small acceptable tolerance which may be predetermined based on the nature of the underlying information). The term "simultaneous disclosure" is not strictly limited to distribution of press releases, but may apply to any sensitive and actionable content, or any content announcing availability of limited resources, such as an announcement of an organization accepting applications for a job opening in which it is expected there will be many more applicants than available job openings, or an announcement of ticket availability for an event which is likely to be oversubscribed. Other applications include distributing general information in which the time allowed to prepare a response is limited (e.g. RFP's for competitive contracts) or announcing that the time to perform a particular action has commenced, and that actions will be judged or rewarded on a "first-come, first-serve" basis.

In August of 2000, the Securities and Exchange Commission (SEC) promulgated Regulation Fair Disclosure (herein referred to as "Reg. FD") designed to prevent selective disclosure by public companies to market professionals and certain shareholders. To effectuate this purpose, Reg. FD requires "[w]henever an issuer . . . discloses any material nonpublic information regarding that issuer or its securities . . . the issuer shall make public disclosure of that information . . . simultaneously, in the case of an intentional disclosure." In this regard, Reg. FD is often referred to as the "simultaneous disclosure" rule.

Conventional methods and systems have been developed in order to achieve 'simultaneous disclosure' as required by Reg. FD or otherwise. For example, the release of government statistics, such as unemployment data, the U.S. government instituted a technique referred to as the "lock up" approach, wherein individuals with press credentials were brought into a "lock up room", presented with the information to be released, and given access to terminals (e.g., laptop computers) that each could be used to transmit the information at a specific time but with the transmission capability temporarily deactivated. Then, at the specific time of release (e.g., exactly 8:30 AM EST), a central switch controlling all terminals is then used to activate the transmission capability of each terminal all at once, permitting the information to be transmitted from each terminal to the journalists' offices, presumably at the same time. However, this approach has the drawback that not all computer equipment for transmitting the information has the same engineering such that the information is actually transmitted at the same time. Moreover, this approach requires an increase in expensive equipment and room for the system as the number of individuals increases.

Another conventional method for providing "simultaneous disclosure" is via satellite communication. Satellite transmission of information or data has the advantage of being at such a high altitude that bits appear to "rain down" so that anyone who wishes to receive satellite data receives it essentially at the same time. For this reason, the business community largely adopted this form of communication by the mid-1970s. For example, the PR (press release) wire services began using satellites to build full domestic networks in the United States capable of sending financial information quickly to media outlets all over the country. As the PR wire services became the accepted and trusted information disseminator for corporations, the PR wire services took on the additional role as the official provider of "disclosure" for public corporations.

Demand for corporate information continues to grow as news and investment firms compete for the public's attention. Therefore, the role of the PR wire services expanded to provide fast, electronic, and 'simultaneous' disclosure of certain disclosures and press release information. Satellite technology emerged as the primary method for simultaneously broadcasting the news and other information to the various media, investment, and research communities.

However, significant problems with using satellite technology for this purpose also emerged. Because satellite transmissions to normal recipients lacking high-powered uplinks are one-way broadcasts, there is no means to confirm that a transmission was successful. Therefore, wire service transmissions are sent out "blind," having no verification message coming back from the media point to validate receipt of a communication. Several methods have been employed to try to overcome this lack of two-way communications, and therefore lack of an acknowledgement back channel (e.g., Forward Error Control, a separate terrestrial line for the acknowledgement channel), but all such methods lead to inefficiencies and higher costs of communication.

There were other cost considerations with regards to satellites. For many years, satellite distribution was lower in cost than terrestrial lines. However, with the increasing presence of mobile devices, demand for satellite bandwidth (because it is wireless and a good match for mobile applications) increased to the point that users have been forced to pay a large premium to use satellites. Therefore, transmission and reception of time-sensitive information having disclosure requirements has become increasingly and prohibitively expensive over satellites.

Introduction of the public Internet in the mid-1990's provided a new communications medium for the dissemination of news to the media community. As the Internet matured in the late 1990's, certain advantages over satellite technology became apparent, such as cheaper installation, widespread availability, high-speed, and full-duplex, two-way communication. Accordingly, Internet technology became the preferred alternative due to its faster, cheaper, global-reaching, and bi-directional characteristics.

However, the Internet has a major flaw that prohibits it from being accepted "as-is" as a viable communication vehicle for the dissemination of time-sensitive or Reg. FD-compliant information. The Internet's multi-point packet forwarded architecture does not ensure that information will reach multiple destinations/recipients in a fair and simultaneous fashion. As such, there was a need for the ability to provide near simultaneous delivery of information over any packet routed network, the public Internet in particular.

Existing protocols for simultaneous disclosure of electronic documents—described both in the open literature and in existing U.S. patents, such as, for example, U.S. Pat. No. 7,069,245 (hereinafter, the '245 patent), which is incorporated herein by reference in its entirety—rely on encryption and essentially flow from the fundamental work on time-lock cryptography first announced on USENET by Timothy May in 1994. These techniques use a form of "lock up," (i.e., an exact digital analog to the aforementioned physical "lock up" used to guarantee simultaneous disclosure of U.S. government data). According to this approach, the entire compilation of information (e.g., the electronic document) is transmitted to all recipients in an encrypted form. The entire encrypted text is received by each recipient and stored on each recipient's local computer in advance of a pre-set release time, for example 10 A.M. EST. Next, at precisely the pre-set time (i.e., 10 A.M. EST in this example), the decryption ("un-lock") key is sent to each recipient. Since decryption keys are small enough to fit in a single packet, transmission of the key alone requires very little bandwidth. As such, any difference in arrival times due to Internet transmission speed and quality are assumed to be negligible, since those differences do not accumulate over multiple packets, as they would if an entire electronic document were transmitted.

Unfortunately, such encryption techniques fail the bias-free test, and the difference in arrival time is not truly negligible, since the owner of the fastest Internet connection always receives the key first. Furthermore, with encryption-based methods, a security break in the encryption used to safeguard the disclosed information results in the premature release of the information. It also appears that the encryption techniques used for simultaneous disclosure also suffer in theory from an additional serious flaw in that they use a single key for all the electronic documents (e.g., press releases) that are released in a given minute, and send the "key-for-that-minute" once, in one packet. This approach exposes such techniques to a "known plaintext attack." In a "known plaintext attack," the perpetrator "Blackhat" conspires with a number of companies to send out press releases scheduled for release in the same minute as the release Blackhat wishes to break. This guarantees that Blackhat will have access to plaintext/cipher-text pairs of messages all encrypted with the same key that Blackhat wishes to discover, in advance of the release minute. Powerful techniques exist to help Blackhat find the key given this type of data, which is usually not, and should not, be available.

A system which implements simultaneous reception of impactful information for a plurality of documents by a set of intended recipients may be implemented via a "push" network. As used herein, a "push" network presents information to a user without the user requesting the information.

Push networks implement "push services." A push service copies and distributes, to a plurality of user terminals, a packet sent by an information providing process, wherein the information providing process may transfer packets at a regular interval or at a prescribed time without knowing the state of the individual user terminals. Users can operate their user terminals whenever they wish and may extract the information that has been distributed. Since a push network is defined in advance, if it were built on top of fixed, dedicated lines, then the "equality of network connection speed" could be controlled or at least catered for. But if the push network is layered "virtually" on top of the public Internet, then the speed and latency of the network connection to each would-be recipient cannot be controlled.

Alternatively, a system which implements simultaneous reception of impactful information for a set of documents by a plurality of intended recipients may be implemented via a "pull" network. As used herein, a "pull" network presents information to a user after the user requests the information. In effect, the network is "polled" by the user. Typically the user may have an account with the system with a login and password. After the user logs in, the user makes a request for the information and expects to receive the information either immediately or at a specified time.

An example of a pull network may include a user computer connected to the public Internet, wherein the user makes a request for content from their Web browser which forwards the request over the Internet to a Web server via the Hypertext Transfer Protocol (HTTP). Simple Web servers handle requests sequentially, i.e., requests are received in a certain non-predetermined order, and then content is processed and sent to the recipients in the same order. Many modern Web servers use threads to process at least some of the requests that arrive approximately at the same time substantially simultaneously, but the time of delivery may vary based on connection speed, the server load, and the random order of the request arrivals, even if the requests are initiated by users at the same time.

When a press release is to be released via a Web server, by displaying it on a Web page, at a known time, thousands or even tens of thousands of users may use their Web browsers to request the document at the same time. A user with access to many computers or Web browsers may send many multiple requests, which would increase to near certainty the likelihood that at least one of that user's requests will be in a higher percentile of the requests to be processed first. This common practice gives motivated users an advantage over others with regard to access to content, thereby violating "Reg. FD". In fact, motivated users could write or employ off-the-shelf automated software to create multiple robotic "users", and deploy an entire army of robots to request the Web page.

While there are Web server mechanisms to prevent access from robots, these mechanisms might make simultaneous disclosure worse by requiring further human interaction, thereby leading to even further lack of access-time consistency across all of the users. Worse, turning back an army of robots does nothing to defeat an army of real human users who are colluding to access the Web page before other users. Well-financed organizations could employ "crowd sourcing", marshalling thousands of individuals, potentially across many countries, to request the Web page. If an organization coordinates 1,000 users requesting the Web page at the moment it is available, the odds are significantly increased that the organization obtains one copy of the Web page before other users, and therefore the information that is supposed to be simultaneously disclosed is received before many of the other users. Furthermore, users with fast Internet connections may receive a document faster than those with slower connections, even if the slower connection is processed first by a Web server.

In the same manner, documents requested via the File Transfer Protocol (FTP) and other document transfer protocols have the same shortcomings and are likely to violate of "Reg. FD" under circumstances similar to Web servers employing HTTP.

Accordingly, what would be desirable, but has not yet been provided, is a method and system configured to facilitate and confirm simultaneous receipt of certain sensitive information (i.e., electronic documents) by a plurality of intended recipients transmitted via a Web server over a "push" and/or a "pull" network, such as the Internet.

Financial traders and analysts may scan a press release for a single statement, such as a current earnings statement, and take an action based on a numeric value or other statement contained in the earnings statement. This value may be compared to an expected target value. This comparison effectively creates a condition upon which the trader or analyst takes a particular action. This action is usually related to the stock market, such as buying or selling a stock, but may include other actions such as calling someone on the telephone or making a notation of the company name for future research.

As used herein, an "action markup" is defined as placement of action message(s) (e.g., buy/sell/hold) directly into a document for a recipient to act upon. The inclusion of an action message(s) is intended to reduce the reaction time of a recipient needed to perform a certain task. Action markup is not strictly limited to the insertion of simple action messages, but may include computer implemented calculations and/or decision making to produce action(s) based on one or more user settable conditions.

It would be desirable for a recipient to simply receive the value of interest, or better, for the recipient to receive a specific instruction at press release time. Unfortunately, current instruction delivery methods known in the art do not comply with "Reg. FD." For instance, if one recipient receives an entire earnings release, and a second recipient receives only an instruction, such as the word "sell," the first recipient may need to wait for the entire earnings release to download, and is therefore at a severe disadvantage. The time it takes the first recipient to download the entire earnings release and scan for the value of interest before making a decision permits the second recipient to have a greater opportunity to take an action before the first recipient.

A variation of the concept of "action markup" is "editorial markup." An "editorial markup" is similar to an "action markup" wherein, instead of receiving an instruction to take an action, the recipient may receive editorial information/ messages, such as an editor's opinion or facts about the impactful content, including insight into other relevant information. Herein we refer to either "action markup" or "editorial markup" as "trader markup".

What would be desirable, but has not yet been provided, is a method for providing trader markup within documents to be disclosed substantially simultaneously according to Reg FD.

What would also be desirable, but has not yet been provided, is a method and system configured to facilitate and confirm simultaneous receipt of certain sensitive information (i.e., electronic documents) by a plurality of intended recipients transmitted via a Web server over a "push" and/or a "pull" network, wherein the documents transmitted are in binary (non-ascii) formats.

Web servers may host Web pages with press release content as part of "Notify and Access." As used herein, Notify and Access refers to the practice of employing a press release service to transmit to Web browsers associated with press release subscribers a URL or hyperlink that links to press release content, rather than transmitting the entire press release content over the press release service to the press release subscribers. Notify and Access notifies the press release subscribers that a press release is available on a Web page of a remote Web server, and through the press release, subscribers may then access the Web page and the press release through their Web browser.

A deficiency of currently employed Notify and Access services is that a Web server displaying a Web page with a press release may be unaware of when a notification has been sent to recipients, and consequently the Web server may make the Web page available before the notification is sent over the press release service. In such circumstances, automated Web crawling software or manual Web browser requests may be employed to view the Web page unfairly before press release subscribers have been notified that the press release (document) is available.

As a result, what would also be desirable, but has not yet been provided, is a method and system configured to facilitate and confirm simultaneous receipt of certain sensitive information (i.e., electronic documents) by a plurality of intended recipients transmitted via a Web server, or multiple Web servers in a Web server farm, over a "push" and/or a "pull" network, wherein the Web server posts the sensitive information (e.g., a press release) on at least one Web pages substantially simultaneously and wherein intended recipients substantially simultaneously receive a notification that the at least one Web page is available for viewing.

SUMMARY OF THE INVENTION

The above-described problems are addressed and a technical solution achieved in the art by providing a method for facilitating substantially simultaneous receipt of content included in at least one document by a plurality of intended recipients, comprising the steps of: delimiting at least one portion of impactful content in the document to define at least one impactful block (IBlock); delimiting a remaining portion of content to define at least one non-impactful block (NIBlock); inserting at least one action markup following the at least one IBlock; transmitting the at least one IBlock to each of the plurality of intended recipients; transmitting the action markup to at least one intended recipient; wherein the at least one IBlock is received substantially simultaneously by the plurality of intended recipients. The method may further comprise the step of synchronizing connections for each of the intended recipients following the at least one IBlock and the at least one NIBlock. The action markup may be transmitted to the at least one intended recipient while other intended recipients wait.

According to an embodiment of the present invention, the at least one IBlock comprises at least one IBlock unit, and wherein the step of transmitting the at least one IBlock includes the step of transmitting the at least one IBlock unit. The method may further comprise the steps of: receiving at least one acknowledgement packet after a round trip time (RTT); and calculating a handicap time for the at least one IBlock unit based on the RTT; wherein the at least one IBlock unit is transmitted after a delay equal to the corresponding handicap time of an intended recipient in order from a smallest handicap time to a largest handicap time. A handicap time may be set to a longest transmission time of about ½ of a longest RTT of an IBlock unit from among all of the intended recipients with a transmission time of an IBlock unit for a particular intended recipient subtracted.

According to an embodiment of the present invention, the at least one action markup may include an element identifier, a condition, and a message. The element identifier is a name corresponding to an impactful data element indicative of at least one of the type of impactful data element and a number reference. The condition includes a target value and a comparison, wherein target value is acted upon by the comparison.

According to an embodiment of the present invention, the method may further comprise the step of transmitting a message to the at least one of the intended recipients when the condition is met. The message may be communicated to the at least one intended recipient by at least one of a pop-up notification message, a changing of visual effects, and manipulating another program via an Application Programming Interface (API). The at least one document may include multiple types of action markups. The multiple types of action markups may correspond to one impactful data element. The at least one IBlock may include combinations of conditions and messages. XML-style tags may be inserted about the action markup.

According to an embodiment of the present invention, the method may further comprise the step of pacing the transmission of at least one IBlock unit. The step of pacing may further comprise the step of transmitting the at least one IBlock unit in a pacing time period. The pacing time period is equal to a reciprocal of a longest total transmission time taken for each intended recipient to receive all of IBlock units divided by each recipient's number of IBlock units. The handicap time period and/or the pacing time period may be averaged or exponentially smoothed between sending of subsequent IBlock units.

According to an embodiment of the present invention, impactful content refers to any portion of the content included in an electronic information document that impacts a likelihood that an individual takes some form of a financial-related action. Impactful content includes at least one impactful data element. An impactful data element includes at least one of a key word, a character, a marker, a name, and a symbol. An impactful data element may be identified by employing a pattern matching method. The pattern matching method may include a regular expression matching method.

According to an embodiment of the present invention, a document may comprise two documents that have different formats. The least one IBlock for the two documents may have different lengths.

According to an embodiment of the present invention, the delimiting steps may further comprise the steps of: (a) inserting a tag indicating a start of an NIBlock at the beginning of a document and a tag indicating an end of an NIBlock at the end of the document, (b) scanning content until at least one impactful data element is found using a pattern matching method, wherein the pattern matching method returns at least a starting point index of a match to impactful content and a length of the impactful content, (c) inserting a tag indicating the end of a NIBlock and a tag indicating the start of an IBlock adjacent to the returned starting point index of impactful content, (d) calculating an end position of the at least one IBlock based on the start point index and the length of the impactful content, (e) inserting a tag indicating an end of an IBlock and a tag indicating a beginning of an NIBlock adjacent to the calculated end position of the at least one IBlock, and (f) repeating steps (b)-(e) until the end of the document is reached. The delimiting steps may further comprise the step of re-scanning the document and combining an IBlock and an adjacent NIBlock into a larger single IBlock if the total length of the adjacent NIBlock is below a predetermined length. The delimiting steps may further comprise the step of dividing an IBlock into at least two ISubBlocks if a length of the IBlock is larger than a predetermined length.

According to an embodiment of the present invention, alternatively, the delimiting steps may further comprise the step of: applying a match and replace method to a document to produce matched impactful content, wherein matched impactful content is replaced by the matched impactful content preceded and followed by a tagged string.

According to an embodiment of the present invention, the method may further comprise the step of: receiving at least one request from each of the plurality of intended recipients for a document during a predetermined period of time; and wherein the at least one IBlock unit is transmitted to each of the intended recipients after the predetermined period of time.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which:

FIGS. 3A and 3B show an exemplary press release in HTML format including inserted "semantic equivalent blocks" (SEB), in accordance with an embodiment of the present invention;

FIGS. 3C and 3D show the exemplary press release of 3A and 3B in plain text format including inserted "semantic equivalent blocks" (SEB), in accordance with an "SEB method" of the present invention;

FIGS. 5A and 5B shows two versions of an electronic information document relating to the same substantive information in plaintext format and HTML format, respectively, which have not yet been parsed, according to the marking method of the present invention;

Figure 7B:
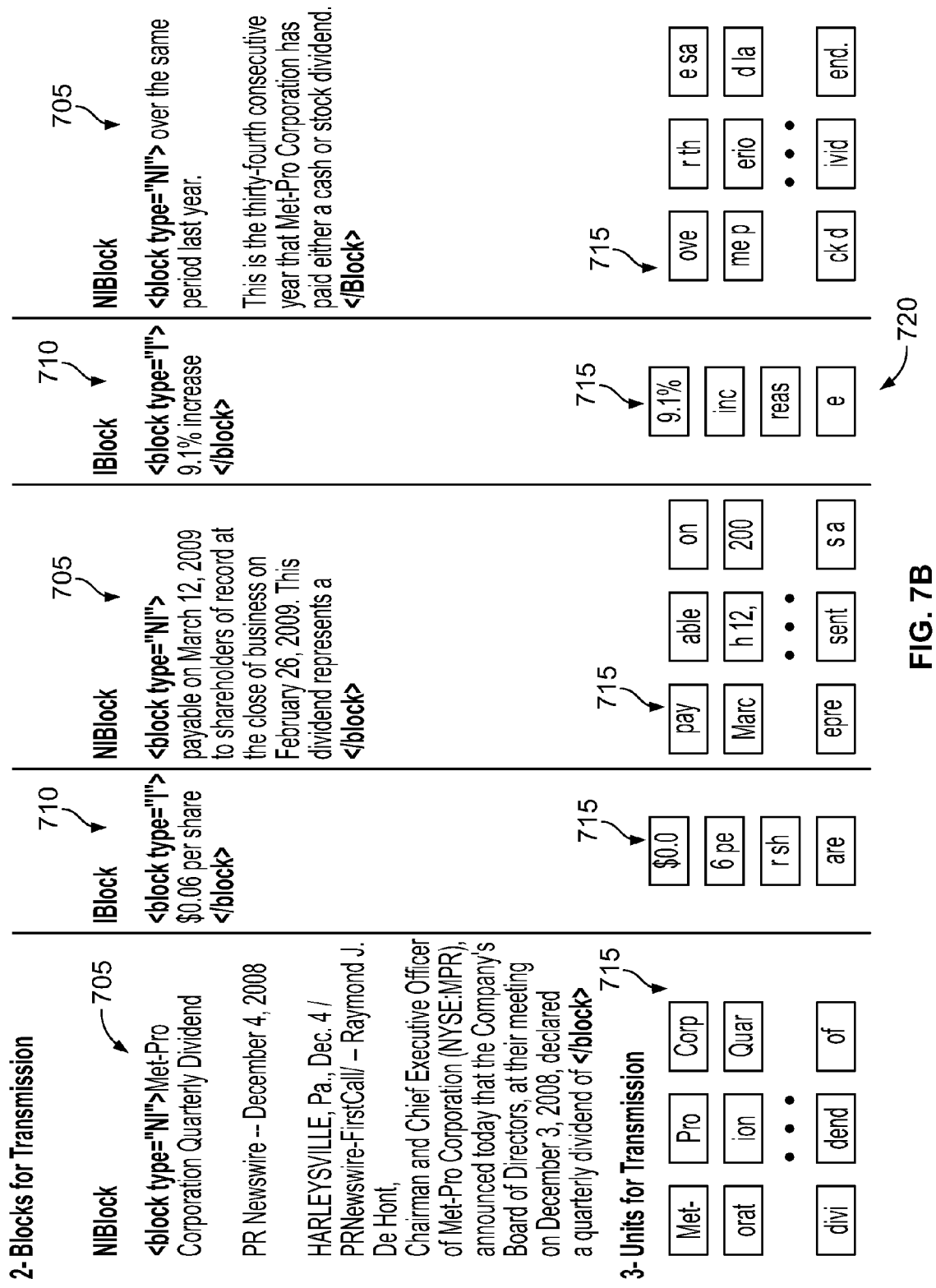
Figure 8A:
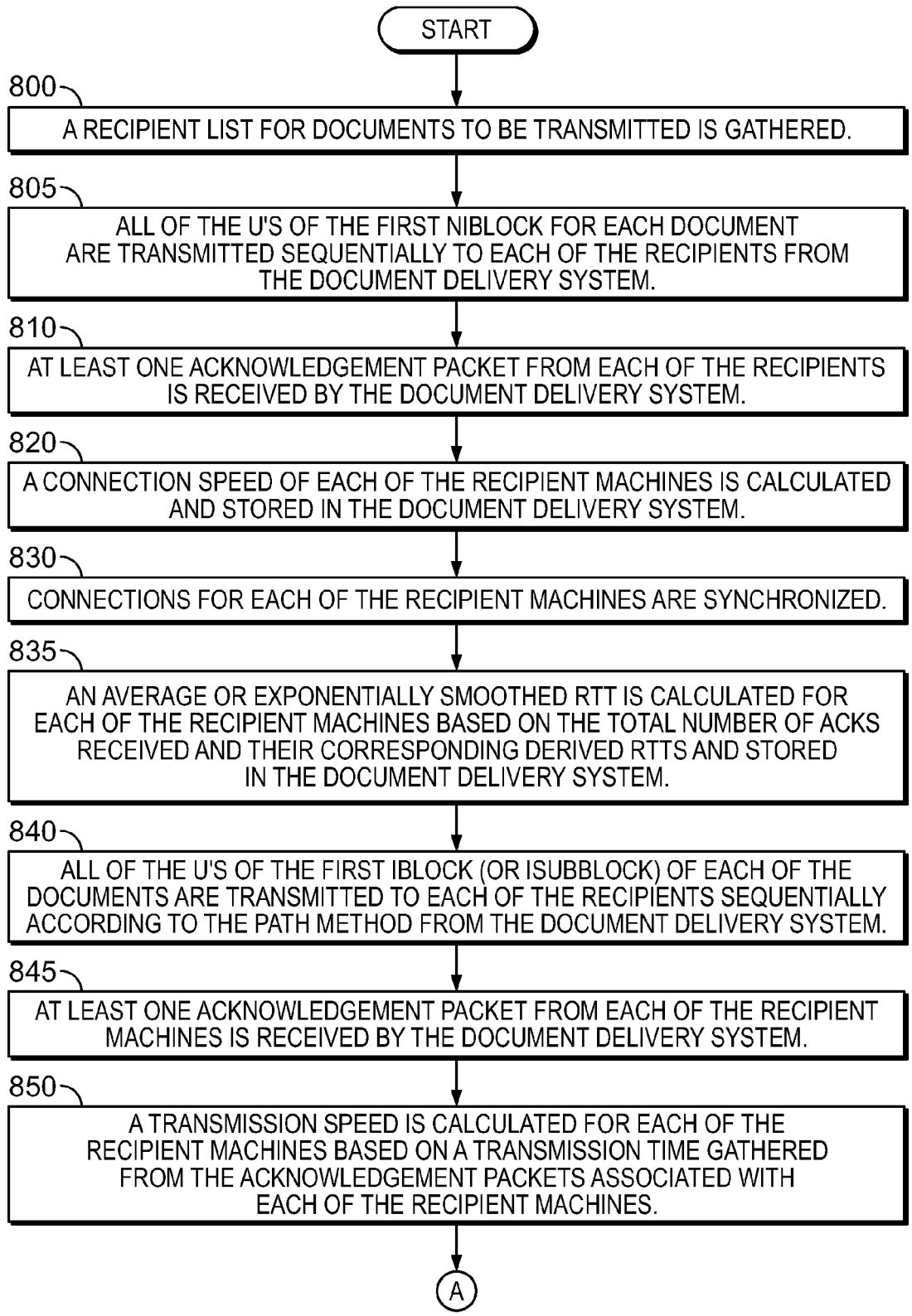
Figure 8B:
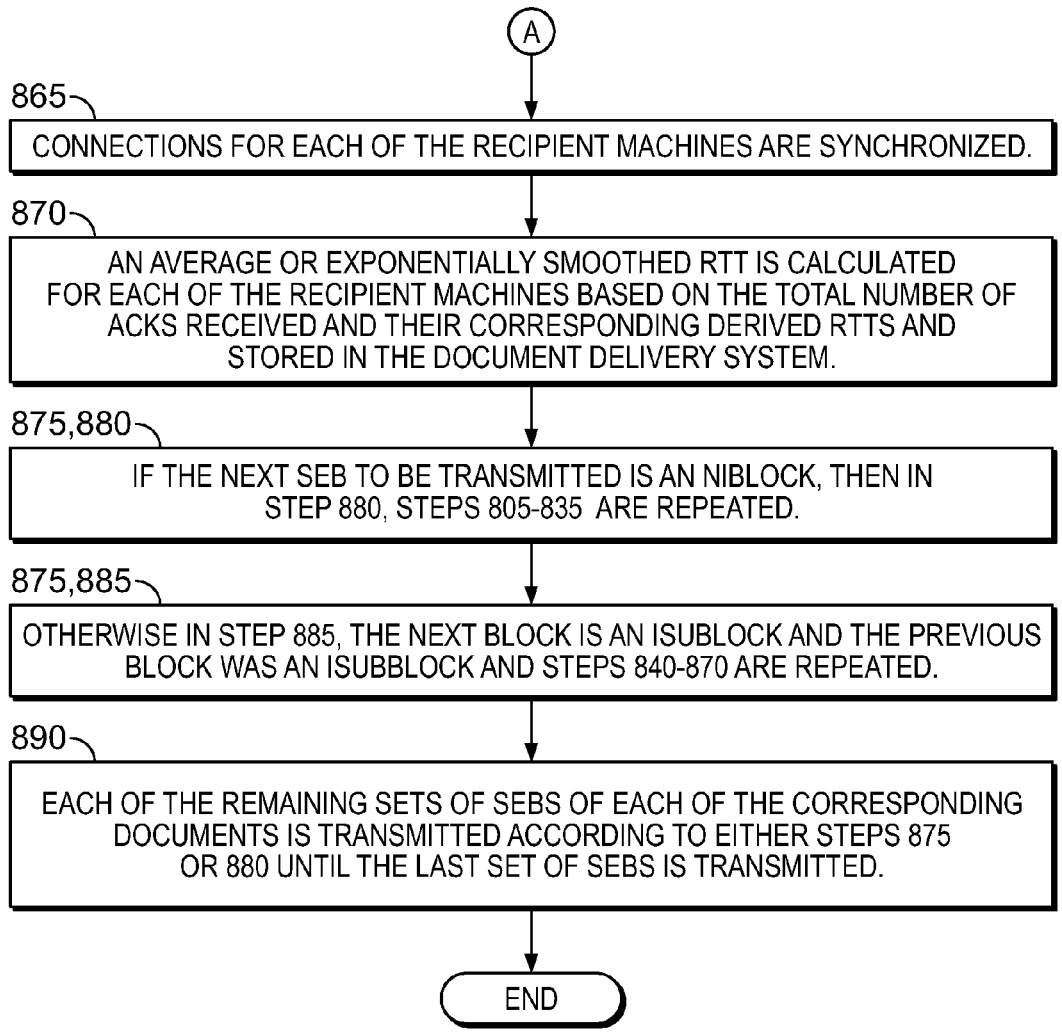
Figure 12:
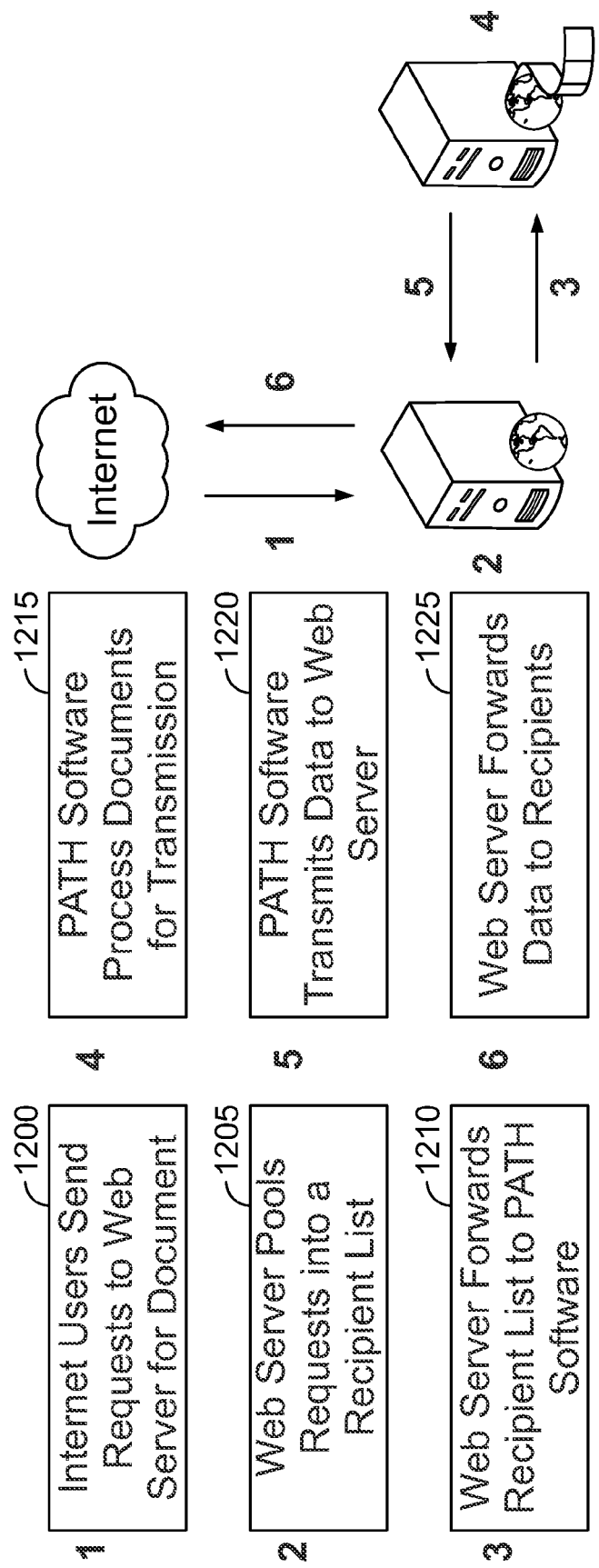
Figure 13:
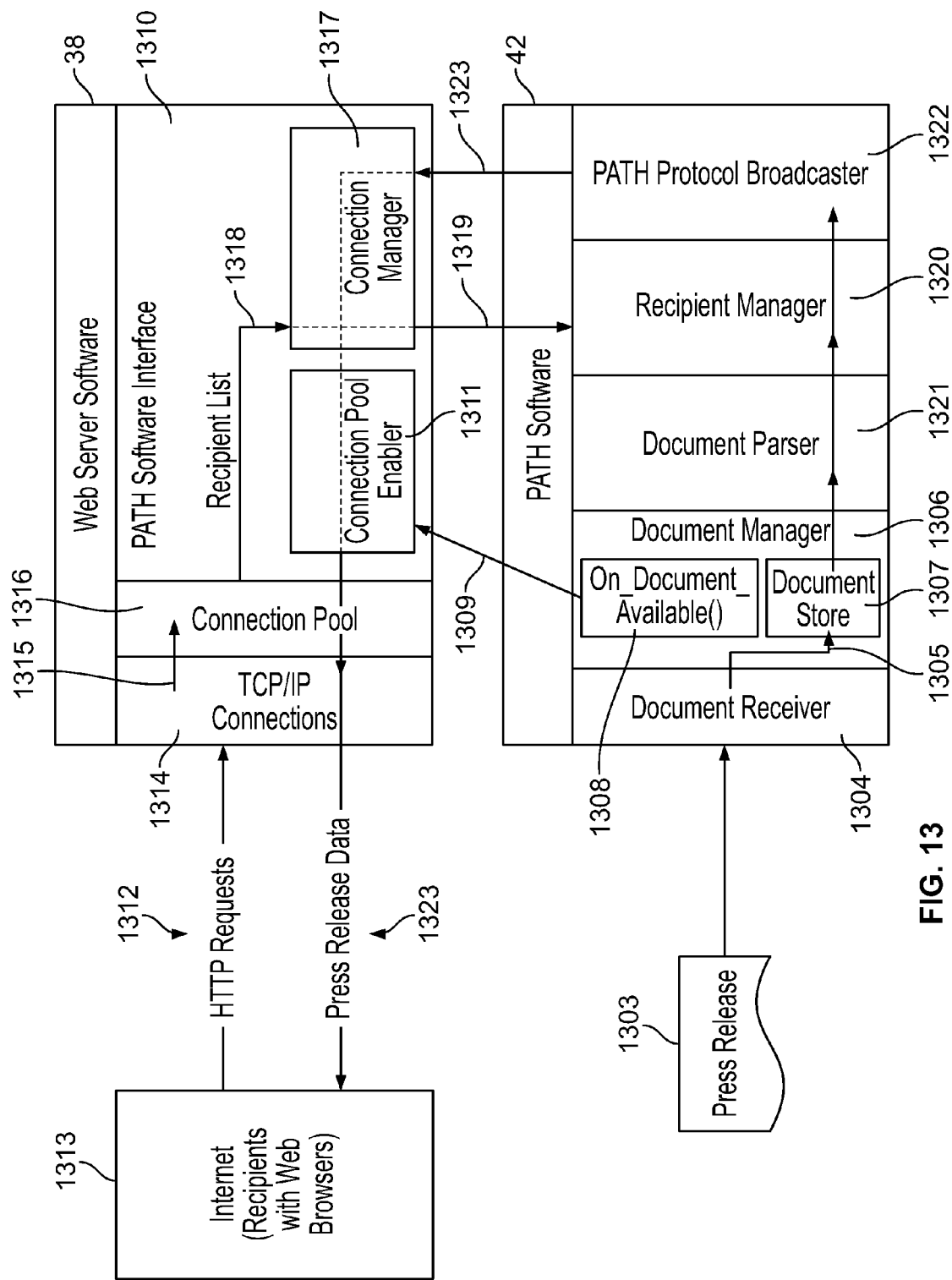

NIBlock in greater detail, with emphasis on how counters and indices are calculated and employed to combine IBlocks, according to an embodiment of the present invention;

FIGS. 7A and 7B show the content of the plaintext document of FIGS. 3C and 3D as a complete marked document divided into individual NIBlocks and IBlocks and further divided into individual U's, according to an embodiment of the present invention;

FIGS. 8A and 8B show a process flow illustrating exemplary steps for implementing a "document transmission" stage as it relates to the transmission of a first document and a second document, according to an embodiment of the present invention;

FIGS. 9A and 9B show documents x1 and x2, respectively, of the example described above in FIGS. 5A and 5B, respectively, wherein a pacing, ACK'ing, timing, and handicapping (PATH) method has been applied to documents x1 and x2, according to an embodiment of the present invention;

FIGS. 10A and 10B show documents x1 and x2 divided into a plurality of SEB blocks after the document "marking stage" described in the above example has been applied, according to an embodiment of the present invention;

FIGS. 11A and 11B show the SEB blocks of FIGS. 10A and 10B, respectively, designated as impactful and non-impactful blocks, according to the document "marking stage" of the present invention;

FIG. 12 show a simplified process flow illustrating exemplary steps for implementing a "SEB method" as it relates to the transmission of at least one document in a plurality of formats for a corresponding plurality of recipients for a "pull network," according to an embodiment of the present invention;

FIG. 13 is a process flow illustrating the exemplary steps of FIG. 12 in greater detail, with emphasis on the flow of data between the Web server software modules and the PATH server software module, according to an embodiment of the present invention;

FIG. 14 is an exemplary Web page version of a "trader interface" for entering action markup information, according to an embodiment of the present invention; and FIGS. 15A-15D include binary data of two GIF binary images to be transmitted using the PATH protocol, one with all black content, and one with black and red content, respectively, according to an embodiment of the present invention.

It is to be understood that the attached drawings are for purposes of illustrating the concepts of the invention and may not be to scale.

DETAILED DESCRIPTION OF THE INVENTION

Modern fast multi-processor computers, fast multiple Network Interface Cards (NICs), and the low-latency of the current U.S. public Internet render satellite and encryption techniques unnecessary, as more straight-forward approaches based on timing are available for problems of realistic size. A method for "simultaneous disclosure" of press releases/documents over the Internet which (1) "plays no favorites" and (2) gets a document to every customer at the same time "for all legal, regulatory, financial, and other practical purposes."

Systems and methods according to exemplary embodiments of the present invention utilize timing-based methodologies to achieve substantially simultaneous disclosure/reception of impactful information in documents at a plurality of recipient machines. As used herein, substantially simultaneous means receipt of impactful information within a document at a recipient machine within an acceptable time tolerance. An acceptable time tolerance is within 100 milliseconds, preferably less than 10 milliseconds.

As used herein, the term "electronic information document" is intended to include, but is not limited to a compilation of material, time-sensitive, and/or Reg. FD-compliant information capable of being electronically transmitted in any known electronic format such as, for example, HTML, plaintext, XML, etc. Certain embodiments of a computer-implemented method of the present invention include a transmission module configured to measure the transmission time. The term 'module' or 'computer module' is intended to include, but is not limited to, one or more computing devices configured to execute one or more software programs configured to perform one or more functions. As used herein, a "packet" denotes one or more characters/symbols/binary values grouped together as a fixed unit for transmission, which may have header and trailed information prepended and appended, respectively.

Figures 1A, 1B:
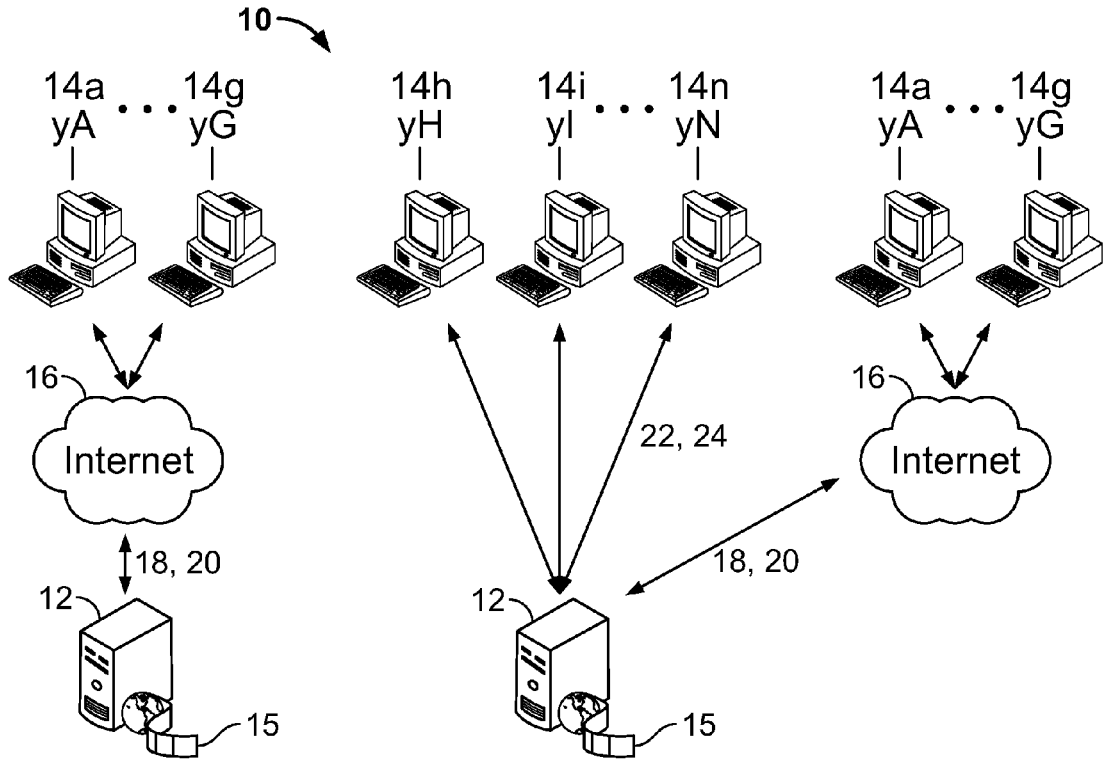
FIGS. 1A-1C are block diagrams of exemplary hardware architectural configurations for an information distribution system, constructed in accordance with an illustrative embodiment of the present invention.
Figure 1C:
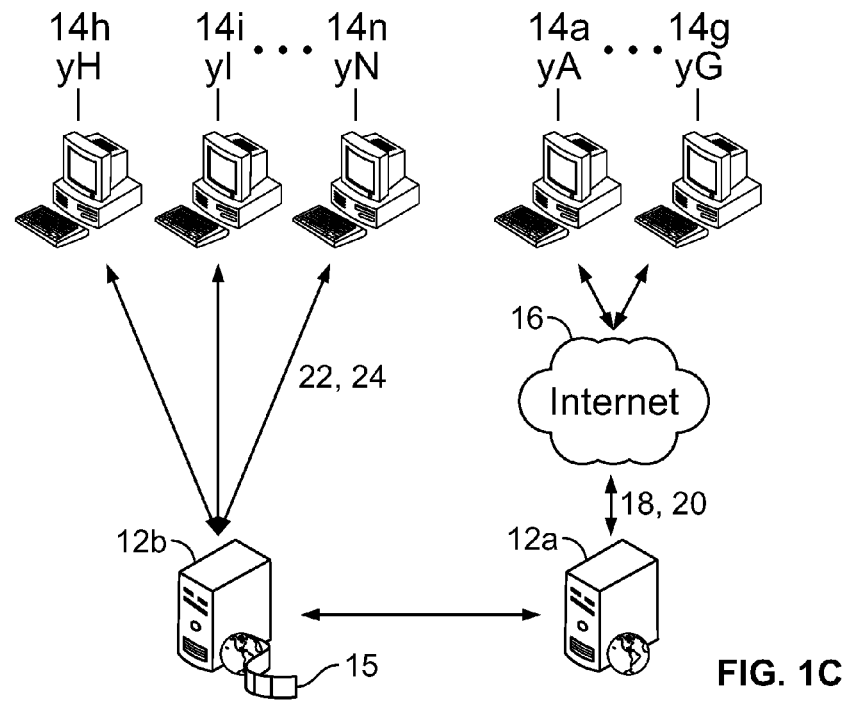

Referring now to FIGS. 1A-1C, block diagrams of a plurality of hardware architecture configurations of an exemplary document delivery system 10 for achieving simultaneous disclosure of press releases/documents are illustrated, according to an embodiment of the present invention. The exemplary document delivery system 10 is configured to meet the aforementioned design requirements. Referring now to FIG. 1A, the document delivery system 10 includes a server 12. The server 12 communicates with a plurality of push and/or and pull recipient machines 14a-14n, labeled recipient y1-recipient yN via the Internet 16 over a wired or wireless LAN 18, 20, respectively. The server 12 is configured to act as both a Web server executing Internet client/server software modules and a PATH server executing a "Semantic Equivalent Block" (SEB) method that includes a Pacing Handicapping and Transmission (PATH) method to be described hereinbelow. As used herein, a "Semantic Equivalent Block" (SEB) software module and a Pacing, ACK'ing, Timing, and Handicapping (PATH) software module contain executable programs for guaranteeing substantially simultaneous receipt of "impactful" information within electronic information documents that comply with "Reg. FD" for push and/or pull clients to be described hereinbelow.

Referring now to FIG. 1B, the document delivery system 10 includes a server 12. The server 12 communicates with a plurality of pull recipient machines 14a-14g, labeled recipient y1-recipient yG via the Internet 16 over a wired or wireless LAN 18, 20, respectively and a plurality of push recipient machines 14h-14n, labeled recipient yH-recipient yN directly over a wired or wireless LAN 22, 24. The server 12 is configured to act as both a Web server executing Internet client/server software modules and a PATH server executing the SEB/PATH method.

Referring now to FIG. 1C, the document delivery system 10 includes a server 12a and a server 12b. The server 12a communicates with a plurality of pull recipient machines 14a-14g, labeled recipient y1-recipient yG via the Internet 16 over a wired or wireless LAN 18, 20, and the server 12b communicates a plurality of push recipient machines 14h-14n, labeled recipient yH-recipient yN directly over a wired or wireless LAN 22, 24. The server 12a is configured to act as both a Web server executing Internet client/server software modules and a PATH server executing the SEB/PATH software methods. The head-end server 12b is configured to act as a PATH server executing the PATH software modules. The server 12b may communicated to/from the server 12a to employ the Internet client/server software modules located in server 12a and vice versa. The document delivery system 10 may also include a database 15 for push clients.

The servers 12, 12a, 12b comprise a computer platform. The computing platform may include a personal computer or work-station (e.g., a Pentium-4 2.4 GHz or higher) comprising one or more processors which includes a bus system which may be connected to a computer readable medium. The computer readable medium may be used for storing the instructions of the servers 12, 12a, 12b to be executed by the one or more processors, including an operating system, such as the Windows, MAC OS X Version n, various flavors of UNIX, or the Linux operating system. The computer readable medium may further be used for the storing and retrieval of documents to or from a database server and to or from the Internet 16 over the wired or wireless LAN or WAN 18, 20 and to or from the recipient machines 14G-14H over the wired or wireless LAN or WAN 22, 24. The computer readable medium may include a combination of volatile memory, such as RAM memory, and non-volatile memory, such as flash memory, optical disk(s), and/or hard disk(s).

The exemplary document delivery system 10 is configured to exhibit a 10 millisecond tolerance on time of receipt of impactful information, randomized over recipient for up to at least 150 recipients and 200 documents a minute with an average length of 20 Kbytes. The document delivery system 10 transmit documents over the Internet 16 or directly to the recipient machines 14a-14n using modern high-speed computers (say 0.5 GHz or better processors for the receivers and 2.4 GHz or better processors for the server for definiteness, all machines currently used in business meet this requirement) with an Internet connectivity burstable to T3 speeds. One skilled in the art would appreciate that the document delivery system is not limited to a specific time tolerance, total number of recipients, total number of transmittable documents, total document length, or specific processor characteristics. The values listed herein are likely to improve over time as technology improves over time.

FIGS. 2A-2D and Table A below show exemplary configurations of software architectural elements that may be divided between a Web server 30 and a PATH server 32 or combined into a single Web/PATH server 30', according to an elements included in the various combinations of the hardware configurations of FIGS. 1A-1C, according to an embodiment of the present invention. The Web server 30 may be modified to hold "pull" requests for a document for "pull" recipients, rather than immediately processing the requests, according to an embodiment of the present invention. The "pull" requests may be held and pooled with "push" requests to create a simultaneous disclosure group to be described hereinbelow. The Web server 30 may be implemented in two basic configurations as shown in FIGS. 2A-2D: it may be a standalone Web server 30 with integrated PATH server software, or it may be designed so that the PATH server software runs as a layer on top of the Web server 30. In the layered approach, the server(s) that implements the PATH server software may be on the same machine and/or another machine. The document delivery system 10 may have other simultaneous disclosure groups from different sources which it may integrate into the Web server's simultaneous disclosure group(s). The document delivery system 10 may combine subscribed "push" recipients and "pull" recipients into one simultaneous disclosure group for transmission, with no advantage to any one recipient in accordance with "Reg. FD." The document delivery system 10 "formats" documents according to the "SEB method" and delivers formatted documents back to the Web server 30 for transmission to intended recipients.

TABLE A

| Figure | Number of Servers | Web Server and PATH Software Implementation |
|---|---|---|
| 2A | 2 | Integrated |
| 2B | 2 | Layered |
| 2C | 1 | Integrated |
| 2D | 1 | Layered |

Figure 2A:
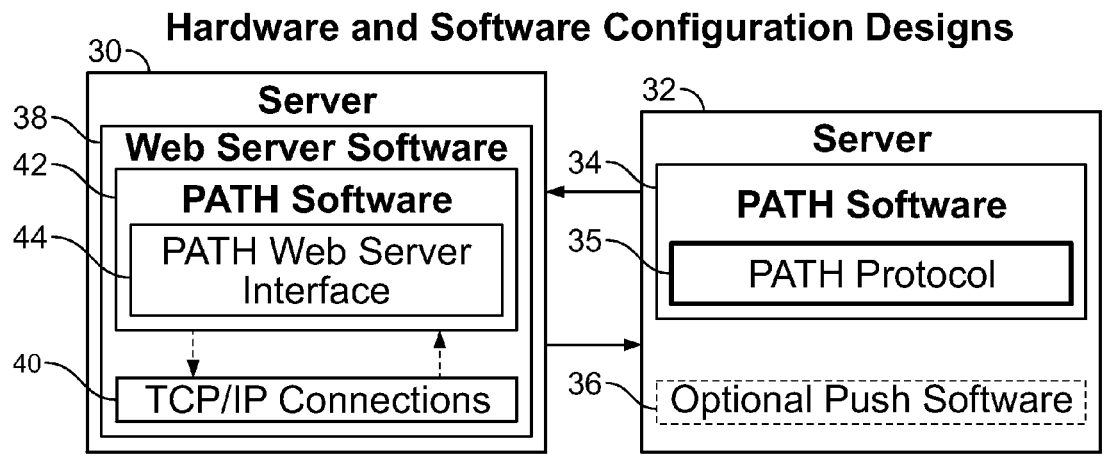
FIGS. 2A-2D show exemplary configurations of software architectural elements included in various combinations of the hardware configurations of FIGS. 1A-1C, according to an embodiment of the present invention.

In FIG. 2A, there are two servers 30, 32 corresponding to a Web server 30 and a PATH server 32, respectively. The PATH server 32 includes a PATH software module 34 that implements a plurality of routines including the SEB/PATH protocol 35 to be described hereinbelow and an optional "push" software module 36. The Web Server 30 includes a Web server software module 38 that implements a plurality of Web-based protocols to be described hereinbelow including TCP/IP connections software 40. A complete PATH server software module 42, including a PATH Web server software interface 44 for communication over the Internet via the TCP/IP connections software 40, is integrated into the Web server software module 38.

Figure 2B:
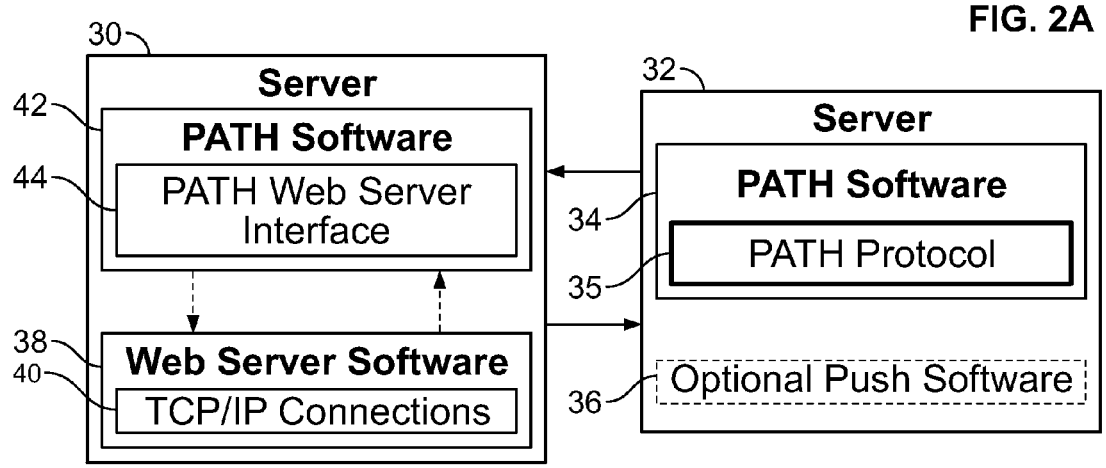

In FIG. 2B, there are two servers 30, 32 corresponding to a Web server 30 and a PATH server 32, respectively. The PATH server 32 includes a PATH software module 34 that implements a plurality of routines including the PATH protocol 35 and an optional "push" software module 36. The Web Server 30 includes a Web server software module 38 that implements a plurality of Web-based protocols including TCP/IP connections software 40. A complete PATH server software module 42, including a PATH Web server software interface 44 for communication over the Internet via the TCP/IP connections software 40, is layered on top of the Web server software module 38.

Figures 2C, 2D:
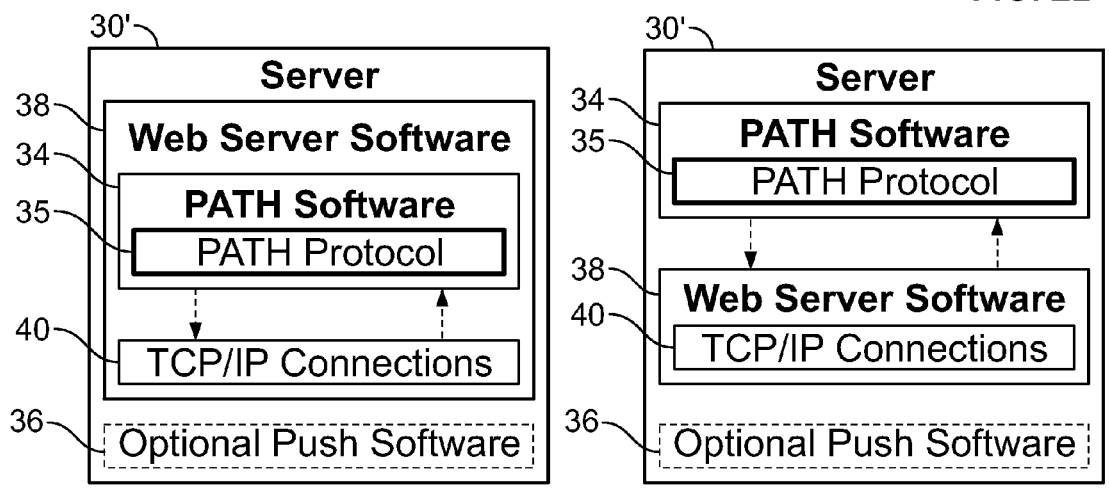

In FIG. 2C, a single server 30' is depicted which integrates both the Web server 30 and the PATH server 32. The Web/PATH server 30' includes a PATH software module 34 that implements a plurality of routines including the PATH protocol 35 and an optional "push" software module 36. The Web/PATH server 30' includes a Web server software module 38 that implements a plurality of Web-based protocols including TCP/IP connections software 40. A complete PATH server software module 42, including a PATH Web server software interface 44 for communication over the Internet via the TCP/IP connections software 40, is layered on top of the Web server software module 38.

In FIG. 2D, a single server 30' is depicted which integrates both the Web server 30 and the PATH server 32. The Web/PATH server 30' includes a PATH software module 34 that implements a plurality of routines including the PATH protocol 35 and an optional "push" software module 36. The Web Server 30 includes a Web server software module 38 that implements a plurality of Web-based protocols including TCP/IP connections software 40. A complete PATH server software module 42, including a PATH Web server software interface 44 for communication over the Internet via the TCP/IP connections software 40, is layered on top of the Web server software module 38.

A person skilled in the art would appreciate that the Web server software module 38 and the PATH server software module 42 and other modules may be implemented across any number of machines with various combinations of software and hardware. This also includes server farms and cloud computing, which may contain one or both of the Web server software module 38 and the PATH server software module 42.

The Web server software module 38 may be designed as a proprietary, single-purpose system, wherein the Web server 30 is configured to specifically handle simultaneous disclosure and is not used for other purposes. A plug-in or module for existing Web servers, such as, but not limited to, an IIS web server plug-in or an Apache Web server module, may also be modified to handle simultaneous disclosure.

As described above, "pull" technologies may include any protocols or transmission methods that are initiated by a request from a recipient and content is delivered to the recipient. An exemplary "pull" technology that may be modified to include the Web server software module 38 and the PATH server software module 42 is HTTP, wherein a recipient enters a Web address into a Web browser program to request a Web page, and the Web page is delivered to the recipient via the Web browser program. Other public protocol pull technologies which may be modified to employ the Web server software module 38 and the PATH server software module 42 include, but are not limited to, FTP, RSS, Atom, Comet, Java pushlets, XMPP, BOSH, long-polling, forever frames, APE, and XHR Streaming. The WebSocket API and WebSocket protocol may be modifiable to include the Web server software module 38 and the PATH server software module 42, which include full-duplex communication directly in the Web browser program.

The document delivery system 10 may further include RSS and/or Atom Web servers, which receive requests in the same manner as HTTP Web servers. The content that RSS Web servers deliver is in XML format. RSS and Atom specify different XML tags, but the overall structure is the same. Content of a document might be shorter than typical plaintext and HTML document versions, but would be designed to employ the same number of "impactful" and "non-impactful" blocks (i.e., IBlocks and NIBlocks, respectively, to be described hereinbelow) in a formatted document to be transmitted according the SEB/PATH method of the present invention.

The document delivery system 10 may further include FTP (File Transfer Protocol) servers. FTP (File Transfer Protocol) is a common method for transferring files over the Internet. FTP Web servers accept requests for files and transmit the files. An FTP Web server may be modified in the same manner as an HTTP Web server to include the Web server software module 38 and the PATH server software module 42. Other file transfer protocols that may be used for simultaneous disclosure include, but are not limited to, RCP (Remote Copy Protocol), SCP (Secure Copy Protocol), and SFTP (SSH File Transfer Protocol or Secure File Transfer Protocol).

The document delivery system 10 may create a primary recipient group, and further may create a secondary group, a tertiary group, etc., hereinafter referred to as "following" groups, for simultaneous reception of the same document. A following group may be based on requests received after a primary group has begun processing, and may include recipients that were laggards and were therefore previously pushed out of a group to a later following group. In a second scenario, if a second document becomes available immediately after a first document, a simultaneous disclosure recipient group needs to be created again for that second document. According to another embodiment of the present invention, multiple simultaneous disclosure recipient groups and documents may be processed in parallel.

According to an embodiment of the present invention, rather than timing each packet of an entire document to achieve simultaneous disclosure, the information distribution system and method described herein employs "semantic equivalent blocks" to represent a portion of the content of the electronic information document. As used herein, the term "semantic equivalent block" or an "SEB" includes, but is not limited to, at least one character including a block, portion or segment of characters which includes the same amount of "impactful" or "non-impactful" content irrespective of the particular format (e.g., HTML, XML, plain text, etc.) of the information across multiple documents. As used herein, the term "impactful" refers to any portion of the content included in the electronic information document that may cause or impact the likelihood that an individual will take some form of action, such as, for example, a financial-related action including the buying, selling, or holding of a financial instrument. The term "impactful data element" is intended to include, but is not limited to, numbers, key words, phrases, characters, markers, names, symbols, or combination thereof (e.g., company names, person's names, dollar amounts, financial terms, positive or negative adjectives, and dates) that are deemed impactful or of particular importance. Exemplary "impactful" words and phrases include, but are not limited to, "suspend," "announce," "disappointing," "investigate," "subpoena," "negative guidance," "positive guidance," "loss," "gain," "layoff," etc. Exemplary "impactful" symbols include, but are not limited to, currency symbols such as "$", "£", and "€" followed by a sequence of digits which, taken together, represent a monetary amount of range of monetary amounts. A non-exhaustive list of rules for considering what is defined as impactful content is described hereinbelow in Table 1:

TABLE 1

Numbers and Symbols

Can contain decimals or commas
Preceded by a dollar, euro, pound, or any other currency symbol.
Followed by "dollars", "pounds", "euro", etc.
Followed by a percent
Followed or preceded by a Financial Word
Not part of a date format
Words and Phrases a) Financial
Increase
Decrease
Bought
Sold
Shares
Per Share
Offering
Buyback
Earn/Earnings/Profit
Bankrupt/Bankruptcy/Chapter 11
Negative Guidance
Positive Guidance
b) Business
Resign
Hire
Layoff
Class Action/Sue/Litigate/Harassment
Merger/Acquisition
c) Word numbers
One, two, . . . eleven, twelve . . . twenty . . . hundred . . . thousand . . . million . . . , etc.,
(See Numbers rules)

According to an embodiment of the present invention, impactful words/phrases/symbols may be stored in a database or an ordinary file (e.g., text or XML document). The database or file may also contain rules, expressions, productions, and formulas, including but not limited to, regular expressions and wildcards, which in essence define possibly infinite families or patters of impactful text. Some examples of these may include: "bank*" (any word beginning with the four characters "bank"), "raised * guidance" (any three word phrase in which the first word is "raised" and the third word is "guidance"), YYY (which might be a code for any valid year number), etc. Through the use of these lists, rules, etc., it can always be unambiguously determined if a particular subject of text is or is not impactful by using a pattern matching method as described hereinbelow.

According to an embodiment of the present invention, SEBs containing impactful words/phrases/symbols are referred to as impact blocks (hereinafter "IBlock") and SEBs not containing impactful words/phrases/symbols are referred to as non-impact blocks (hereinafter "NIBlock").

The identification, management and processing of SEBs in relation to electronic information documents according to embodiments of the present invention is referred to herein as the "SEB method," and is described in detail below.

FIGS. 3A-3D show two versions of an electronic information document relating to the same substantive information (the HTML-formatted document 200 in FIGS. 3A and 3B; and the plain text-formatted document 202 in FIGS. 3C and 3D) processed in accordance with the SEB method according to embodiments of the present invention, for transmission to two recipient machines 14a and 14b. According to an embodiment of the present invention, an electronic information document may be a document that is pre-formatted according to requirements of different recipients (e.g., plain-text, HTML, XML, etc.) and stored in a database before a "marking stage" to be described hereinbelow, or may be formatted during the "marking stage" for each recipient from a single source document.

In the "marking stage" of the SEB method, the documents 200, 202 are marked to delimit "semantic equivalent blocks" of text, according to an embodiment of the present invention. For electronic information documents including Reg. FD-compliant information or other similarly sensitive information wherein simultaneous disclosure and reception is desired, during the marking stage, certain "impactful data elements" are identified. For example, in 3A-3D, in the "marking stage," impactful data elements 204, 206, 208, 210 are identified in documents 200 and 202.

According to an embodiment of the present invention, each of the documents 200, 202 is divided into SEBs that are regarded either as impact blocks ("IBlock") or non-impact blocks ("NIBlock"), depending on whether they include impactful content or not, respectively. Each of the NIBlocks and IBlocks are terminated at the beginning and the end of the SEB by SEB tags that indicate that the specific block is an NIBlock or IBlock, respectively. IBlocks (SEBs) 212, 214 include at least one impactful data element 204-210. NIBlocks (SEBs) 216, 218, 220 do not contain an impactful data element.

Referring again to FIGS. 3A-3D, and following the example above, according to an embodiment of the present invention, each of the SEBs 212-220 is terminated by pair of SEB tags 230-248 which comprises two or more computer-readable text symbols, e.g., '<block type="I">$0.06 per share</block>'. The SEB tags 230-248 may be inserted into the text of each of the documents 200, 202 at a location preceding and following one or more of the IBlocks 212, 214 and the NIBlocks 216-220. Tags may comprise a variety of formats, including XML style (<block type="I"></Block> or <block type="NI"></Block>), HTML style (<IBlock></IBlock> or <NIBlock></NIBlock>), more literal HTML (<span class="IBlock"></span> or <span class="NIBlock"></span>), or any other format distinguishing IBlocks and NIBlocks.

Note that an IBlock may include impactful data elements, impactful data elements plus formatting information, a plurality of impactful data elements with intervening and/or surrounding formatting elements, or a multiplicity of impactful data elements and surrounding formatting elements with intervening non-impactful data elements. An example shown in FIGS. 3A-3D is "9.1% increase", where both "9.1%" and "increase" are impactful. An example of a compound plain-text IBlock including impactful data elements surrounding non-impactful data elements is as follows:

"loss of $68.9 million, or $4.68 per share"

has impactful data elements "loss of" and "$68.9 million", followed by non-impactful conjunctive elements ", or", followed by impactful data elements "$4.68" and "per share". Consecutive impactful data elements may be considered as one impactful phrase that is determined during the marking stage as one large IBlock or two separate ISubBlocks, and impactful data elements having intervening non-impactful conjunctive elements may combined into a single IBlock. According to certain embodiments of the present invention, an IBlock may include an entire table of values in various formats, such as an HTML table containing financial values as depicted hereinbelow.

```
<table>
  <tr>
    <td>
      $1,000
    </td>
    <td>
      $2,000
    </td>
  </tr>
  <tr>
    <td>
      $5,000
    </td>
    <td>
      $6,000
    </td>
  </tr>
</table>
```

Conversely, IBlocks that are too long, perhaps longer than about 50 bytes, may be divided into two or more ISubBlocks (tagged as, for example, <block type="ISub">), which may be further divided into a plurality of smaller ISubBlocks until an acceptable ISubBlock length is achieved.

Figure 4:
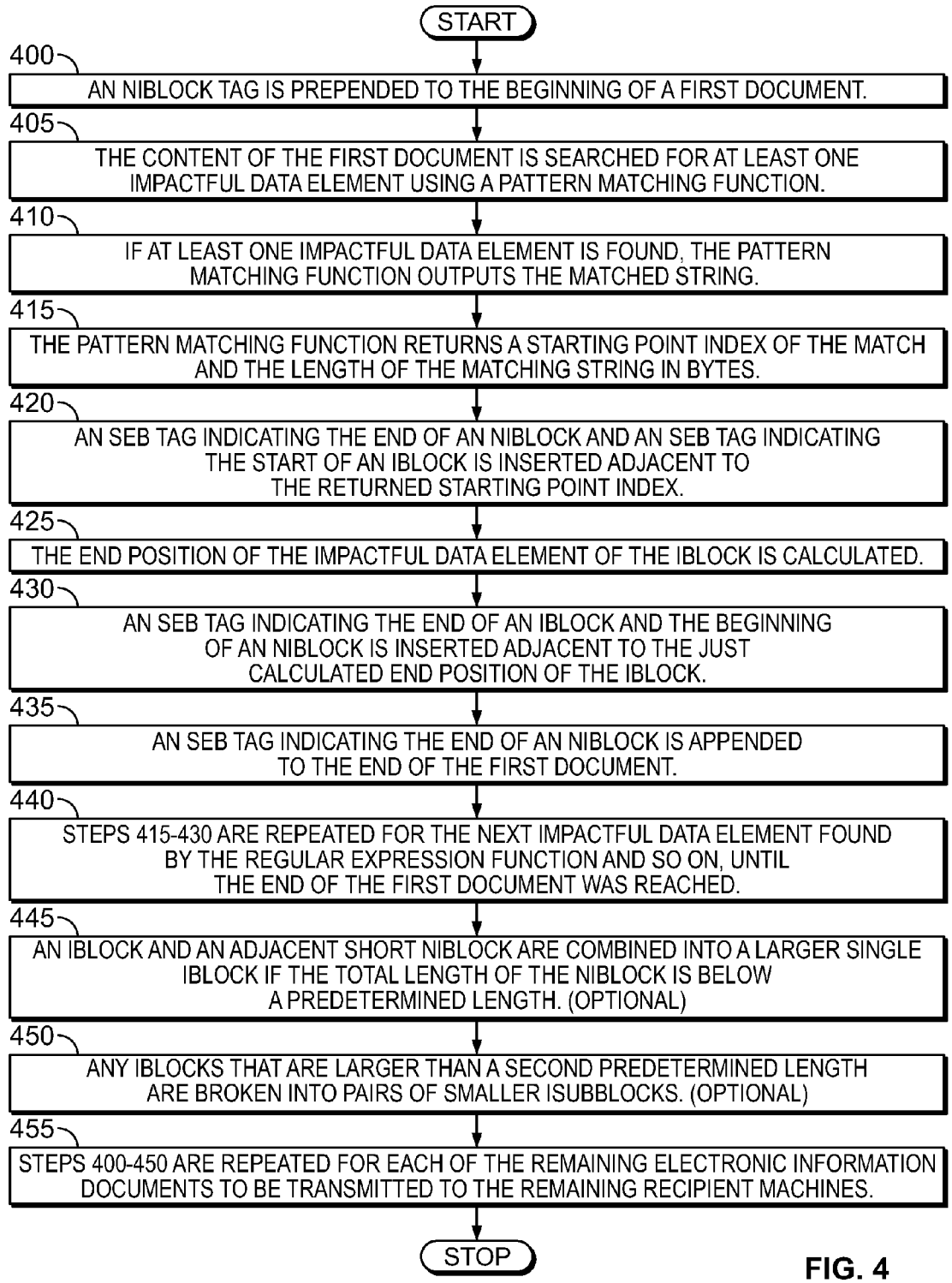
FIG. 4 shows a process flow illustrating exemplary steps for implementing an electronic document "marking stage", according to an "SEB method" of the present invention.

According to an embodiment of the present invention, impactful data elements may be identified and marked/tagged in documents during the marking stage by employing a pattern matching method. A person skilled in the art would appreciate that a suitable pattern matching method would include a regular expression matching method/function, such as, but not limited to one found in the Microsoft.NET Framework's System.Text.RegularExpressions or GNU C libraries. FIG. 4 depicts an example of applying a regular expression method for marking a document into SEBs comprising IBlocks and NIBlocks, according to an embodiment of the present invention. Suppose the initial document is simply:

"IBM made $300,000.00 this week."

At step 400, an NIBlock tag is prepended to the beginning of the document to obtain:

"<block type="NI">IBM made $300,000.00 this week."

At step 405, the content of the document is searched for at least one impactful data element using a pattern matching function, e.g., RegEx. This may be at least one of the impactful content symbols/words discussed above. At step 410, if at least one impactful data element is found, the pattern matching function outputs the matched string (e.g. "$300,000"). At step 415, the pattern matching function may also return a starting point index of the match (e.g., character 26 from the beginning of the document), and the length of the matching string in bytes (e.g., 11). At step 420, an SEB tag indicating the end of an NIBlock and an SEB tag indicating the start of an IBlock (e.g., </block><block type="I">) is inserted adjacent to the returned starting point index to obtain:

"<block type="NI">IBM made </block><block type="I">$300,000.00 this week.

At step 425, since the length of the matching string is known, and the starting point index is known, then the end position of the impactful data element of the IBlock is calculated as follows:

New Length=Length of added tags (24)+length of match (11)=35

End point of *I*Block=Start Point (26)+New Length (35)=61

At step 430, an SEB tag indicating the end of an IBlock and the beginning of an NIBlock (e.g., </block><block type="NI">) is inserted adjacent to the just calculated end position of the IBlock as follows:

"<block type="NI">IBM made </block><block type="I">$300,000.00</block><block type="NI"> this week."

At step 435, another SEB tag indicating the end of an NIBlock (e.g., </block>) is appended to the end of the document as follows:

"<block type="NI">IBM made </block><block type="I">$300,000.00</block><block type="NI"> this week.</block>"

If the document were longer and, for example, the word "week" were an impactful word, then, at step 440, steps 415-430 are repeated for the next impactful data element found by the regular expression function ("week") and so on, until the end of the document is reached. Note that, in certain embodiments, a document may be scanned initially in one pass with a regular expression that includes all possible impactful data elements, or, in certain other embodiments, the document may be scanned or hashed repeatedly looking for a single type of impactful data element, or a plurality of types of elements. If the regular expression function is applied to the document in multiple passes, the regular expression function may be programmed to ignore preceding IBlock SEB tag termination indicators.

In optional Step 445, the formatted document is re-scanned and an IBlock and an adjacent "short" NIBlock may be combined into a larger IBlock if the total length of the NIBlock is below a predetermined length. Alternatively, certain pairs of IBlocks and any intervening relatively short NIBlocks (e.g., containing connection words) may be combined into a larger single IBlock if the total length of the NIBlock is below a predetermined length. In optional step 450, any IBlocks that are larger than a second predetermined length are broken into pairs of smaller ISubBlocks. In Step 455, Steps 400-450 are repeated for each of the remaining electronic information documents to be transmitted to the remaining recipient machines, wherein each of the documents are scanned and tagged for the same impactful data elements as in the first document.

According to an embodiment of the present invention, alternatively, the marking method may include a match and replace method, wherein a matched string is replaced by the matched string followed by a tagged string. For example, the C# function RegEx Replace function may be employed to find a matched string and immediately replace it with the same matched string surrounded by SEB tags. For example, if the pattern $###,###.## and "week" were found, all such matches would be replaced with:

<block type="I">$###,###.##</block> and <block type="I">week</block>.

In the present example, this would transform:

"IBM made $300,000.00 this week."
to
"IBM made <block type="I">$300,000.00</block> this <block type="I">week</block>."

From here, adjacent IBlocks may be joined by removing the tags between them, and then </block> and <block type="NI"> are inserted before and after (respectively) the new tagged blocks to create the NIBlocks.

For illustrative purposes, FIGS. 5A and 5B shows two versions of an electronic information document relating to the same substantive information in plaintext format and HTML format, respectively, which have not yet been parsed, according to the marking method of the present invention. Parsing proceeds in the following example as follows.

Initially, an NIBlock "Before" SEB Tag is inserted at index 0, or the beginning, of each document as follows:

NIBlock Before SEB Tag: "<block type="NI">"
Plain text format
<block type="NI">Company A earnings statement.
Company A reported earnings of 354 million dollars for fiscal year 2010.
Analysts had been looking for earnings of 389 million to 406 million dollars for fiscal year 2010, but actual results were disappointing.
Decreasing earnings was the result of their sales numbers.
HTML Format
<block type="NI"><html><body>
<h1>Company A Earnings statement</h1>
<p>Company A reported earnings of 354 million dollars for fiscal year 2010.</p>
<p>Analysts had been looking for earnings of 389 million to 406 million dollars for fiscal year 2010, but actual results were disappointing.</p>
<p>Decreasing earnings was the result of their sales numbers.</p>
</body></html>

An NIBlock "After" SEB Tag is inserted at the end of each document as follows:

NIBlock After SEB Tag: "</block>"
Plain text format
<block type="NI">Company A earnings statement.
Company A reported earnings of 354 million dollars for fiscal year 2010.
Analysts had been looking for earnings of 389 million to 406 million dollars for fiscal year 2010, but actual results were disappointing.
Decreasing earnings was the result of their sales numbers.</block>
HTML Format
<block type="NI"><html><body>
<h1>Company A Earnings statement</h1>
<p>Company A reported earnings of 354 million dollars for fiscal year 2010, a decrease of 10%. </p>
<p>Analysts had been looking for earnings of 389 million to 406 million dollars for fiscal year 2010, but actual results were disappointing.</p>
<p>Decreasing earnings was the result of their sales numbers.</p>
</body></html></block>

IBlocks are identified in each document and SEB tags are inserted about them as follows:

IBlock Before SEB Tag: "</block><block type="I">", Length: 24
IBlock After SEB Tag: "</block><block type="NI">", Length 25

An End SEB Tag Insertion Index is calculated as: Match Index+Match Length+IBlock Before SEB Tag Length

---

First IBlock

Plain Text
IBlock found: "354 million dollars" at index 78, length 19
    Before SEB Tag
    Insert IBlock Before SEB Tag at index 78
    <block type="NI">Company A earnings statement.
    Company A reported earnings of </block><block type="I">354 million dollars for fiscal year 2010.
    Analysts had been looking for earnings of 389 million to 406 million dollars for fiscal year 2010, but actual results were disappointing.
    Decreasing earnings was the result of their sales numbers.</block>
    After SEB Tag
    Calculate end insertion point: 78 + 19 + 24 = 121
    Insert IBlock After SEB Tag at index 121
    <block type="NI">Company A earnings statement.
    Company A reported earnings of </block><block type="I">354 million dollars</block><block type="NI"> for fiscal year 2010.
    Analysts had been looking for earnings of 389 million to 406 million dollars for fiscal year 2010, but actual results were disappointing.
    Decreasing earnings was the result of their sales numbers.</block>
HTML
IBlock found: "354 million dollars" at index 102, length 19
    Before SEB Tag
    Insert IBlock Before SEB Tag at index 102
    <block type="NI"><html><body>
    <h1>Company A Earnings statement</h1>
    <p>Company A reported earnings of </block><block type="I">354 million dollars for fiscal year 2010.</p>
    <p>Analysts had been looking for earnings of 389 million to 406 million dollars for fiscal year 2010, but actual results were disappointing.</p>
    <p>Decreasing earnings was the result of their sales numbers.</p>
    </body></html></block>
    After SEB Tag
    Calculate end insertion point: 102 + 19 + 24 = 145
    Insert IBlock After SEB Tag at index 145
    <block type="NI"><html><body>
    <h1>Company A Earnings statement</h1>
    <p>Company A reported earnings of </block><block type="I">354 million dollars</block><block type="NI"> for fiscal year 2010.</p>
    <p>Analysts had been looking for earnings of 389 million to 406 million dollars for fiscal year 2010, but actual results were disappointing.</p>
    <p>Decreasing earnings was the result of their sales numbers.</p>
    </body></html></block>

---

Second IBlock

Plain Text
IBlock found: "389 million to 406 million dollars" at index 211, length 34
    Before SEB Tag
    Insert IBlock Before SEB Tag at index 211
    <block type="NI">Company A earnings statement.
    Company A reported earnings of </block><block type="I">354 million dollars</block><block type="NI"> for fiscal year 2010.
    Analysts had been looking for earnings of </block><block type="I">389 million to 406 million dollars for fiscal year 2010, but actual results were disappointing.
    Decreasing earnings was the result of their sales numbers.</block>
    After SEB Tag
    Calculate end insertion point: 211 + 34 + 24 = 269
    Insert IBlock After SEB Tag at index 269
    <block type="NI">Company A earnings statement.
    Company A reported earnings of </block><block type="I">354 million dollars</block><block type="NI"> for fiscal year 2010.
    Analysts had been looking for earnings of </block><block type="I">389 million to 406 million dollars</block><block type="NI"> for fiscal year 2010, but actual results were disappointing.
    Decreasing earnings was the result of their sales numbers.</block>

HTML
IBlock found: "389 million to 406 million dollars" at index 242, length 34
    Before SEB Tag
    Insert IBlock Before SEB Tag at index 242
    <block type="NI"><html><body>
    <h1>Company A Earnings statement</h1>
    <p>Company A reported earnings of </block><block type="I">354 million dollars</block><block type="NI"> for fiscal year 2010.</p>
    <p>Analysts had been looking for earnings of </block><block type="I">389 million to 406 million dollars for fiscal year 2010, but actual results were disappointing.</p>
    <p>Decreasing earnings was the result of their sales numbers.</p>
    </body></html></block>
    After SEB Tag
    Calculate end insertion point: 242 + 34 + 24 = 300
    Insert IBlock After SEB Tag at index 300
    <block type="NI"><html><body>
    <h1>Company A Earnings statement</h1>
    <p>Company A reported earnings of </block><block type="I">354 million dollars</block><block type="NI"> for fiscal year 2010.</p>
    <p>Analysts had been looking for earnings of </block><block type="I">389 million to 406 million dollars</block><block type="NI"> for fiscal year 2010, but actual results were disappointing.</p>
    <p>Decreasing earnings was the result of their sales numbers.</p>
    </body></html></block>

---

Third IBlock

Plain Text
IBlock found: "disappointing" at index 341, length 13
    Before SEB Tag
    Insert IBlock Before SEB Tag at index 341
    <block type="NI">Company A earnings statement.
    Company A reported earnings of </block><block type="I">354 million dollars</block><block type="NI"> for fiscal year 2010.
    Analysts had been looking for earnings of </block><block type="I">389 million to 406 million dollars</block><block type="NI"> for fiscal year 2010, but actual results were </block><block type="I">disappointing.
    Decreasing earnings was the result of their sales numbers.</block>
    After SEB Tag
    Calculate end insertion point: 341 + 13 + 24 = 378
    Insert IBlock After SEB Tag at index 378
    <block type="NI">Company A earnings statement.
    Company A reported earnings of </block><block type="I">354 million dollars</block><block type="NI"> for fiscal year 2010.
    Analysts had been looking for earnings of </block><block type="I">389 million to 406 million dollars</block><block type="NI"> for fiscal year 2010, but actual results were </block><block type="I">disappointing</block><block type="NI">.
    Decreasing earnings was the result of their sales numbers.</block>
HTML
IBlock found: "disappointing" at index 372, length 13
    Before SEB Tag
    Insert IBlock Before SEB Tag at index 372
    <block type="NI"><html><body>
    <h1>Company A Earnings statement</h1>
    <p>Company A reported earnings of </block><block type="I">354 million dollars</block><block type="NI"> for fiscal year 2010.</p>
    <p>Analysts had been looking for earnings of </block><block type="I">389 million to 406 million dollars</block><block type="NI"> for fiscal year 2010, but actual results were </block><block type="I">disappointing.</p>
    <p>Decreasing earnings was the result of their sales numbers.</p>
    </body></html></block>
    After SEB Tag
    Calculate end insertion point: 372 + 13 + 24 = 409
    Insert IBlock After SEB Tag at index 409
    <block type="NI"><html><body>

Third IBlock

```
<h1>Company A Earnings statement</h1>
<p>Company A reported earnings of </block><block
type="I">354 million dollars</block><block type="NI"> for fiscal
year 2010.</p>
<p>Analysts had been looking for earnings of </block><block
type="I">389 million to 406 million dollars</block><block
type="NI"> for fiscal year 2010, but actual results were
disappointing</block><block type="NI">.</p>
<p>Decreasing earnings was the result of their sales numbers.</p>
</body></html></block>
```

Fourth IBlock

Plain Text
IBlock found: "Decreasing" at index 405, length 10
    Before SEB Tag
    Insert IBlock Before SEB Tag at index 405
    <block type="NI">Company A earnings statement.
    Company A reported earnings of </block><block type="I">354
    million dollars</block><block type="NI"> for fiscal year 2010.
    Analysts had been looking for earnings of </block><block
    type="I">389 million to 406 million dollars</block><block
    type="NI"> for fiscal year 2010, but actual results were
    </block><block type="I">disappointing</block><block
    type="NI">.
    </block><block type="I">Decreasing earnings was the result of
    their sales numbers.</block>
    After SEB Tag
    Calculate end insertion point: 405 + 10 + 24 = 439
    Insert IBlock After SEB Tag at index 439
    <block type="NI">Company A earnings statement.
    Company A reported earnings of </block><block type="I">354
    million dollars</block><block type="NI"> for fiscal year 2010.
    Analysts had been looking for earnings of </block><block
    type="I">389 million to 406 million dollars</block><block
    type="NI"> for fiscal year 2010, but actual results were
    </block><block type="I">disappointing</block><block
    type="NI">.
    </block><block type="I">Decreasing</block><block type="NI">
    earnings was the result of their sales numbers.</block>
HTML
IBlock found: "disappointing" at index 443, length 10
    Before SEB Tag
    Insert IBlock Before SEB Tag at index 443
    <block type="NI"><html><body>
    <h1>Company A Earnings statement</h1>
    <p>Company A reported earnings of </block><block
    type="I">354 million dollars</block><block type="NI"> for fiscal
    year 2010.</p>
    <p>Analysts had been looking for earnings of </block><block
    type="I">389 million to 406 million dollars for fiscal year 2010,
    but actual results were </block><block
    type="I">disappointing</block><block type="NI">.</p>
    <p></block><block type="I">Decreasing earnings was the result
    of their sales numbers.</p>
    </body></html></block>
    After SEB Tag
    Calculate end insertion point: 372 + 13 + 24 = 409
    Insert IBlock After SEB Tag at index 409
    <block type="NI"><html><body>
    <h1>Company A Earnings statement</h1>
    <p>Company A reported earnings of </block><block
    type="I">354 million dollars</block><block type="NI"> for fiscal
    year 2010.</p>
    <p>Analysts had been looking for earnings of </block><block
    type="I">389 million to 406 million dollars</block><block
    type="NI"> for fiscal year 2010, but actual results were
    </block><block type="I">disappointing</block><block
    type="NI">.</p>
    <p></block><block type="I">Decreasing</block><block
    type="NI"> earnings was the result of their sales numbers.</p>
    </body></html></block>

After all IBlocks have been identified and delimited with SEB tags, each of the documents may be re-scanned substantially simultaneously to remove NIBlocks that are "too short", e.g., 10 characters or less in the current example. After re-scanning the current documents, one of the NIBlocks is found to be two characters in length in the plain text version and the corresponding NIBlock is found to be nine characters in length in the HTML version. If one of the NIBlocks in a version were over the "too short" threshold while the corresponding NIBlock in another version were under the threshold, adjacent NIBlocks may be combined to keep the blocks in each document similarly marked.

Figure 6:
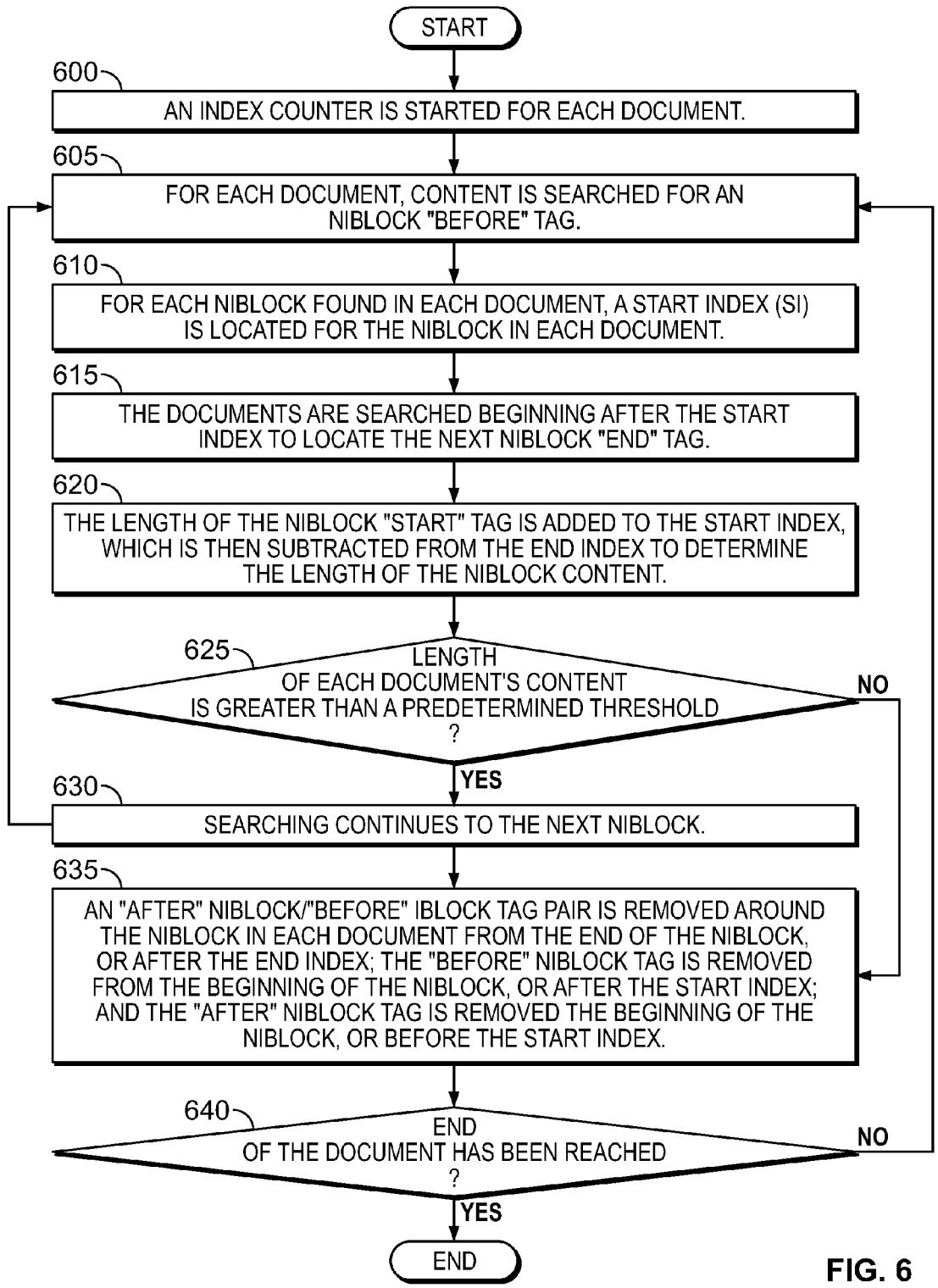
FIG. 6 shows a process flow illustrating exemplary steps for combining two IBlocks with an intervening 'too short'

FIG. 6 shows a process flow illustrating exemplary steps for combining two IBlocks with an intervening 'too short' NIBlock in greater detail, with emphasis on how counters and indices are calculated and employed to combine IBlocks, according to an embodiment of the present invention. In step 600, an index counter is started for each document. In step 605, for each document, content is searched for an NIBlock "Before" tag (e.g., <block type="NI">). The first tag marking the first NIBlock is skipped since it cannot be removed, so searching may begin at index 1 to ignore the tag match at index 0. In step 610, for each NIBlock found in each document, a Start Index (SI) is located for the NIBlock in each document. In step 615, after an NIBlock is located, the documents are searched beginning after the Start Index to locate the next NIBlock "End" tag (e.g., "</block> tag), indicating the NIBlock has ended. This search returns an index of the </block> tag, or the End Index. In step 620, the length of the NIBlock "Start" tag is added to the Start Index, which is then subtracted from the End Index to determine the length of the NIBlock content. In step 625, if the length of each document's content is greater than a predetermined threshold, then in step 630, searching continues to the next NIBlock, and processing returns to step 605. If, in step 625, the length in any of the documents is shorter than the predetermined threshold, then in step 635, an "After" NIBlock/"Before" IBlock tag pair is removed around the NIBlock in each document (e.g., "</block><block type="I">") from the end of the NIBlock, or after the End Index; the "Before" NIBlock tag (e.g., "<block type="NI">) is removed from the beginning of the NIBlock, or after the Start Index; and the "After" NIBlock tag (e.g., "</block>") is removed the beginning of the NIBlock, or before the Start Index. At step 640, if the end of the document has not been reached, the processing then returns back to step 605.

Below is an example of locating a 'too short' fourth NIBlock in the example "marked" documents described above:

The next <block type="NI"> tag is found and the Start Index is obtained.

Plain Text
    Fourth NIBlock found at index 386; Start Index is 386.
        <block type="NI">Company A earnings statement.
        Company A reported earnings of </block><block type="I">354
        million dollars</block><block type="NI"> for fiscal year 2010.
        Analysts had been looking for earnings of </block><block
        type="I">389 million to 406 million dollars</block><block
        type="NI"> for fiscal year 2010, but actual results were
        </block><block type="I">disappointing</block><block
        type="NI">.
        </block><block type="I">Decreasing</block><block
        type="NI">
        earnings was the result of their sales numbers.</block>
HTML
    Fourth NIBlock found at index 417; Start Index is 417.
        <block type="NI"><html><body>

```
<h1>Company A Earnings statement</h1>
<p>Company A reported earnings of </block><block
type="I">354 million dollars</block><block type="NI"> for
fiscal year 2010.</p>
<p>Analysts had been looking for earnings of </block><block
type="I">389 million to 406 million dollars</block><block
type="NI"> for fiscal year 2010, but actual results were
</block><block type="I">disappointing</block><block
type="NI">.</p>
<p></block><block type="I">Decreasing</block><block
type="NI"> earnings was the result of their sales numbers.</p>
</body></html></block>
```

The next </block> tag is found and the End Index is obtained.

```
Plain Text
    The </block> tag was found at 405; End Index is 405.
HTML
    The </block> tag was found at 443; End Index is 443.
```

The length of the NIBlock Content is calculated.

```
Plain Text
    405 − (386 + 17) = 2.
HTML
    443 − (417 + 17) = 9.
```

Since one of the content lengths was below the predetermined threshold, the NIBlock SEB tags are removed from each document. </block><block type="I"> is deleted from after the End Index in the plain text version (405) and HTML version (443). <block type="NI"> is deleted from after the Start Index in the plain text version (386) and HTML version (417) </block> is deleted from before of the Start Index in the plain text version (386) and HTML version (417). The index of the start of each </block> is calculated by subtracting the length of </block>(8) from the Start Index.

The resulting content is:

```
Plain text
    <block type="NI">Company A earnings statement.
    Company A reported earnings of </block><block type="I">354
    million dollars</block><block type="NI"> for fiscal year 2010.
    Analysts had been looking for earnings of </block><block
    type="I">389 million to 406 million dollars</block><block
    type="NI"> for fiscal year 2010, but actual results
    were </block><block type="I">disappointing.
    Decreasing</block><block type="NI"> earnings was the result of
    their sales numbers.</block>
HTML
    <block type="NI"><html><body>
    <h1>Company A Earnings statement</h1>
    <p>Company A reported earnings of </block><block type="I">354
    million dollars</block><block type="NI"> for fiscal year 2010.</p>
    <p>Analysts had been looking for earnings of </block><block
    type="I">389 million to 406 million dollars</block><block
    type="NI">
    for fiscal year 2010, but actual results were </block><block
    type="I">disappointing.</p>
    <p>Decreasing</block><block type="NI"> earnings was the result of
    their sales numbers.</p>
    </body></html></block>
```

As with removing "too small" NIBlocks, after all IBlocks have been identified and delimited with SEB tags, each of the documents may be re-scanned substantially simultaneously to split any IBlocks that are "too long," e.g., 20 characters or more in the present example as follows:

```
PlainText
    <block type="NI">Company A earnings statement.
    Company A reported earnings of </block><block type="I">354
    million dollars</block><block type="NI"> for fiscal year 2010.
    Analysts had been looking for earnings of </block><block
    type="I">389 million to 406 million dollars</block><block
    type="NI"> for fiscal year 2010, but actual results
    were </block><block type="I">disappointing.
    Decreasing</block><block type="NI"> earnings was the result of
    their sales numbers.</block>
    "Too long" IBlock found:
    <block type="I">389 million to 406 million dollars</block>
```

The content of the IBlock is captured and the SEB tags of the IBlock are removed:

```
389 million to 406 million dollars
The first 20 characters may be split and tagged with SubIBlock SEB Tags:
389 million to 406 m
<block type="ISub">389 million to 406 m</block>
```

The second 20 characters of the remaining content of the same IBlock may be split from the original content. If there are less than 20 characters remaining in the content of the IBlock under consideration, this may be the last ISubBlock. In the present example, the second ISubBlock is 14 characters:

```
    illion dollars
    <block type="ISub">illion dollars</block>
```

The new ISubBlocks are then combined and put back into the original document:

```
    <block type="ISub">389 million to 406 m</block><block
    type="ISub">illion dollars</block>
```

The resulting content is:

```
    <block type="NI">Company A earnings statement.
    Company A reported earnings of </block><block type="I">354
    million dollars</block><block type="NI"> for fiscal year 2010.
    Analysts had been looking for earnings of </block><block
    type="ISub">389 million to 406 m</block><block type=
    "ISub">illion dollars</block><block type="NI"> for fiscal year 2010,
    but actual results were </block><block type="I">disappointing.
    Decreasing</block><block type="NI"> earnings was the result of
    their sales numbers.</block>
HTML
    <block type="NI"><html><body>
    <h1>Company A Earnings statement</h1>
    <p>Company A reported earnings of </block><block type="I">354
    million dollars</block><block type="NI"> for fiscal year 2010.</p>
    <p>Analysts had been looking for earnings of </block><block
    type="I">389 million to 406 million dollars</block><block type=
    "NI">for fiscal year 2010, but actual results were </block><block
    type="I">disappointing.</p>
    <p>Decreasing</block><block type="NI"> earnings was the
result of their sales numbers.</p>
    </body></html></block>
IBlock found:
    <block type="I">389 million to 406 million dollars</block>
```

The content of the IBlock is captured and the SEB tags of the IBlock are removed:
    389 million to 406 million dollars
    The first 20 characters may be split and tagged with ISubBlock SEB Tags:

```
389 million to 406 m
<block type="ISub">389 million to 406 m</block>
```

The second 20 characters of the remaining content of the same IBlock may be split from the original content. If there are less than 20 characters remaining in the content of the IBlock under consideration, this may be the last ISubBlock. In the present example, the second ISubBlock is 14 characters:

```
illion dollars
<block type="ISub">illion dollars</block>
```

The new ISubBlocks are then combined and put back into the original document:

```
<block type="ISub">389 million to 406 m</block><block
  type="ISub">illion dollars</block>
```

The resulting content is:

```
<block type="NI"><html><body>
<h1>Company A Earnings statement</h1>
<p>Company A reported earnings of </block><block type="I">354
million dollars</block><block type="NI"> for fiscal year 2010.</p>
<p>Analysts had been looking for earnings of </block><block type=
"ISub">389 million to 406 m</block><block type="ISub">illion
dollars</block><block type="NI"> for fiscal year 2010, but actual
results were </block><block type="I">disappointing.</p>
<p>Decreasing</block><block type="NI"> earnings was the
result of their sales numbers.</p>
</body></html></block>
```

According to an embodiment of the present invention, the SEB method further includes a "transmission stage" wherein each of the SEBs of a plurality of "marked" documents is transmitted to the recipient machines 14a-14n by the document delivery system 10. By dividing each of the "marked" documents into the SEBs, each terminated by SEB tags, all recipient machines 14a-14n may receive impactful information substantially simultaneously, correctly released at the time needed to ensure simultaneous receipt, as determined by the transmission receipt time of an SEB.

One having ordinary skill in the art will appreciate that embodiments of the present invention are not limited to the processing, transmission and receipt of two documents, but any number of documents may be processed in accordance with the methodology set forth above with regard to FIG. 4. Furthermore, several disclosed information packages (e.g., press releases) associated with the plurality of documents and recipient machines 14a-14n can be processed substantially simultaneously according to embodiments of the present invention.

Documents may have multiple sizes based on different encodings and formats. A corresponding IBlock in a document to be received by each of the recipient machines 14a-14n (hereinafter, designated "recipient y" or "recipient yN", where "yN" is an integer), may have different lengths (i.e., number of characters) denoted by L(y). Furthermore, each of the recipients y1-yN has a speed or rate of transmission, denoted R(y), which may vary from IBlock to IBlock and between documents. In order to guarantee substantially simultaneous receipt of impactful SEBs according to the principles outlined in FIG. 4, individual characters or bytes in corresponding IBlocks for each of the recipients y1-yN may be transmitted according to a pacing, handicapping, and timing (PATH) method to be described hereinbelow.

Suppose that a plurality of recipients y1-y4 have been processed in a "marking stage" in accordance with the SEB method of the present invention, and each of the plurality of recipients y1-y4 has a corresponding connection speed and IBlock content length given by Table 2, where all data is in Bytes (B), seconds (s), or Bytes per second (Bps).

TABLE 2

| Recipient (y) | Connection Speed (R(y)) | Content Size (L(y)) |
| --- | --- | --- |
| y1 | 100 Bps | 100 B |
| y2 | 200 Bps | 100 B |
| y3 | 100 Bps | 50 B |
| y4 | 200 Bps | 50 B |

Knowing an IBlock length, the transmission time it takes for a recipient machine 14a-14n to receive a corresponding IBlock from the document delivery system 10, denoted T(y), equal to L(y)/R(y), is given by Table 3:

TABLE 3

| Recipient (y) | Connection Speed (R(y)) | Content Size (L(y)) | Transmit time (T(y)) |
| --- | --- | --- | --- |
| y1 | 100 Bps | 100 B | 1.00 s |
| y2 | 200 Bps | 100 B | 0.50 s |
| y3 | 100 Bps | 50 B | 0.50 s |
| y4 | 200 Bps | 50 B | 0.25 s |

For handicapping and pacing, the slowest T(y) in the recipient list is determined as:

$T = \max\{T(y)\}$ or $T = \max\{L(y)/R(y)\}$

In the present example,
T=1 second.

In a pacing step, the content of an IBlock is "broken up" over T. Recipients that receive larger formatted content may be sent data more frequently, whereas recipients with less formatting may have their data sent less frequently (i.e., spaced out or paced). The formula for pacing is represented as: P(y)=T/L(y), so that the pacing rate P(y) is given for each of the recipients y1-y4 as:

$P(y1) = 1$ second/100 bytes = $\frac{1}{100}$ seconds per byte, or 100 Bps $P(y2) = 1$ second/100 bytes = $\frac{1}{100}$ seconds per byte, or 100 Bps $P(y3) = 1$ second/50 bytes = $\frac{1}{50}$ seconds per Byte, or 50 Bps $P(y4) = 1$ second/50 bytes = $\frac{1}{50}$ seconds per Byte, or 50 Bps and summarized in Table 4 as:

TABLE 4

| Recipient (y) | Connection Speed (R(y)) | Content Size (L(y)) | Transmit time (T(y)) | Pacing (P(y)) |
| --- | --- | --- | --- | --- |
| y1 | 100 Bps | 100 B | 1.00 s | 100 Bps |
| y2 | 200 Bps | 100 B | 0.50 s | 100 Bps |
| y3 | 100 Bps | 50 B | 0.50 s | 50 Bps |
| y4 | 200 Bps | 50 B | 0.25 s | 50 Bps |

To ensure that all of the recipients y1-y4 receive the same amount of data over T, each byte or character in an IBlock is paced. The numbers in Table 5 below represents the time that each byte number is sent to each recipient:

TABLE 5

| Time (ms) | y1 | y2 | y3 | y4 |
|---|---|---|---|---|
| 0 | 1 | 1 | 1 | 1 |
| 10 | 2 | 2 | | |
| 20 | 3 | 3 | 2 | 2 |
| 30 | 4 | 4 | | |
| 40 | 5 | 5 | 3 | 3 |
| 50 | 6 | 6 | | |
| 60 | 7 | 7 | 4 | 4 |
| 70 | 8 | 8 | | |
| 80 | 9 | 9 | 5 | 5 |
| 90 | 10 | 10 | | |
| 100 | 11 | 11 | 6 | 6 |
| 110 | 12 | 12 | | |
| 120 | 13 | 13 | 7 | 7 |
| 130 | 14 | 14 | | |
| 140 | 15 | 15 | 8 | 8 |
| 150 | 16 | 16 | | |
| 160 | 17 | 17 | 9 | 9 |
| 170 | 18 | 18 | | |
| 180 | 19 | 19 | 10 | 10 |
| 190 | 20 | 20 | | | y1 and y2 are sent a byte every 10 ms to achieve data rates of 100 Bps, and y3 and y4 are sent a byte every 20 ms to achieve data rates of 50 Bps. A pacing portion of the PATH method insures that all recipients receive the same amount of data over a maximum transmission time for an IBlock for any one recipient in time T. For example, pacing insures that y1 and y2 receive their specified amount of data in the same amount of time as y3 and y4 over a T of 1 second, rather than y3 and y4 receiving all bytes in the first 0.50 seconds. A person skilled in the art would appreciate that content in a corresponding IBlock for all four recipients is identical semantically. In the example given in Table 5 above, the content of an IBlock for recipients y1 and y2 has more formatting or a larger byte representation than the corresponding IBlock for recipients y3 and y4.

In a handicapping portion of the PATH method, the sending time of each character of a corresponding IBlock is handicapped, or delayed, based on a recipient's connection speed. This insures that all recipients also receive the data at the same time. A handicapping time for each character or byte in an IBlock, H(y), is given by:

$$H(y) = (X \text{ Byte}(T/L(y))) - (1 \text{ B}/(R(y)))$$

or $$H(y) = (X \text{ Byte} * P(y)) - (1 \text{ B}/R(y))$$

$$H(y1) = (1 \text{ B}(1 \text{ s}/100 \text{ B})) - 1 \text{ B}/(100 \text{ B/s}) = 10 \text{ ms} - 10 \text{ ms} = 0 \text{ ms}$$

$$H(y2) = (1 \text{ B}(1 \text{ s}/100 \text{ B})) - 1 \text{ B}/(200 \text{ B/s}) = 10 \text{ ms} - 5 \text{ ms} = 5 \text{ ms}$$

$$H(y3) = (1 \text{ B}(1 \text{ s}/50 \text{ B})) - 1 \text{ B}/(100 \text{ B/s}) = 20 \text{ ms} - 10 \text{ ms} = 10 \text{ ms}$$

$$H(y4) = (1 \text{ B}(1 \text{ s}/50 \text{ B})) - 1 \text{ B}/(200 \text{ B/s}) = 20 \text{ ms} - 5 \text{ ms} = 15 \text{ ms}$$

For each of the recipients, y1-y4, H(y) is given in the current example in Table 6 as:

TABLE 6

| Recipient (y) | Connection Speed (R(y)) | Content Size (L(y)) | Transmit time (T(y)) | Pacing (P(y)) | Handicapping (H(y)) |
|---|---|---|---|---|---|
| y1 | 100 Bps | 100 B | 1.00 s | 100 Bps | 0 ms |
| y2 | 200 Bps | 100 B | 0.50 s | 100 Bps | 5 ms |
| y3 | 100 Bps | 50 B | 0.50 s | 50 Bps | 10 ms |
| y4 | 200 Bps | 50 B | 0.25 s | 50 Bps | 15 ms |

The numbers in Table 7 below represent the time each byte number is sent for each of the recipients, y1-y4.

TABLE 7

| Time (ms) | y1 | y2 | y3 | y4 |
|---|---|---|---|---|
| 0 | 1 | | | |
| 5 | | 1 | | |
| 10 | 2 | | 1 | |
| 15 | | 2 | | 1 |
| 20 | 3 | | | |
| 25 | | 3 | | |
| 30 | 4 | | 2 | |
| 35 | | 4 | | 2 |
| 40 | 5 | | | |
| 45 | | 5 | | |
| 50 | 6 | | 3 | |
| 55 | | 6 | | 3 |
| 60 | 7 | | | |
| 65 | | 7 | | |
| 70 | 8 | | 4 | |
| 75 | | 8 | | 4 |
| 80 | 9 | | | |
| 85 | | 9 | | |
| 90 | 10 | | 5 | |
| 95 | | 10 | | 5 | y1 and y2 are both paced at 100 Bps, so a byte is transmitted every 10 ms. y3 and y4 are both paced at 50 Bps, so a byte is transmitted every 20 ms. y2's connection speed of 200 Bps permits y2 to receive a byte in 5 ms, and y1 in 10 ms at 100 Bps. Using handicapping, y2's byte is sent 5 ms after y1's byte, so that y1 and y2 receive a corresponding byte approximately after 10 ms have passed. The same follows for handicapping y4's higher connection speed.

According to an embodiment of the present invention, the handicapping formula described above may be used to calculate when the first byte of each recipient's corresponding IBlock is to be sent, with a pacing value added for each subsequent byte send time. Alternatively, a byte transmission number (1, 2, 3, etc.) may be assigned to calculate when each byte is sent.

According to an embodiment of the present invention, each of the IBlocks and NIBlocks may be further transmitted in preset units of bytes, or U's, a method herein designated as "unit-by-unit send" (UBUS). The size of a U may be fixed, and may be preset to as few as one byte or as many as 100 bytes or more, depending on document length and transmission speed. In a preferred embodiment, both NIBlocks and IBlocks are sent using U's of the same size, but only IBlocks have each character of their U's further paced and handicapped using the PATH method of the present invention to guarantee substantially simultaneous receipt of IBlocks. FIGS. 7A and 7B show the content of the plaintext document of FIGS. 3C and 3D as a complete marked document 700; divided into individual NIBlocks 705 and IBlocks 710; and further divided into individual U's 715, each U having a size of four (4) bytes. Note that an individual U may have fewer than the designated preset number of bytes, such as the U 720.

According to an embodiment of the present invention, recipient transmissions may be synchronized (SYNCing or SYNC'ed) to ensure recipients are receiving data simultaneously. After either a U or an SEB (i.e., IBlock or NIBlock) of data is transmitted to each recipient, transmission is paused in order to allow each recipient to receive a previously sent U or SEB. SYNCing includes at least one method for detecting when a U or SEB has been transmitted. According to certain embodiments of the present invention, a non-exhaustive list of methods for SYNCing may include the following:

Monitoring a socket for an acknowledgement packet (also referred to as an "ACK"): After a recipient receives data over TCP/IP, the recipient responds with an ACK packet, which includes a sequence number and size in bytes of the data received. The sequence number is unique for each recipient and is used to ensure that the ACK corresponds to the data that was sent. The ACK size contained in the ACK packet contains the number of bytes successfully received. In a preferred embodiment, a received ACK packet should include the sequence number that matches a corresponding sequence number of a packet that was sent to the recipient and the ACK number should match the number of bytes sent to the recipient.

Monitoring a socket send buffer and waiting for it to be empty, which implies that data has been sent: Though this indicates that a U or SEB has been sent, it does not guarantee that the U or SEB was sent successfully. In circumstances where a recipient did not receive a U or SEB, the recipient will not acknowledge receipt and the socket will send the U or SEB again.

After a transmission, the sending machine may wait a specified amount of time for a recipient to respond. This wait period is likely to be two times the connection speed, or the expected Round Trip Time (RTT), plus a percentage for unexpected network latency. One having ordinary skill in the art will appreciate that ACK and RTT are well-known concepts in the electronic communication arts and a part of the "network layer" of transmission code. In certain embodiments of the present invention, ACK's and RTT's are moved "up" the protocol stack to the "application layer" for use by the document delivery system 10 and the recipient machines 14a-14n. After this amount of time has passed, any connections that have not responded with an ACK may be dropped from a simultaneous disclosure group (i.e. a group of the recipient machines 14a-14n, e.g., 14a-14c). This ensures that other recipients are not delayed. Recipients dropped from the simultaneous disclosure group may either be sent an error message or may be pooled into a retransmission group to receive a retransmitted document after the simultaneous disclosure group has been processed. After every recipient has acknowledged receipt or has been dropped, the next round of transmission may begin.

According to an embodiment of the present invention, handicap times and pacing rates employed in the PATH method for transmitting IBlocks may be derived from information stored in ACK packets. The timing information stored in ACK packets permits the calculation of round trip time (RTT) for potentially each U packet. Since many ACKs may be received over the length of a document for substantially the same size packet, common smoothing/averaging algorithms known in the art, an exponential smoothing algorithm, such as preferably, but not limited to a Kalman filter, may be used to calculate an overall average transmission time of a single U packet. Furthermore, the smoothed measurements are used to gate transmission orders that thread (multiplex) multiple electronic information documents over a single channel. The exponential smoothing filter examines a predetermined number of current and previous RTT times and weighs more recent RTT times more heavily than prior RTT times. In addition, according to an embodiment of the present invention, service order among recipient threads may be randomized.

Other methods for calculating the RTT include employing a timer, where the timer is started when a packet is transmitted, and stooped when it is received. Multiple timers may be employed for each packet transmitted, or a timer may be employed periodically or for one packet in each document.

Other methods for smoothing the RTT may be used, such as methods that include the recent history and variability of captured RTTs on the delivery circuit, as well as the knowledge of the routing and network hops used for that circuit.

Furthermore, traceroute may be used in conjunction with the PATH transmission software. The traceroute software permits PATH to determine the ping time of each hop between itself and the recipient. An advanced method for calculating RTT may be used by calculating the average over time of each hop, then adding the averages together to get a total RTT.

According to an embodiment of the present invention, the information distribution system is configured to detect one or more "laggard" machines among the plurality of recipient machines. As used herein, the term "laggard" or "laggard machine" refers to a recipient machine that fails to return an acknowledgment packet to the document delivery system 10 within a period of time referred to as the "acknowledgment threshold." As used herein, the term "acknowledgment threshold" refers to an initially predetermined and potentially subsequent adjustable amount of time in which receipt of the acknowledgment packet must occur. Upon detection of a laggard machine, the identified laggard machine is temporarily dropped from the simultaneous disclosure group, dropped only for the current electronic information document release, to prevent the laggard machine from delaying receipt by any of the other recipients.

Laggards may also be detected and removed from the simultaneous group before a document begins transmission. If a recipient's ping time is above a certain threshold, they may be removed from the simultaneous group. This threshold may be determined by using an exact ping time, such as any recipient with a ping time higher than 50 ms, or it may be determined dynamically, such as any recipient with a ping time higher than 20% above average, or any other method that could be used to determine outliers. Alternatively, a set number of recipients may be removed, such as the slowest five recipients or slowest 5% of recipients.

Machines that appear to be slow by intentionally delaying one way communication, through a modified TCP stack or low level networking device, and thereby falsifying their ping times, also need to be considered. These methods include any mechanism for delaying the receipt or transmission of content from or to the PATH software.

Optionally, the identification of any unusually long ACK response times are retained and used for forensic analysis to compensate sending time delays in addition to the exponential smoothing filter. Logs of all ping, transmission, receipt, and any other time logs may be used for analysis of machines that falsify times. These logs may be analyzed over the course of a time period to detect inconsistencies, such as, but not limited to determining patterns of increased or decreased ping times immediately before a release. Any abnormalities may result in expulsion of that machine from the simultaneous disclosure group until the problem is resolved.

Another method to determine inconsistencies between incoming and outgoing ping times is through the use of ping validation on the client software. The client can send a one way ping to the AMPS software, which would send a ping back to the client along with the first received ping time. The client can then compare the two for inconsistencies between the times and report any abnormalities back to the PATH software. Encryption may be used for transmitting the ping time to the client as well as the test results back to the PATH software to ensure the contents are not tampered with.

Another method for deterring the use of artificially inflated ping times to receive IBlocks faster is via splitting NIBlocks for transmission. If a cheating recipient is expecting alternating NIBlocks and IBlocks, and lowering their ping time in anticipation of receiving an IBlock, the PATH software may surprise and foil cheaters by splitting one or more NIBlocks into two or more parts for transmission. This method permits the PATH software to reduce the effectiveness of a recipient modifying their ping times between types of content.

Implementing traceroute in PATH could also be used to detect cheaters, where the recipient could be considered a cheater if one hop in their route is consistently taking longer than the others, or one hop makes up more than a certain percentage of the total RTT. This permits the PATH software to detect artificial lag in ACK responses created by recipients with a modified IP stack or a low level network repeater with an artificially delayed outgoing response.

Multiple simultaneous groups can be created, where transmission from the second group begins after transmission of the first group completes, either immediately or after a specified amount of time, and so on for the third, fourth, etc., groups. Laggards removed from a simultaneous group can be moved to the next simultaneous group for another transmission attempt, or they can be moved to the individual group after one or a specific number of attempts. The individual group is a group of recipients who have been removed from the simultaneous group or who are not part of the simultaneous group initially. The individual group is transmitted the document after one or all of the simultaneous groups have completed transmission, without using the PATH transmission protocol.

In order to transmit many small uniformly sized packets, e.g., 4 bytes, (i.e., the U's) and calculate a consistent RTT, in a preferred embodiment, Nagle's algorithm is disabled so that the U's may be inserted into individual TCP packets and sent along with whatever header information TCP adds. A person skilled in the art would appreciate that Nagle's algorithm is a feature of TCP which gathers multiple sets of bytes and package them into one packet.

FIGS. 8A and 8B show a process flow illustrating exemplary steps for implementing a "document transmission" stage as it relates to the transmission of a first document and a second document for a "push network," according to an embodiment of the present invention. In Step 800, a recipient list for documents to be transmitted according to the marking method of FIG. 4 corresponding to at least one of the recipients y1-yN is gathered by the document delivery system 10. In Step 805, all of the U's of the first NIBlock for each document are transmitted sequentially to each of the recipients y1-yN from the document delivery system 10 via the "push" network (e.g., the Internet 16 as shown in FIG. 1). In Step 810, at least one acknowledgement packet (e.g., an ACK) from each of the recipients y1-yN is received by the document delivery system 10 for each of the U's transmitted. In Step 815, an RTT is calculated for each of the recipients y1-yN based on a transmission time gathered from the acknowledgement packets associated with each of the recipients y1-yN. In Step 820, a connection speed of each of the recipients y1-yN is calculated and stored in the document delivery system 10. In Step 830, connections for each of the recipients y1-yN are synchronized (i.e. SYNC'ed). In optional Step 835, an average or exponentially smoothed RTT is calculated for each of the recipients y1-yN based on the total number of ACKs received and their corresponding derived RTTs and stored in the document delivery system 10.

In Step 840, each of the U's of the first IBlock (or ISubBlock) of each of the documents 500, 502 are transmitted sequentially to each of the recipients y1-yN from the document delivery system 10 via the "push" network (e.g., the Internet 16 as shown in FIG. 1), according to the PATH method, wherein timing, pacing, and handicapping are based at least in part on the average or exponentially smoothed RTTs gathered in Step 835. In Step 845, at least one acknowledgement packet (e.g., an ACK) from each of the recipients y1-yN is received by the document delivery system 10 for each of the U's transmitted. In Step 850, a transmission speed is calculated for each of the recipients y1-yN based on a transmission time gathered from the acknowledgement packets associated with each of the recipients y1-yN. In Step 865, connections for each of the recipients y1-yN are synchronized (i.e. SYNC'ed). In Step 870, an average or exponentially smoothed RTT is calculated for each of the recipients y1-yN based on the total number of ACKs received and their corresponding derived RTTs and stored in the document delivery system 10. Alternatively, Step 870 may be performed for each successively received U averaged or smoothed with all previously NIBlock or IBlock U's.

In Step 875, if the next SEB to be transmitted is an NIBlock, then in Step 880, Steps 805-835 are repeated, otherwise in Step 885, the next block is an ISubBlock and the previous block was an ISubBlock and Steps 840-870 are repeated. In Step 890, each of the remaining sets of SEBs of each of the corresponding documents is transmitted according to either Steps 875 or 880 until the last set of SEBs is transmitted.

In the context of applying the PATH method of the present invention in terms of U's, handicapping is defined as calculating a transmission delay for each recipient to compensate for different connection speeds. After calculating an RTT time of each recipient, the RTT may be halved (½ RTT) to calculate the transmission time of one U for each recipient. To calculate the handicap for a particular recipient, the longest transmission time (½ RTT) from among all of the recipients is determined and the particular recipient's transmission time (½ RTT) is subtracted. Put another way, each recipient's handicap plus their transmission time is equal to the longest transmission time, ensuring each recipient receives the U at the same time.

In the context of applying the PATH method of the present invention in terms of U's, pacing is define as calculating the frequency of transmission of data for each recipient. Each recipient's data varies in size based on formatting (plaintext vs. HTML vs. XML, etc.). Data may be broken into equally sized U's, and therefore, each recipient has a different number of U's to be transmitted. The total time it takes each recipient to receive all of the U's in their content is calculated to determine the longest transmission time. This is calculated by multiplying the number of each recipients U's by their time to transmit one U, or half of RTT, to calculate an overall time for each recipient, one of which is a longest total transmission time. For each recipient, the longest total transmission time calculated above is divided by each recipient's number of U's to calculate a frequency to transmit U's for each recipient. The result is a time period for each recipient, so one U may be transmitted at each calculated time period for each recipient. Therefore, each recipient is sent a different number of U's at different frequencies, across the same time period as determined by the longest transmission time. Overall, recipients that receive larger sized formatted content (with more U's) will be sent a U more frequently than recipients with smaller formatted content (fewer U's). The smaller format recipients will have their U's transmitted father apart, or paced, since there are fewer U's in their content. The handicapping method may then be applied to each U across pacing to ensure that the last U is received at the same time for each recipient.

FIGS. 9A and 9B show documents x1 and x2, respectively, of the example described above in FIGS. 5A and 5B, respectively, wherein the PATH method has been applied to documents x1 and x2, according to an embodiment of the present invention. FIGS. 10A and 10B show documents x1 and x2 divided into a plurality of SEB blocks after the marking method described in the above example has been applied, according to an embodiment of the present invention. FIGS. 11A and 11B show the SEB blocks of FIGS. 10A and 10B, respectively, designated as impactful and non-impactful blocks according to the marking method of the present invention.

The example described hereinbelow illustrates an implementation of a "document transmission" stage that applies the PATH method to the first NIBlock and IBlock of the electronic documents shown in FIGS. 9A-11B, respectively, according to an embodiment of the present invention. A person skilled in the art would appreciate that the PATH method of the SEB method of the present invention may be applied to subsequent NIBlocks and IBlocks in the same manner as described hereinbelow in a similar fashion.

A block summary for each document x1, x2 of FIGS. 9A-11B is given below in Table 8, indicating block number, block type, the number of characters and bytes in each block, and the number of U's per block, assuming 4 byte/character size U's:

TABLE 8

| Document | Block | Type | Characters | Bytes | U's |
|---|---|---|---|---|---|
| x1 | 1 | NIBlock | 61 | 61 | 16 |
| x1 | 2 | IBlock | 19 | 19 | 5 |
| x1 | 3 | NIBlock | 65 | 65 | 17 |
| x1 | 4 | IBlock | 20 | 20 | 5 |
| x1 | 5 | IIBlock | 14 | 14 | 4 |
| x1 | 6 | NIBlock | 45 | 45 | 12 |
| x1 | 7 | IBlock | 25 | 25 | 7 |
| x1 | 8 | NIBlock | 48 | 48 | 12 |
| x2 | 1 | NIBlock | 84 | 84 | 21 |
| x2 | 2 | IBlock | 19 | 19 | 5 |
| x2 | 3 | NIBlock | 72 | 72 | 18 |
| x2 | 4 | IBlock | 20 | 20 | 5 |
| x2 | 5 | IIBlock | 14 | 14 | 4 |
| x2 | 6 | NIBlock | 45 | 45 | 12 |
| x2 | 7 | IBlock | 32 | 32 | 8 |
| x2 | 8 | NIBlock | 67 | 67 | 17 |

Table 9 lists an example set of recipients y1-y4 in a simultaneous disclosure group, each of which is to receive one of the documents x1, x2 of Table 8:

TABLE 9

| Recipient | Document |
|---|---|
| y1 | x1 |
| y2 | x1 |
| y3 | x2 |
| y4 | x2 |

NIBlocks may be transmitted without any pacing or handicapping. Each U may be sent to the socket of each recipient within microseconds. Nagle's algorithm may be turned off to ensure that packets may each be 36 bytes, including the 4 byte U and 32 bytes of TCP header information. Based on the ACK responses from the packets sent to each recipient, the speed of the connection may be calculated for the 36 byte packets. Each recipient sends an ACK packet for each packet received, which results in a Round Trip Time (RTT) in milliseconds. For each ACK received, the system may store the RTT for each recipient. As more ACKs are received, the system may use the new RTT to calculate an average RTT time across each U in the NIBlock.

One common algorithm for smoothing the RTT across multiple ACKs, as described in W. Richard Stevens, "*TCP/IP Illustrated, Volume 1: The Protocols*," Page 299, is:

$$R \rightarrow xR + (1-x)M,$$

where R is the stored RTT, M is the new measured RTT, and x is a factor between 0 and 1. A person skilled in the art would appreciate that a number of other smoothing algorithms available may be applied, such as exponential smoothing.

For the transmission of IBlocks, IBlocks may be sent with or without pacing, according to certain embodiments of the present invention, followed by handicapping and transmission, according to an embodiment of the present invention. For both non-pacing transmission and pacing transmission, from the RTT time, an estimated time to receive a U may be calculated based on half of the RTT. Since the size of the packet sent and the ACK packet are comparable in size, using the value of half of the RTT for transmission time is substantially accurate for one way transmission speed. Handicapping may be viewed as calculating the delay of each U when the PATH method of the present invention is applicable. Alternatively, handicapping may be viewed in the context of the HAT method of the present invention as delays for sending each of the U's without pacing.

Tables 10 and 11 summarize the transmission of NIBlock 1 of FIGS. 10A-11B:

TABLE 10

| Recipient | Document | Block 1 U Count |
|---|---|---|
| y1 | x1 | 16 |
| y2 | x1 | 16 |
| y3 | x2 | 21 |
| y4 | x2 | 21 |

At time 00:000 (Seconds:Milliseconds), 16 U's are sent to Recipients y1 and y2 and 21 U's are sent to Recipients y3 and y4, respectively. The 4 byte U's are sent to the TCP socket sequentially within milliseconds. RTT for the U's transmitted are summarized in Table 11.

TABLE 11

| Recipient | RTT (ms) |
|---|---|
| y1 | 32 |
| y2 | 12 |
| y3 | 18 |
| y4 | 7 |

For the transmission if IBlock 2 without pacing, the half-RTT time is first calculated. The half-RTT's for IBlock 2 of FIGS. 11A and 11B corresponding to recipients y1-y4 are summarized in Table 12.

Half of the RTT

TABLE 12

| Recipient | RTT (ms) |
|---|---|
| y1 | 16 |
| y2 | 5 |
| y3 | 9 |
| y4 | 3.5 |

Each of the U's of IBlock 2 are sent in sequence to each of the recipients y1-y4 without pacing at time T(y), where T(y)= max{R(y)}−R(y) as summarized in Table 13.

TABLE 13

| Time in ms | y1 | y2 | y3 | y4 |
|---|---|---|---|---|
| 0 | 5 Us | | | |
| 1 | | | | |
| 2 | | | | |
| 3 | | | | |
| 4 | | | | |
| 5 | | | | |
| 6 | | | 5 U's | |
| 7 | | | | |
| 8 | | | | |
| 9 | | | | |
| 10 | | | | |
| 11 | | 5 Us | | |
| 12 | | | | |
| 12.5 | | | | 5 U's |
| 13 | | | | |
| 14 | | | | |
| 15 | | | | |

For the transmission if IBlock 2 without pacing, the Byte rate of transmission may be calculated using the following formula:

$$\left(\frac{B}{\left(\frac{RTT}{2}\right)}\right) \times 1000 \tag{1}$$

For each recipient y1-y4, the following Byte rates are obtained:

$y1=36$ Bytes/(32 ms/2)*1000=2,250 Bps $y2=36$ Bytes/(12 ms/2)*1000=6,000 Bps $y3=36$ Bytes/(18 ms/2)*1000=4,000 Bps $y4=36$ Bytes/(7 ms/2)*1000=10,286 Bps To convert these rates to U's per second, the rates are divided by 36 Bytes to obtain:

$y1=2,250$ Bps/36 Bytes per U=62.5 Ups $y2=6,000$ Bps/36 Bytes per U=166.7 Ups $y3=4,000$ Bps/36 Bytes per U=111.1 Ups $y4=10,286$ Bps/36 Bytes per U=285.7 Ups As a result, the estimated time for each recipient T(y) to receive their IBlock at the Byte rate is as follows:

$T(y1)=5$ U/62.5 Ups=0.080 s=80 ms $T(y2)=5$ U/166.7 Ups=0.030 s=30 ms $T(y3)=5$ U/111.1 Ups=0.045 s=45 ms $T(y4)=5$ U/285.7 Ups=0.017 s=17 ms

The longest time for any one recipient to receive IBlock 2 (T) may be calculate as:

$T=\max\{t(y)\}=80$ ms

The formula for Pacing may be represented as:

$$P(y) \rightarrow \frac{T}{L(y)} \tag{2}$$

When applied to each of the recipients y1-y4, the time for each U to be sent is calculated as:

$P(y1)=80$ ms/5 U=16 ms per U or 1 U/16 ms $P(y2)=80$ ms/5 U=16 ms per U or 1 U/16 ms $P(y3)=80$ ms/5 U=16 ms per U or 1 U/16 ms $P(y4)=80$ ms/5 U=16 ms per U or 1 U/16 ms and summarized in Table 14:

TABLE 14

| Recipient (y) | Connection Speed (R(y)) | Content Size (L(y)) | Transmit time (T(y)) | Pacing (P(y)) |
|---|---|---|---|---|
| y1 | 1 U/16 ms | 5 U | 80 ms | 1 U/16 ms |
| y2 | 1 U/5 ms | 5 U | 30 ms | 1 U/16 ms |
| y3 | 1 U/9 ms | 5 U | 45 ms | 1 U/16 ms |
| y4 | 1 U/3.5 ms | 5 U | 17 ms | 1 U/16 ms |

To ensure each recipient receives the same amount of data, 1 U is sent to each of the recipients y1-y4 every 16 ms at times 00:000, 00:015, 00:031, 00:047 respectively.

The formula for Handicapping may be represented as:

$$\left(\frac{1U}{R(y)}\right) \tag{2}$$

When applied to each of the recipients y1-y4, the handicap time for each of the recipients y1-y4 is summarized in Table 15:

TABLE 15

| Recipient (y) | Handicap (H(y)) |
|---|---|
| y1 | 16 ms |
| y2 | 5 ms |
| y3 | 9 ms |
| y4 | 3.5 ms |

To calculate the start time for each U, the following formula may be applied where n is the number U to transmit:

$$\left(nU \times \frac{T(y)}{L(y)}\right) - \left(\frac{1U}{R(y)}\right) \tag{3}$$

The first U for each recipient may be sent at times summarized in Table 16.

TABLE 16

| Recipient (y) | Pacing (P(y)) | Handicap (H(y)) | Start Time |
|---|---|---|---|
| y1 | 16 ms | 16 ms | 0 ms |
| y2 | 16 ms | 5 ms | 11 ms |
| y3 | 16 ms | 9 ms | 7 ms |
| y4 | 16 ms | 3.5 ms | 12.5 ms |

After the initial start time, each subsequent U is sent to each recipient 16 ms after the previous U has been sent, resulting in the following send time of each U for each recipient as summarized in Table 17.

TABLE 17

| Recipient (y) | U 1 | U 2 | U 3 | U 4 | U 5 |
|---|---|---|---|---|---|
| y1 | 0 ms | 16 ms | 32 ms | 48 ms | 64 ms |
| y2 | 11 ms | 27 ms | 43 ms | 59 ms | 75 ms |
| y3 | 7 ms | 23 ms | 39 ms | 55 ms | 71 ms |
| y4 | 12.5 ms | 28.5 ms | 44.5 ms | 60.5 ms | 76.5 ms |

The overall transmission of U's for the IBlock 2 for each of the recipients y1-y4 is summarized in Table 18.

TABLE 18

| Time in ms | y1 | y2 | y3 | y4 |
|---|---|---|---|---|
| 0 | 1 U | | | |
| 1 | | | | |
| 2 | | | | |
| 3 | | | | |
| 4 | | | | |
| 5 | | | | |
| 6 | | | 1 U | |
| 7 | | | | |
| 8 | | | | |
| 9 | | | | |
| 10 | | | | |
| 11 | | 1 U | | |
| 12 | | | | |
| 12.5 | | | | 1 U |
| 13 | | | | |
| 14 | | | | |
| 15 | | | | |
| 16 | 1 U | | | |
| 17 | | | | |
| 18 | | | | |
| 19 | | | | |
| 20 | | | | |
| 21 | | | | |
| 22 | | | 1 U | |
| 23 | | | | |
| 24 | | | | |
| 25 | | | | |
| 26 | | | | |
| 27 | | 1 U | | |
| 28 | | | | |
| 28.5 | | | | 5 U's |
| 29 | | | | |
| 30 | | | | |
| 31 | | | | |
| 32 | 1 U | | | |
| 33 | | | | |
| 34 | | | | |
| 35 | | | | |
| 36 | | | | |
| 37 | | | | |
| 38 | | | 1 U | |
| 39 | | | | |
| 40 | | | | |
| 41 | | | | |
| 42 | | | | |
| 43 | | 1 U | | |
| 44 | | | | |
| 44.5 | | | | 1 U |
| 45 | | | | |
| 46 | | | | |
| 47 | | | | |
| 48 | 1 U | | | |
| 49 | | | | |
| 50 | | | | |
| 51 | | | | |
| 52 | | | | |
| 53 | | | | |
| 54 | | | 1 U | |
| 55 | | | | |
| 56 | | | | |
| 57 | | | | |
| 58 | | | | |
| 59 | | 1 U | | |
| 60 | | | | |
| 60.5 | | | | 1 U |
| 61 | | | | |
| 62 | | | | |
| 63 | | | | |
| 64 | 1 U | | | |
| 65 | | | | |
| 66 | | | | |
| 67 | | | | |
| 68 | | | | |
| 69 | | | | |
| 70 | | | 1 U | |
| 71 | | | | |
| 72 | | | | |
| 73 | | | | |
| 74 | | | | |
| 75 | | 1 U | | |
| 76 | | | | |
| 76.5 | | | | 1 U |
| 77 | | | | |
| 78 | | | | |
| 79 | | | | |

After all of the U's are transmitted, the system waits for all of the ACKs to be received in the process known as SYNC'ing described above. An initial maximum wait time may be set, e.g. 100 ms, for each of the recipient y1-y4 first ACK to be received. If no ACK's are received within that time from a recipient, that recipient may be removed from the simultaneous disclosure group. The recipient may then be placed into a subsequent simultaneous disclosure group or the individual group. In a preferred embodiment, if an ACK is received from a given recipient, the system may wait up to twice the RTT time from the previous ACK for the next ACK to be received from that recipient. A person skilled in the art would appreciate that this is a common time out period used by TCP.

In the present example, if one or more ACK's are received at 8 ms, the system will wait up to 16 ms, or 8 additional ms, for more ACKs. If another ACK is received after 12 ms, then the system will wait up to 24 ms, or 12 more ms.

To reduce the delay of steadily increasing ACK receipts, the system may remove recipients from a simultaneous disclosure group if ACK RTT time reaches the original timeout of 100 ms.

In a preferred embodiment, SYNC'ing may be applied at the end of each NIBlock, IBlock, and SubIBlock. In another embodiment, SYNC'ing may also be applied between each U transmission in an IBlock during transmission.

According to a preferred embodiment of the present invention, a document to be transmitted to a plurality of recipients y1-yN, each having different formats may first be retrieved from the database or other non-volatile memory or received over the Internet 16 in plaintext or any other format, and then reformatted in RAM according to previously stored preferences of each of the recipients y1-yN. The SEB/PATH method may then be applied entirely "on the fly", wherein the marking stage and the transmission stage are both performed in RAM. According to another embodiment of the present invention, the documents may be preformatted and stored in the database or received over the Internet 16, marked according to the SEB/PATH method in RAM, and transmitted in RAM. According to still another embodiment of the present invention, both the formatting and marking stages may be performed off-line in a database, etc., and the transmission stage performed in RAM. A person skilled in the art would appreciate that any combination of the formatting and marking stages may be performed off-line or at the same time as the transmission stage of the SEB/PATH method of the present invention, without departing from the goal of guaranteeing substantially simultaneous receipt of impactful information.

According to an embodiment of the present invention, to insure simultaneous disclosure of press releases/documents for "pull" recipients over a "pull" network, such as a plurality of recipients making requests from and receiving impactful information delivered to their Web browsers, the requests of recipients may be "pooled" into one or more simultaneous disclosure groups for which one or more documents in a desired format may be released at a predetermined later time using the SEB/PATH method of the present invention. Referring again to FIGS. 2A-2D, if a document is scheduled to be released, the Web server 30 may be customized to begin pooling requests for a set time period before and/or after a release date and time. For instance, for a scheduled 10:00 AM document to be released, the Web server software module 38 may begin pooling requests at 9:59:59.900 AM (Hours:Minutes:Seconds.Milliseconds) and finish pooling requests at 10:00:00.099 AM. The Web server software module 38 may then pass the pooled recipients to the PATH server software module 42 (integrated or layered) for processing the document according to the SEB/PATH method. The Web server software module 38 may continue to pool requests from 10:00:00.100 AM and onward while the document is being processed by the PATH server software module 42 into a second simultaneous disclosure group. After the first group is finished processing, the Web server software module 38 may send the second group to the PATH server software module 42 to be processed according to the SEB/PATH method.

This simultaneous disclosure "mode" may continue until a specified time has elapsed when the document is no longer considered time-critical. After this time, the Web server software module 38 may begin processing requests in a "pull" fashion.

FIG. 12 show a simplified process flow illustrating exemplary steps for implementing an "SEB method" stage as it relates to the transmission of at least one document in a plurality of formats for a corresponding plurality of "pull" recipients, according to an embodiment of the present invention. Referring now to FIGS. 2A-2D and 12, in Step 1200, the Web server software module 38 receives requests from a plurality of recipients y1-yN for at least one document. In Step 1205, the Web server software module 38 pools the requests into a recipient list constituting at least one simultaneous disclosure group for documents to be transmitted according to the "marking stage" of the SEB method of FIG. 4, corresponding to at least one of the recipients y1-yN. In step 1210, after at least one simultaneous disclosure group is ready to be formatted/transmitted, typically determined by a certain amount of time allowed for requests or a maximum predetermined number of recipients, the recipient list, along with any information about the request such as document type, is passed to the PATH server software module 42 for processing according to the "transmission stage" of the SEB/PATH method of the present invention.

There may be multiple Web server software modules 38 handling different types of requests in which respective recipient lists are forwarded to one or more PATH server software modules 42 substantially simultaneously. The Web server software module 38 in any given Web server 30 may limit its number of requests. As a result, the document delivery system 10 may divide one simultaneous disclosure group into a plurality of simultaneous disclosure groups.

If there are "push" recipients, the document delivery system 10 may combine the recipient lists from each Web server 30 with the recipient list stored in a database table or a flat file in the database 15. The document delivery system 10 may need to store attributes associated with each recipient in a list so that the document delivery system 10 is configured to handle each type of recipient. One exemplary solution is to store for each recipient a flag attribute which may be either be a letter or number indicating the type of transmission (e.g., P for push, H for HTTP pull, F for FTP pull, etc). There may also be one or more additional attributes for storing information such as, but not limited to, a recipient address, socket connection information, or any other details necessary for transmission. One common method for maintaining information about recipients would be to create a recipient object or structure, which may contain information about the recipient, including, but not limited to: a unique recipient number, the type of transmission, an IP address, or socket description or identifier, and the type of document being transmitted.

In step 1215, the PATH server software module 42 processes one or more documents for transmission according to the PATH method of the present invention as indicated in FIGS. 8A and 8B according to a "marking stage" described hereinabove. The PATH server software module 42 divides the one or more documents to be transmitted into SEB Blocks (i.e., NIBlocks and IBlocks). The PATH server software module 42 may perform this task before it receives a simultaneous disclosure group (list) if the one or more documents were made available to the PATH server software module 42 before release time. The one or more documents may also have been processed from a previous simultaneous disclosure group if the current simultaneous group is a secondary or tertiary group. After the one or more documents are processed, the PATH server software module 42 assigns each recipient a document type depending on their type of connection (e.g., a "push" or "pull" request and other information that may be passed in with the request, e.g., an HTTP request typically requests an HTML formatted document, but may request XML formatted document).

In Step 1220, the PATH server software module 42 transmits NIBlocks and IBlocks to one or more Web server software modules 38 of one or more Web servers 30 according to the PATH method of the present invention as indicated in FIGS. 8A and 8B, according to a "transmission stage" described hereinabove. In Step 1225, the one or more Web Servers 30 forwards NIBlocks and IBlocks to at least one recipient based on each recipient's attribute information. More particularly, Web server ("pull") requests may be sent back to the Web server 30 that handled the request for transmission, and "push" requests may be sent to the daemon handling transmission for "push" recipients. Each of the NIBlocks and IBlocks may then transmit to the at least one recipient through their respective socket.

FIG. 13 is a process flow illustrating the exemplary steps of FIG. 12 in greater detail, with emphasis on the flow of data between the Web server software modules 38 and the PATH server software module 42, according to an embodiment of the present invention. FIG. 13 further exemplifies the combination hardware/software configuration of FIG. 2B or 2D, wherein the PATH server software module 42 is layered on top of the Web server software modules 38. Before detailing the process flow of FIG. 13, presented herein are definitions of sub-component software modules within the Web server software modules 38 and the PATH server software module 42, as well as data flow elements, documents to be transmitted, and the Internet.

The PATH server software module 42 includes the SEB/PATH protocols/methods. Its primary purposes are for (1) handling document management, including formatting and blocking, (2) managing the recipient list, including assigning documents to each recipient, and (3) transmitting data to each recipient, including applying the PATH protocol to the transmission of IBlocks. Some secondary tasks include (1) receiving documents from a document feeder or other type of content distribution method, (2) managing the timing of document releases and notifying the Web Server software module 38 when documents are available, and (3) managing recipients from different sources, including Web server "pull" and "push" recipients.

The Web Server software module 38 is responsible for listening for HTTP requests for documents that are released by the PATH server software module 42. The Web Server software module 38 includes a PATH Software Interface 1310 and a connection pool 1316 that holds connections from HTTP requests.

A Press Release 1303 is a document to be distributed substantially simultaneously with other documents. It is pushed to the Web Server software module 38 with attributes such as time of release, which may be immediately or in the future.

A Document Receiver 1304 is a portion of the PATH server software module 42 that received documents. Typically this would be a TCP/IP socket listening for connections from other servers pushing documents. It may also represent an FTP connection, where servers are pushing files to an FTP folder and the Document Receiver 1304 is waiting for the document to be released.

A Document Manager 1306 is responsible for managing each document's release time. The Document Manager 1306 comprises a Document Store 1307 and a timer to manage when a document is to be released. The Document Manager also contains an On_Document_Available( ) function 1308 and is responsible for passing the document to the Document Parser at the appropriate time for release.

The Document Store 1307 is a location where the Document Manager 1306 stores documents if the documents are not ready for release. The storage method employed in the Document Store 1307 may include a database or flat file, and may include an indexing method for a document and the time a document is to be released.

An On_Document_Available( ) function 1308 is a method of the Document Manager 1306 invoked to coordinate tasks when a document reaches its release time. An The On_Document_Available( ) function 1308 is responsible for, but it not limited to, notifying a Connection Pool Enabler 1311 that a document is available, and passing the document to the Document Parser 1321.

The PATH Software Interface 1310 is a portion of a customized Web Server 30 that communicated with the PATH server software module 42 in a layered model. Its primary purpose is to communicate with the PATH server software module 42 and Web Server software module 38, including the Connection Pool Enabler 1311 and a Connection Manager 1317. Note: in an integrated model as depicted in FIGS. 2A and 2C, the PATH Software Interface 1310 may include all of the PATH server software module 42 functions and no longer be an interface, becoming the PATH server software module 42 itself. Also, some of the PATH Software Interface functions may be combined with PATH Server Software module functions, since the functionality of the PATH Software Interface 1310 becomes redundant as a result of serving only as an intermediary between the PATH server software module 42 and Web Server software module 38.

The Connection Pool Enabler 1311 listens for a notification from the Document Manager 1310 that a document is available. When a document is available, the Connection Pool Enabler 1311 informs the Web Server software module 38 to begin pooling connections. After a predetermined amount of time has passed, the Connection Pool Enabler 1311 informs the Connection Manager 1317 to pass a recipient list from the Connection Pool 1316 to a Recipient Manager 1320 in the PATH server software module 42. The Connection Pool Enabler 1311 also controls pooling for additional requests and controls when a document is no longer sensitive and may be served by the Web Server software module 38 in a fashion not requiring simultaneous disclosure. The time at which a document becomes no longer sensitive may be a predefined default time stored in the Web Server software module 38, or it can be input by a user through a user interface (not shown) from the Document Manager 1306.

The TCP/IP Connections 1314 in the Web Server software module 38 are the socket connections created from HTTP requests. These are the connections for one or more documents to be pushed back to a Web browser when the one or more documents are made available by the PATH server software module 42.

The Connection Pool 1316 is a portion of the Web Server software module 38 that holds open HTTP request connections and pools them into a group.

The Connection Manager 1317 is an interface between both the Connection Pool 1316 and TCP/IP Connections 1314 of the Web Server software module 38 and both a Recipient Manager 1320 and a PATH Protocol Broadcaster 1322 of the PATH server software module 42.

The Recipient Manager 1320 of the PATH server software module 42 receives the recipient list from the Connection Manager 1317 and builds a simultaneous disclosure group, combing push recipients and other Web server pull recipients if implemented. It the takes the recipient list, assigns documents received from the Document Parser 1321, and passes the recipient list, documents, and document assignments to a PATH Protocol Broadcaster 1322.

The Document Parser 1321 receives a document from the Document Manager 1306 and creates SEBs for each document format based on the SEB protocol. It then passes all of the formatted SEBs to the Recipient Manager 1320.

The PATH Protocol Broadcaster 1322 takes the documents and recipients and applied the PATH protocol to transmission of the SEBs. It transmits SEBs to the Connection 1317 Manager for forwarding to the TCP/IP Connections 1314.

Returning to the particular process flow steps of FIG. 13, the press release 1303 is made available to the PATH server software module 42. The press release 1303 is either a timed release (i.e., it is set to be released at a specific time in the future), or it is for immediate release. The press release 1303 is received by the Document Receiver 1304 within the PATH server software module 42. The Document Receiver 1303 passes the received press release 1305 to the Document Manager 1306, which stores the press release 1303 in the Document Store 1307. The Document Manager 1306 determines if the press release 1305 is destined for immediate release. If it is a timed release, the Document Manager 1306 waits until a specified time, e.g., 500 milliseconds, prior to a predetermined release time, before it calls the On_Document_Available( ) function 1308. If it is not a timed release, the Document Manager 1306 calls the On_Document_Available( ) function 1308 immediately.

The On_Document_Available( ) function 1308 communicates 1309 with the PATH Software Interface 1310 in the Web Server software module 38. The Connection Pool Enabler 1311 of the PATH Software Interface 1310 is notified that the Web Server software module 38 may begin pooling HTTP requests 1312 from users on the Internet 1313. The TCP/IP Connections 1314 from the HTTP requests 1312 are passed 1315 to the Connection Pool 1316.

After the press release 1305 is received by the Document Manager 1306, either immediately or after the predetermined release time passes, the Document Manager 1306 passes the press release 1305 from the Document Store 1307 to the Document Parser 1321. The Document Parser 1321 formats the press release 1305 into one or more of a variety of formats and parses the document into SEBs. All of the formatted documents are then passed to the Recipient Manager 1320.

After a predetermined amount of time for receiving HTTP Requests 1312, e.g., 100 ms, the Connection Pool Enabler 1311 informs the Connection Manager 1317 to collect the recipients 1318 in the Connection Pool 1316 into a recipient list and pass 1319 the recipient list to the Recipient Manager 1320 in the PATH server software module 42.

The Recipient Manager 1320 assigns document formats to each recipient in the recipient list. The document formats, recipients, and document assignments are passed to the PATH Protocol Broadcaster 1322.

The PATH Protocol Broadcaster 1322 performs the transmission of NIBlocks and IBlocks according to the PATH protocol and forwards document data 1323 to the Connection Manager 1317, which forwards the document data back through the TCP/IP Connections 1314 to the requesting Web browsers 1313.

Referring again to FIGS. 2A-2D and 12, as discussed above, the present invention contemplates employing multiple Web server software modules 38 handling different types of requests in which respective recipient lists are forwarded to one or more PATH server software modules 42 substantially simultaneously. According to an embodiment of the present invention, the PATH server software module 42 may be implemented and synchronized across multiple networked PATH servers while still ensuring that all recipients receive content substantially simultaneously. In such circumstances, each networked PATH server would both transmit content to its own list of recipients using the PATH method, and possibly (depending on the synchronization method used) and maintain a global list of all recipients being served by all the networked PATH servers. As a result, long transmission times that may result from using only a single server to serve a widely-geographically-dispersed set of recipients may be reduced.

In a networked multiple PATH server implementation, synchronization between PATH servers is needed to ensure transmission begins at the same time across each of the PATH server. One method of synchronization across multiple networked PATH servers is to employ a "head-start" transmission time for the content as a whole to be delivered to each of the PATH servers (but not to any recipients) before a release time to the recipients associated with each of the PATH servers. This ensures that each PATH server has received the content prior to a commencement of transmission to each of its respective recipients at a release time. For instance, if the content contains a publish time of 08:00:00 AM, the content source would send the content to each PATH server at 7:59:30 AM. The difference in the transmission "head-start" time and the publish time needs to be large enough to ensure that each PATH server receives the content before it must be transmitted. The clocks of all involved PATH servers need also to be synchronized to ensure transmission across the PATH servers starts at substantially the same time.

According to an embodiment of the present invention, a second method of synchronization across multiple networked PATH servers is to designate one of the PATH servers as a "master" PATH server and the remainder of the PATH servers as "slave" PATH servers with respect to transmission of content as a whole (i.e., without dividing the content into SEBs) from the "master" PATH server to the "slave" PATH servers. The master PATH server is configured to receive the content to be transmitted to a plurality of recipients from a content source server (not shown). The master PATH server transmits the document to the slave PATH servers using pacing and handicapping of the document as a whole. When each slave PATH server receives the last byte of the content substantially simultaneously, each of the slave PATH servers, in turn, formats and divides the document into SEBs according to the marking method described hereinabove, and then transmits SEBs according to the transmission method described above with respect to transmission, handicapping, and pacing of IBlocks to each of their recipients.

An aspect worth careful consideration with respect to the implementation of PATH across multiple servers is the synchronization of maximum ping time across multiple PATH instances. Each of the slave PATH servers is not only required to transmit based on a maximum handicap time across all of their own recipients, but also with respect to the longest handicap time across all of the recipients associated with each of the slave path servers that are to receive the same document. One method to accomplish this, using the master/slave PATH implementation, is to employ a first modified version of the PATH server software module 42 on the master PATH server and a second modified version of the PATH server software module 42 on each of the slave PATH servers. The modified slave PATH server software module is adapted to maintain a list of ping times for each of its recipients, as used in the PATH method described hereinabove to calculate handicap times. The modified slave PATH server software module is also adapted to periodically transmit the ping data associated with each of its recipients back to the master PATH server, either in a form an entire ping list or only a maximum ping time. The master PATH server thus maintains a global list of ping times or maximum ping time for each slave PATH server. The master PATH server then calculates a master maximum ping time among of all ping times among all of the slave PATH servers. This master maximum ping time is then transmitted periodically back to each slave PATH server, or transmitted at the time content is transmitted. Each slave PATH server then calculates a handicap for each of its recipients based on the master ping time.

According to an embodiment of the present invention, another method for synchronizing maximum ping time across all of the slave PATH servers is via the use of a database. In such circumstances, there is no "master" PATH server, but a plurality of "peer" PATH servers and a central database server. Each peer PATH server software module 42 may be configured to coordinate ping times with other peer PATH servers. This typically would be implemented with a database server, wherein each peer PATH server updates the central database server with the ping times of each recipient, then queries a table maintained by the database server that contains ping data associated with all of the peer PATH servers to retrieve a maximum ping time. The database may be queried periodically to update the locally stored maximum ping time of each of the peers PATH servers, or it may be queried before transmitting each document.

According to an embodiment of the present invention, another method for synchronizing maximum ping time across all of the slave PATH servers is for a database to be associated with each of the peer PATH servers. The peer PATH servers may periodically exchange database ping tables/maximum ping times with each other. In such circumstances, each of the peer PATH servers merely queries its local database to obtain the maximum ping.

A person skilled in the art would appreciate that other methods may be envisioned for transmitting ping times between slave/peer PATH servers, such as, but not limited to, transmitting flat files, using a Web service to retrieve maximum ping times from a centralized server, etc.

In such circumstances wherein a master PATH server/slave-peer PATH server/database server or a path therebetween fails, slave/peer PATH servers may connect to other slave PATH servers to retrieve ping time data and/or receive content. The connection between the master and slave PATH servers may be a dedicated or VPN connection to each slave PATH server. If a link between the master PATH server and a slave PATH server becomes unavailable, the slave PATH server may connect to a different slave PATH server to receive content. In this circumstance, the reconnecting slave PATH server may or may not apply PATH to transmission since the disclosure period has passed.

Slave PATH servers may be implemented in any part of the world, may be designed to handle any number of documents, and may have any number of recipients.

Certain embodiments of the present invention may be modified to work in conjunction with other methods of simultaneous disclosure, including an encryption method disclosed in the '245 patent. Handicapping in this case would be determined by the RTTs from ACK packets received after sending encrypted content.

One method for providing action markup that complies with Reg. FD is to include action markup in a method that already complies with Reg. FD. The SEB/PATH method, as described hereinabove, may be modified to include action markup. The PATH method inherently ensures that each recipient receives impactful information, such as current earnings statements, substantially simultaneously. After every recipient has been guaranteed receipt of an impactful data block, or IBlock, via the SYNC'ing within the SEB/PATH method, then it is "fair" to provide an action to at least one recipient. Such a method is Reg. FD compliant because all recipients have already received impactful information, and each recipient has a fair opportunity to act upon it. By placing an action markup after an IBlock, simultaneous disclosure is still assured for all impactful data.

According to an embodiment of the present invention, the "marking stage" of the SEB/PATH method would be modified to accommodate action markup by including an element identifier, a condition, and a message in addition to the encoding described above for demarcating impactful elements. Other optional attributes that may be associated with the action markup may include, but are not limited to, user identification information, company information, and applicable date filters.

An "element identifier" is a name corresponding to an "impactful data element" described above, which may indicate the type of impactful data element, such as verbal description, e.g., "current_earnings", or a number reference. Element identifiers throughout a document should be unique. If an element identifier appears more than once in a document, the remaining action markup attributes (e.g., the "condition" and the "message") may be placed only once after the first instance of the impactful data elements having the same identifier, or, alternatively each instance may contain the full set of attributes of an "action markup." Typically, the "element identifier" matches the name of the element tagged in the document, though this is not required.

The "condition" comprises two parts: a "target value" and a "comparison." A "target value" is identified primarily, though not exclusively, by the recipient, which is typically a dollar amount or a number. The "target value" is acted upon by the "comparison." Examples of comparison elements include, but are not limited to, less than, greater than, equal to, etc. The format of the "condition" attribute is determined and interpreted by the PATH client software (i.e., the PATH server software module 42 of FIGS. 2A-2D, 12, and 13). The "condition" may include a complete text description, such as "less than 1,750,000 million dollars", or it may be simplified to something like "LT 1.75M". The "condition" is formatted after the recipient enters their "action markup information" via a "trader interface" to be described hereinbelow with respect to FIG. 14.

For each "condition," the recipient specifies a "message" to be transmitted in their received document if the "condition" is met. The "message" is usually related to the stock market, such as buying or selling stock, but may include other messages such as a reminder to call someone on the phone, making a note of the company for future research, or other key words to be recognized by their client software.

The action markup may include other information (i.e., attributes) used by the PATH server software module 42, such as user identification information, company information, and date filters. Some attributes may be automatically created from the "trader interface", such as the user identification information, which may be taken from the "trader interface", after the recipient has logged in. Other optional attributes may include a company and date information, also enterable via the "trader interface". The company and date information may be used to determine which documents to be sent to the recipient have an embedded action markup.

Since a document may have multiple IBlocks, a document may contain multiple types of action markups. Similarly, a document may contain multiple action markups for the same "impactful data element" or IBlock that may comprise combinations of "conditions" and "messages." For example, when comparing an earnings statement element to a target value of $450,000, two "action markups" may be created for the earnings statement, e.g., (1) if the earnings statement is less than $450,000, set the action "message" to "sell", and (2) if the earnings statement is greater than or equal to $450,000, set the action "message" to "buy".

A document is modified to include at least one action markup during the "marking stage" of the SEB/PATH method during or just after the identification of "impactful data elements" that may require an action on the part of a recipient but before the document is divided into SEBs, such as, but not limited to earnings statements, sales figures, dollar values etc. An impactful data element that is to include an action markup may be delimited by tags which are placed directly into the document surrounding the element. For example, an impactful data element having an associated action markup that is indicative of an earnings statement may be formatted as follows:

---

Company A's earnings were <earnings>1.5 million for fiscal year 2009</earnings>.

---

The above content may then be broken into SEBs, wherein the entire earnings element may be placed into an IBlock based on pattern matching, such as:

---

Company A's earnings were <IBlock><earnings>1.5 million for fiscal year 2009</earnings></IBlock>. Analysts had been looking for earnings...

The tag for an action markup may be combined into an attribute of an IBlock tag if the IBlock has been identified first via pattern matching. After the blocks are tagged, the IBlocks may be searched for the target element and the IBlock tag may be modified to include the attribute, such as:

---

Company A's earnings were <IBlock type="earnings">1.5 million for fiscal year 2009</IBlock>. Analysts had been looking for earnings...

---

An action markup tag is preferably an XML style tag, but may be any other style tag which may contain attributes, such as HTML. The attributes of the tag may include, but are not limited to, the element identifier, condition, and action message. An example of an XML style tag including an action markup is as follows:

<action element="earnings" condition="LT 1,750,000" message="sell" />

In the above example, the name of the tag is "action", the element identifier attribute is "earnings", the condition attribute is "LT 1,750,000", which represents "Less Than 1,750,000", and the action message attribute is "sell".

After an IBlock has been tagged as an element, the action markup may be placed into the document following the tagged IBlock and just after the beginning of the subsequent NIBlock using "Markup Method 1", according to an embodiment of the present invention, such as:

---

Company A's earnings were <IBlock type="earnings">1.5 million for fiscal year 2009</IBlock><NIBlock><Action Element="earnings" Condition="LT 1,750,000" Message="sell" />. Analysts had been looking for earnings...

---

A second markup method (i.e., "Markup Method 2") may include the action markup tags between the IBlock and following NIBlock, such as:

---

Company A's earnings were <IBlock type="earnings">1.5 million for fiscal year 2009</IBlock><Action Element="earnings" condition="LT 1,750,000" message="sell" /><NIBlock>. Analysts had been looking for earnings...

---

Alternatively, the action markup may be placed before the IBlock if it does not contain any material which may help in determining the IBlock material. For instance, the following content may be placed at the beginning of the first NIBlock or at the end of the NIBlock preceding the relevant IBlock:

---

<Action Element="earnings" condition="LT 1,750,000" if_message="sell" else_message="buy" />

---

In the above example, the action element is included independently of the IBlock content, and the action markup contains two messages, one to be used if the condition is met, the other to be used if the condition is not met. The PATH software would insert this action markup based on the present IBlock, but would not perform any conditional processing. The recipient software would then process the action markup after the IBlock is received, determining which condition is met and perform any other processing as indicated by the message.

Alternatively, the client could already have a database or local storage mechanism for storing action markup rules and conditions. These rules and conditions can be maintained locally and edited before a press release is expected to arrive. When a marked up IBlock arrives, such as an earnings release, the client software can refer to the local storage to determine the appropriate action based on the IBlock content and the condition. The method eliminates the server side processing and permits the recipient to maintain their action conditions more efficiently.

An action markup may be entered for inclusion into a document for transmission via, for example, a "trader interface". The "trader interface" may include, but is not limited to, a Web interface that allows traders to authenticate their identity and enter one or more action markups for a particular element of a press release. Other forms of entry of action markups may include manual communication through a help desk via phone, fax, or email to help desk staff, who may then enter the action markup(s) into the PATH software directly or through a "trader interface". Another example of method for entering action markup(s) would be via client software on a trader's machine that transmits the action markup(s) to the PATH server software module 42.

FIG. 14 is an exemplary Web page version of a "trader interface", according to an embodiment of the present invention. The "trader interface" Web page 1400 may include an entry field 1405 for entering the name of a company from which an intended recipient may be expecting to receive a press release. The "trader interface" 1400 may also include a plurality of radio buttons 1410 corresponding to the type of expected element, such as current_earnings. The "trader interface" 1400 may also allow the user to enter a condition 1415 and a target value 1420 for the element, such as "Less Than 1,200,000." The final part of the "trader interface" 1400 allows the user to set the action 1425 they would like to receive if the condition is met, including an optional entry box 1430 for an "other" type action not already listed in the action radio buttons 1425.

Referring again to FIG. 13, after the user submits action markup information via the "trader interface" 1400, the information is placed by the PATH server software module 42 into a database table within Action Markup Storage (not shown). An example of such a database table is shown in Table 19 as follows:

TABLE 19

| Field Name | Field Type |
|---|---|
| UserID | integer |
| Company | text |
| Element | text |
| Condition | text |
| Action | text |

An example of a record stored in the database for a trader identified by a "UserID" is shown in Table 20 as follows:

TABLE 20

| UserID | Company | Element | Condition | Action |
|---|---|---|---|---|
| 00012 | IBM | current_earnings | LT_350000 | Sell |

During the "marking phase" of the SEB/PATH method, the PATH server software module 42 divides a document into SEBs to be transmitted as described above, except when an IBlocks contains an "element". In such circumstances, the IBlock is compared to certain patterns with a pattern matching method having natural language processing algorithms to determine the context of the IBlock. The natural language processing algorithms allow the PATH server software module 42 to recognize the context around the IBlock. If a document were to contain the statement, e.g.: "Earnings for the year 2009 were 2.5 million dollars", the natural language processing method would determine that the leading part of the statement "Earnings for the year" indicates a current earnings statement. In contrast, if the statement stated "Earnings for the year 2009 were 2.5 million dollars, compared to earnings last year of 1.9 million dollars", the natural language processing method would disregard the "1.9 million dollars" as a current earnings statement because of the leading context.

After a document is blocked and elementized, it is then assigned to a recipient. For each recipient, the Action Markup Storage (e.g., such as in Table 19) is checked for "action markups" corresponding to any "elements" contained in the document. If any are found for the recipient and "element" in the document, the matching action markup records (e.g., such as in Table 20) are pulled from the Action Markup Storage. The "condition" of each action markup is then compared to the value of the "element." For example, if the condition is "LT_3.5 million", the PATH server software module 42 parses the "$3.5 million" and compares that value to the element's value. For example, if the "element" is less than 3.5 million (e.g., $3.1 million), then the "condition" is met and the action markup is stored for inclusion in the document. If the "condition" is not met, the action markup is discarded. After all of the "action markups" have been processed, the included ones are then parsed with action markup tags. For example:

| UserID | Company | Element | Condition | Action |
|---|---|---|---|---|
| 00012 | IBM | current_earnings | LT_350000 | Sell | becomes
<Action Element="current_earnings" Condition="LT_350,000" Message="Sell" />

After the tag has been generated, the IBlock containing the element "current_earnings" is located. The action markup tag is then inserted into the correct location following the IBlock.

The "transmission phase" of the SEB/PATH method may be modified from what is described above according to whether "Markup Method 1" or "Markup Method 2" was employed. For "Markup Method 1", the "action" tag is integral to the NIBlock and is transmitted as part of the NIBlock. This method permits different recipient to have different action markups or no action markups and they are sent the NIBlock with no Pacing or Handicapping as per the previous NIBlock method. This happens after the previous IBlock is SYNC'ed. For "Markup Method 2", the "action" is placed between the IBlock and the subsequent NIBlock. After SYNC'ing the IBlock, the action markup is transmitted only to users who desire to receive it, while other recipients wait. After the action markups have been SYNC'ed, the subsequent NIBlock is transmitted to everyone.

For PUSH/PULL recipients receiving press releases, client software that receives the press releases is customized in the following way. At the application level, after an "impactful data element" is received by an intended recipient, the action markup may be communicated to the intended recipient by, for example, a pop-up notification message, a changing of visual effects of part of the press release (e.g., turning the headline or element a particular color, indicating the "action"), or manipulating another program via an Application Programming Interface (API). Manipulating another program via an API may include, but is not limited to, automatically trading stocks via a trading platform, searching information about a company via a Web browser, or sending an email via an email client.

As discussed above, according to an embodiment of the present invention, a variation of "action markup" is known as "editorial markup." The trader markup may comprise an "element identifier" as discussed above for "action markup" and a "message." There are other optional attributes that may be associated with the editorial markup, including, but not limited to, user identification information, company information, and applicable date filters. The element identifier is a unique name indicating a verbal description such as "current_earnings" or a number reference. Elements throughout a document should be unique. If an element appears twice in a document, the editorial markup may be placed only once after the first instance of the element, or each instance may contain the trader markup. Typically, the element identifier of the editorial markup matches the name of the element tagged in the document, though the names are not required to match exactly.

The "message" associated with a editorial markup may comprise computer generated content or human edited content. Computer generated content may comprise IBlock content, as well as surrounding content before and after the IBlock. Human edited content may comprise an editor's opinion or facts about impactful content or insights into other relevant information. "Action markup" and "editorial markup" may herein be referred to collectively as "trader markup".

The trader markup may contain other information used by the PATH software, such as user identification information, company information, and date filters. Some attributes may be automatically created from the trader interface, such as the user identification information. The trader interface of FIG. 14 may be modified to include the additional attributes, which may also be employed to limit which documents being sent to a recipient will have the trader markup placed into it.

Since a document may have multiple IBlocks, the PATH software is not limited to placing a single trader markup in a document. A trader markup may be placed in a document for one or more impactful blocks. Similarly, there may be multiple trader markups for the same element, comprising multiple messages. For example, for an earnings statement element, a first trader markup may comprise surrounding context of an IBlock, and a second trader markup may comprise an editor's insight regarding the earnings statement.

A document must first be marked up, or elementized, to identify information that may provide action, such as, but not limited to, earnings statements, sales figures, etc. An element may be identified with tags which are placed directly into the document surrounding the element. This may happen before the document is parsed into SEBs, such as:

Company A's earnings were <earnings>1.5 million for fiscal year 2009</earnings>.

The above content may be parsed into SEBs, wherein the entire earnings element may be placed into an IBlock based on pattern matching, such as:

Company A's earnings were <IBlock><earnings>1.5 million for fiscal year 2009</earnings></IBlock>. Analysts had been looking for earnings...

The tag may also be combined as an attribute of an IBlock tag if the IBlock has been identified first via pattern matching.

After the blocks are tagged, the IBlocks may be searched for the target element and the IBlock tag can be modified to include an attribute, such as:

Company A's earnings were <IBlock type="earnings">1.5 million for fiscal year 2009</IBlock>. Analysts had been looking for earnings...

The editorial markup tag may be, but is not limited to, an XML style tag. The editorial markup tag may be any other style tag which may contain attributes, such as HTML. The attributes of the tag include, but are not limited to, the element identifier and action message attributes. An example of an XML style tag is:

<editorial element="earnings" message="earnings exceeded expectations" />

In the above example, the name of the tag is "editorial", the element identifier attribute is "earnings", and the editorial message attribute is "earnings exceeded expectations".

After an IBlock has been tagged as an element, the editorial markup may be placed into the document following the tagged IBlock. The trader markup may be placed at the beginning of the NIBlock following the tagged IBlock, as such:

Company A's earnings were <IBlock type="earnings">1.5 million for fiscal year 2009</IBlock><NIBlock><Editorial Element="earnings" Message="earnings exceeded expectations" />. Analysts had been looking for earnings...

A second markup method may include the editorial markup tags between the IBlock and following NIBlock, such as:

Company A's earnings were <IBlock type="earnings">1.5 million for fiscal year 2009</IBlock><Editorial Element="earnings" message="earnings exceeded expectations" /><NIBlock>. Analysts had been looking for earnings...

To enter trader markup into a document for transmission, a trader may set their trader markup preferences in the PATH software via a modified version of the trader interface described above. The trader interface may include, but is not limited to, a web interface that allows traders to authenticate their identity and enter one or more preferences for press releases. Alternatively, the trader may communicate their preferences to a help desk via phone, fax, or email to help desk staff, who then enters the preferences into the PATH software directly or through the trader interface. In another embodiment, trader markup preferences may alternatively be client software on the trader's machine that transmits preferences to the PATH software server.

After the user submits trader markup preferences information, the information may be placed into a database which may contain such preferences as, including, but not limited to, user and type of trader markup. An example database table employed in a trader markup may be, for example:

| Field Name | Field Type |
|---|---|
| UserID | integer |
| Message type | editorial |

A record stored in the database for a trader may be, for example:

| UserID | Company | Element | Condition | Action |
|---|---|---|---|---|
| 00012 | IBM | current_earnings | LT_350000 | Sell |

For processing a trader markup, when a press release is received, the system may parse the press release into SEBs and assign any IBlocks an element tag if it contains impactful information such as current_earnings. The IBlock is compared to a pattern matching algorithm with a natural language processing algorithms to determine the context of the IBlock. The natural language processing allows the PATH software to recognize the context around the IBlock. In the case where a document contains the statement, "Earnings for the year 2009 were 2.5 million dollars", the natural language processing would determine that the leading part of the statement "Earnings for the year" indicates a current_earnings statement. In contrast, if the statement continued and stated "Earnings for the year 2009 were 2.5 million dollars, compared to earnings last year of 1.9 million dollars", the natural language processing would disregard the "1.9 million dollars" as a current earnings statement because of the leading context.

After a document is blocked and elementized, it is then assigned to a recipient. For each recipient, trader markup storage may be checked for trader markup preferences corresponding to that recipient. If the recipient has preferences for a type of trader markup, then that type of trader markup is added for that recipient's document after each IBlock.

Client software which may receive a press release may be customized to handle trader markup. At the application level, after a trader markup is received, the client software may interpret the trader markup to do something programmatically. This may include, but is not limited to, popping up a notification message, changing the visual effects of part of the press release (e.g., turning a headline or element a particular color indicating the trader markup), or manipulating another program via an Application Programming Interface (API). Manipulating another program via an API may include, but is not limited to, automatically displaying information, searching information about a company via a web browser, or sending an email via an email client.

According to an embodiment of the present invention, a trader markup may be processed before transmission of a document, or it may be processed on the fly during transmission of the document. To process the trader markup before transmission, each IBlock with an element is searched for iteratively. When an IBlock is found, the trader markup is placed with the NIBlock following the IBlock, according to the description above. The system then searches for and processes the next IBlock with an element, continuing until the end of the document is reached. For processing trader markup on the fly, after an IBlock with an element is transmitted, the trader markup for that element is processed and inserted in the following NIBlock. This process is repeated after the transmission of each IBlock.

According to an embodiment of the present invention, a trader markup may be placed at the end of a document. When an IBlock is processed for trader markup, either iteratively or on the fly, the trader markup may be appended to the end of the document, before the last closing NIBlock tag. This method permits the transmission of the trader markup to be included in the last NIBlock. If the document ends with an IBlock, the trader markup tags are appended to the end of the IBlock, after the </IBlock> tag. The trader markup tags are then transmitted without pacing or handicapping, as for an NIBlock, after the IBlock is SYNC'ed.

According to an embodiment of the present invention, a second method for delivering trader markup messages to a recipient may be employed. The trader interface may also include alternative message transmission methods such as SMS text, email, twitter, or any other messaging service that the trader may subscribe to. When a trader markup is transmitted after an IBlock has been transmitted, the trader markup storage may be searched for alternative transmission preferences. If a trader has an alternative transmission method selected, the server sends the trader markup message to the recipient using the alternative transmission method provided that the transmission of the trader markup is performed after the IBlock has been delivered, so that all impactful data is still guaranteed to be received substantially simultaneously.

According to an embodiment of the present invention, an alternative formatting may be employed for transmission via SMS text, twitter, email, or any other push or pull transmission method. The alternative format comprises a simplified version of content surrounding an IBlock. For each IBlock generated, the preceding NIBlock is replaced with content related to the IBlock. For instance, if the content included:

GM's earnings for the 4$^{th}$ quarter of 2010 were $0.52 per share

According to the SEB method described above, the content would be parsed to appear as:

<NIBlock>GM's earnings for the 4$^{th}$ quarter of 2010 were </NIBlock><IBlock>$0.52 per share</IBlock>

The alternative format locates the IBlock and preceding NIBlock and simplifies them so that the resulting content may be something like:
<NIBlock>GM   4$^{th}$   quarter   earnings </NIBlock><IBlock>$0.52 share</IBlock>

This simplified format may either be computer generated or edited by a human.

According to an embodiment of the present invention, another variation of the above described SEB method may also be employed. Throughout the RegEx pattern matching method described above, the IBlock content can be removed from the content and stored in a table. A table to store IBlocks may look something like this:

| Block Location Reference | Block Content |
|---|---|
| 00001 | IBlock 1 Content |
| 00002 | IBlock 2 Content |

In place of the removed content, a tag would be inserted to hold the place of the IBlock content. A tag to hold the place of the content may comprise an XML style tag, such as <IBlockHolder Reference="00001" />, but is not limited to this format. Another method for marking the removed IBlock content, is to insert a padded content string to hold the exact length of the removed IBlock content. An example of this type of padded tag to insert would be <IBlockHolder Reference="00001">XXXXXXXXXXXXXXX</IBlockHolder>, where the number of X's is equal to the length of the string removed.

After the entire document has been traversed, NIBlock tags are placed before and after the entire content. The IBlock table is then used to generate IBlock tags, which will be appended to the end of the document. The generated IBlocks will be put together as such:

"<block type="I" reference="00001">IBlock Content 1</block><block type="I" reference="0002">IBlock Content 2</block>".

The generated string is then appended to the end of the content after the closing NIBlock tag, e.g., <block Type="NI"> Content with IBlock Planceholders</block><block type="I" Reference="00001">IBlock Content 1</block><block type="I" reference="0002">IBlock Content 2</block>".

An alternative method for generating the IBlock is to place them in one large IBlock containing all of the IBlock content. This would be accomplished as such:

<block type="I"><IBlockContent reference="00001">IBlock Content 1</IBlockContent><IBlockContent reference="00002">IBlock Content 2</IBlockContent></block>

Appended after the NIBlock, it would appear as such:

<block Type="NI"> Content with IBlock Planceholders</block><block type="I"><IBlockContent reference="00001">IBlock Content 1</IBlockContent><IBlockContent reference="00002">IBlock Content 2</IBlockContent></block>

Transmission of the Blocks would adhere to the previous methods, where the first large NIBlock is sent freely as a stream, or in 4 byte Units. The document is then SYNC'ed, and the one or more IBlocks are sent via the PATH algorithm, with SYNC'ing in between. Receipt of the IBlocks is guaranteed to be simultaneous for all intensive purposes, with no favorites or advantages.

On the receiving end, the client software is designed to piece together the document. Each time an IBlock is received, the reference number is searched in the document and the IBlock tag is inserted into the document. The placeholder tag can be removed also. For example, after an IBlock is removed, the received content may appear as such:

<block type="NI">IBM made <IBlockHolder Reference="00001" I> this month.</block>

The first IBlock received would appear similar to:
<block type="I" reference="00001" >$3,000,000</block>

The client software would begin searching the document for <IBlockPlaceHolder> tags. In this instance, it would find a match at index 26, with a length of 34. The reference number would then be compared to the current IBlock being searched for. If the reference numbers match, the matched content would then be deleted, and the IBlock would be inserted at index 26, resulting in:

```
<block type="NI">IBM made <block type="I" reference="00001">$3,000,000</block> this
   month.</block>
```

If the first IBlockPlaceHolder tag did not have a matching reference number, then the search would continue to the next one and so on until the reference number was found.

To include action markup in this scenario, the IBlock tag may be paired with an action markup, such as:
<action reference="0001" element="earnings" condition="LT 750,000" message="sell" />

The action markup would be included after the corresponding IBlock. During insertion into the content, both the IBlock and action tags may be inserted at the same time to generate:

```
<block type="NI">IBM made <block type="I"
   reference="00001">$3,000,000</block><action reference="0001" element="earnings"
   condition="LT 750,000" message="sell" /> this month.</block>
```

This would be repeated for each IBlock received.

In the case where multiple IBlockContent tags are placed in one IBlock and received at the same time, the document can be traversed once to locate each IBlockPlaceHolder tag. The reference number of each IBlockPlaceHolder tag is then compared to each IBlock that was received, and the current IBlockPlaceHolder tag is replaced with the matching IBlockContent tag.

A third markup method includes the Trader Markup at the end of the document, after the final IBlock or NIBlock. In such a case the element name would be unique for an IBlock, or a reference number may be used to link IBlocks to Trader Markup tags.

```
<block type="NI"/>IBM made <block type="I" reference="00001">$3,000,000</block>
   this month.</block><action reference="0001" element="earnings" condition="LT
   750,000" message="sell" />
Or
<block type="NI">IBM made <block type="I" type="earnings">$3,000,000</block> this
   month.</block><action reference="0001" element="earnings" condition="LT 750,000"
   message="sell" />
```

A fourth markup method includes the Trader Markup at the end of the document which has not been markup into blocks. Using this method, IBlocks are identified using the above method to locate elements such as earning, but the impactful content is not tagged. In such a case the element name would be unique for a document and included at the end of the unmarked document.

```
<HTML><body><p>IBM made $3,000,000 this month.</p></body></HTML><action
   element="earnings" condition="LT 750,000" message="sell" />
```

The document may be, but is not limited to, an HTML, XML, or plaintext document.

According to an embodiment of the present invention, the SEB method/PATH protocol is further applicable to facilitating the receipt of impactful information embedded within binary images or documents (collectively referred to herein as a "binary document"). The binary document may include, but are not limited to, a binary document of the following file types: GIF, JPEG, PNG, PDF, or any other binary format which cannot be edited with a text editor.

According to an embodiment of the present invention, to illustrate how the SEB method may be modified to transmit binary documents, one intended recipient may desire to receive an HTML, XML, or plaintext ASCII version of an original document, while one or more other intended recipients may desire to receive a binary version of the same document GIF, JPEG, PNG, PDF, etc., that would appear in their Web browser as plaintext. In the following example, it is assumed that the first intended recipient is to receive an ASCII document formatted in HTML, while other intended recipient receive a binary version of the same document.

Blocking in a modified "marking phase" of the SEB method is applied to an HTML, XML, or plaintext ASCII version of the original document. Assuming the first recipient desires to receive an ASCII HTML formatted document, an example HTML document may comprise the following:
<html><body>In the fourth quarter of 2010,<br>IBM earned 3.5 billion dollars.</body></html>

SEBs may be created in the HTML document according to one of the SEB method described above. The HTML document delimited by NIBlocks/IBlocks appears as follows:

```
<NIBlock><html><body> In the fourth quarter of 2010,<br>IBM earned
</NIBlock><IBlock>3.5 billion
dollars</IBlock><NIBlock>.</body></html></NIBlock>
```

This document will herein be called HTML Document 1.

After the IBlocks are delimited, additional pairs of tags may be inserted before and after the context of the IBlocks in HTML Document 1 to identify the IBlocks. These tags may be, but are not limited to, HTML or XML style tags depending on the document type, and are intended to highlight the content of an IBlock by changing one of its attributes, e.g., color, font type, font size, case, etc., such as the following tag pairs: <i> and </i>, <b> and </b>, and <span color="Red"> and </span>.

To insert <i> and </i> tags into the above document, the index of the <IBlock> tag is located and the length of "<IBlock>" is added to determine the insertion point. Thus, for:

```
<NIBlock><html><body> In the fourth quarter of 2010,<br>IBM earned
</NIBlock><IBlock>3.5 billion
dollars</IBlock><NIBlock>.</body></html></NIBlock>
```

The index of <IBlock> is 77, plus the length of "<IBlock>" is 8. As a result, the insertion point for the first tag in the pair, <i>, is at index 85, as follows:

```
<NIBlock><html><body> In the fourth quarter of 2010,<br>IBM earned
</NIBlock><IBlock><i>3.5 billion
dollars</IBlock><NIBlock>.</body></html></NIBlock>
```

To insert the second tag, the </IBlock> after the last insertion point is located. In the example above, the index of </IBlock> is at index 107. As a result, the </i> tag is inserted at index 107 as follows:

```
<NIBlock><html><body> In the fourth quarter of 2010,<br>IBM earned
</NIBlock><IBlock><i>3.5 billion
dollars</i></IBlock><NIBlock>.</body></html></NIBlock>
```

This document will herein be called HTML Document 2. According to an embodiment of the present invention, HTML Document 1 and HTML Document 2 are retained for image generation.

Image Generation is handled through a third party HTML to image generator, but may be created using other methods. HTML Document 1 and HTML Document 2 are used to generate two binary images, called Binary Document 1 and Binary Document 2, respectively. The binary documents appear the same as the HTML documents would appear after being rendered in a browser, as seen in the charts below:

| HTML Document 1 | HTML Document 1 rendered in a browser | Binary Document 1 |
|---|---|---|
| <NIBlock><html><body> In the fourth quarter of 2010,<br>IBM earned </NIBlock><IBlock><i>3.5 billion dollars</i></IBlock> <NIBlock>.</body> </html></NIBlock> | In the fourth quarter of 2010, IBM earned 3.5 billion dollars. | In the fourth quarter of 2010, IBM earned 3.5 billion dollars |

| HTML Document 2 | HTML Document 2 rendered in a browser | Binary Document 2 |
|---|---|---|
| <NIBlock><html><body> In the fourth quarter of 2010,<br>IBM earned </NIBlock><IBlock><i>3.5 billion dollars</i></IBlock> <NIBlock>.</body> </html></NIBlock> | In the fourth quarter of 2010, IBM earned 3.5 billion dollars. | In the fourth quarter of 2010, IBM earned 3.5 billion dollars |

In the charts above, a border has been placed around the rendered images to demonstrate the approximate size of the image. An actual generated image may not have a border and the margin around the text may be smaller than shown above.

The two binary documents are compared to locate the byte numbers of impactful data in Binary Document 1. By comparing the bytes of Binary Document 1 and Binary Document 2, the text which has been changed by the tags may be identified and located, e.g., what is rendered in italics.

In the example above, if both Binary Document 1 and Binary Document 2 are in GIF format, the binary of the two images comprise many sections that are similar, and differences appear where the content of the two images are different, i.e., where the text is italics in one document and not in the other.

By comparing the binary data of the two resulting images, byte locations of changes between Binary Document 1 and Binary Document 2 (i.e., the text in italics) may be calculated to determine which corresponding bytes in the original binary document contain the same text.

For example, if Binary Document 1 and Binary Document 2 are 100 bytes in length, and the bytes in Binary Document 1 differ from Binary Document 2 at bytes 60-79, then the text of the IBlock is located at bytes 60-79 in Binary Document 1.

After the IBlock byte locations have been determined, Binary Document 1 may be transmitted via the PATH protocol along with the HTML document 1. In the example above, the first NIBlock is at byte locations 0-59, the IBlock is at byte locations 60-79 based on the byte calculation described above, and the last NIBlock is at remaining byte locations 80-99.

The table below shows blocks for transmitting HTML Document 1 and Binary Document 1, substantially simultaneously while complying with Reg FD.

| Block Type | HTML Document 1 | Binary Document 1 |
|---|---|---|
| NIBlock | <NIBlock><html><body> In the fourth quarter of 2010,<br> IBM earned </NIBlock> | 0-59 |
| IBlock | <IBlock>3.5 billion dollars</IBlock> | 60-79 |
| NIBlock | <NIBlock>. </body> </html></NIBlock> | 80-99 |

Transmission of the documents proceeds as follows. For all recipients, the first NIBlock of their assigned document version is transmitted. According to PATH, the transmission is then SYNC'd for all recipients to ensure receipt of the transmission. After confirmation of receipt, the PATH protocol is then applied to transmitting the IBlocks of each document to the corresponding recipients.

The documents may be broken into 4 byte U's, as follows:

| U Number | HTML Document 1 Character Content | Binary Document 1 Byte Content |
|---|---|---|
| 1 | <IBl | 60-63 |
| 2 | ock> | 64-67 |
| 3 | 3.5 | 68-71 |
| 4 | bill | 72-75 |
| 5 | ion | 76-79 |
| 6 | doll | |
| 7 | ars< | |
| 8 | /IBl | |
| 9 | ock> | |

The U's are then paced and handicapped according to half-RTT times calculated after receiving acknowledgment packets during the transmission of the first NIBlocks of each document according to the PATH protocol described above. After the last U is sent, the recipients are SYNC'ed to ensure all recipients receive the IBlock content. The final NIBlock data is transmitted to each recipient to complete the transmission.

To further exemplify the binary comparison, FIGS. 15A-15D include binary data of two GIF images, one with all black content, and one with black and red content, respectively. Within FIGS. 15A-15D, the following two segments from the end of the binary are compared to determine differences in the bytes:

| From 15A and 15B: | | | | | | | | | | | | | | | | |
|---|---|---|---|---|---|---|---|---|---|---|---|---|---|---|---|---|
| 00000310 | 01 | 00 | 00 | 10 | 00 | 2C | 00 | 00 | 00 | 00 | 02 | 00 | 01 | 00 | 00 | 08 |
| 00000320 | 05 | 00 | 51 | A0 | 08 | 08 | 00 | 3B | | | | | | | | |
| From 15C and 15D: | | | | | | | | | | | | | | | | |
| 00000300 | 33 | FF | FF | 66 | FF | FF | 99 | FF | FF | CC | FF | FF | FF | 2C | 00 | 00 |
| 00000310 | 00 | 00 | 02 | 00 | 01 | 00 | 00 | 08 | 05 | 00 | 01 | 24 | 08 | 08 | 00 | 3B |

Figure 15A:
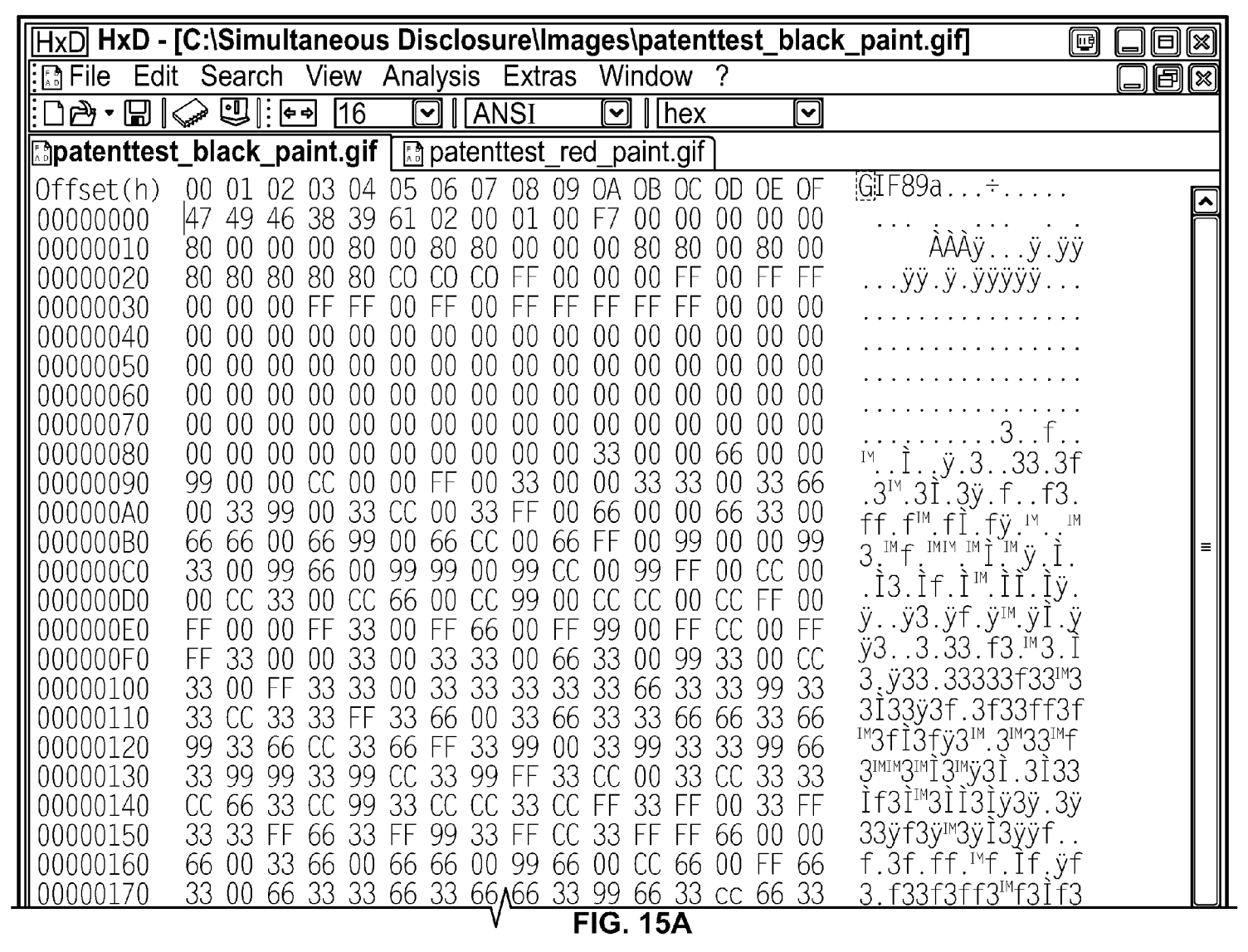
Figure 15B:
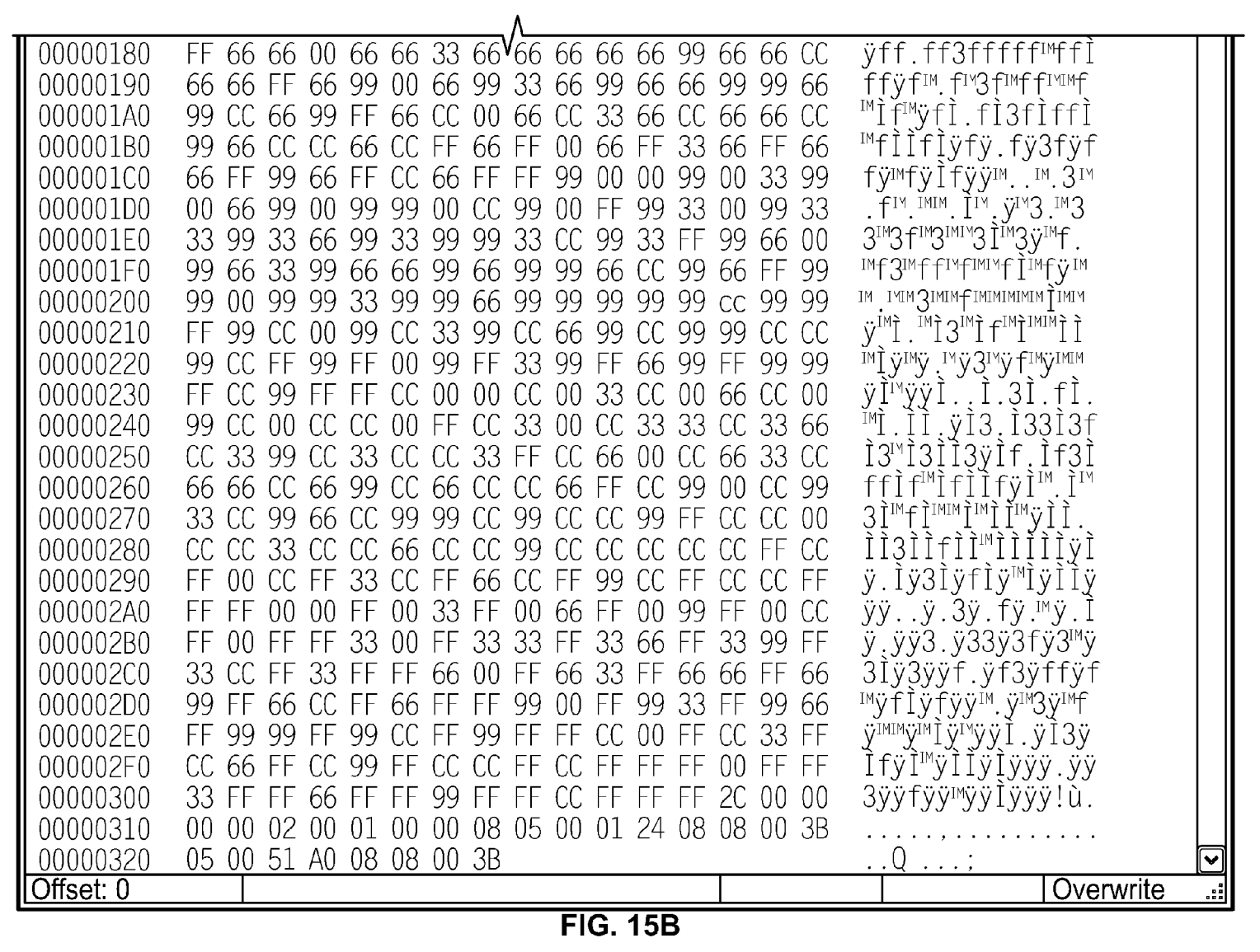
Figure 15C:
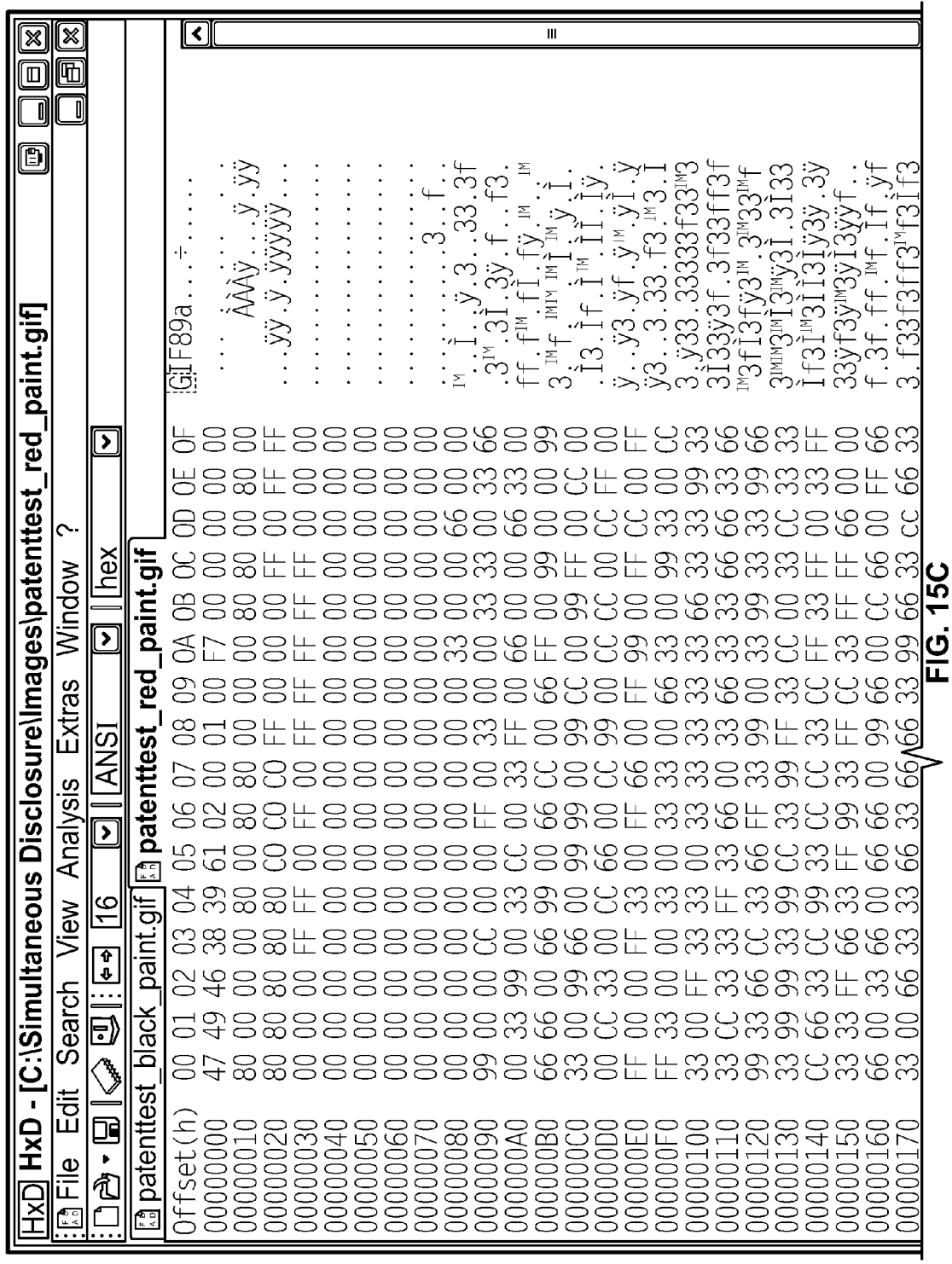
Figure 15D:
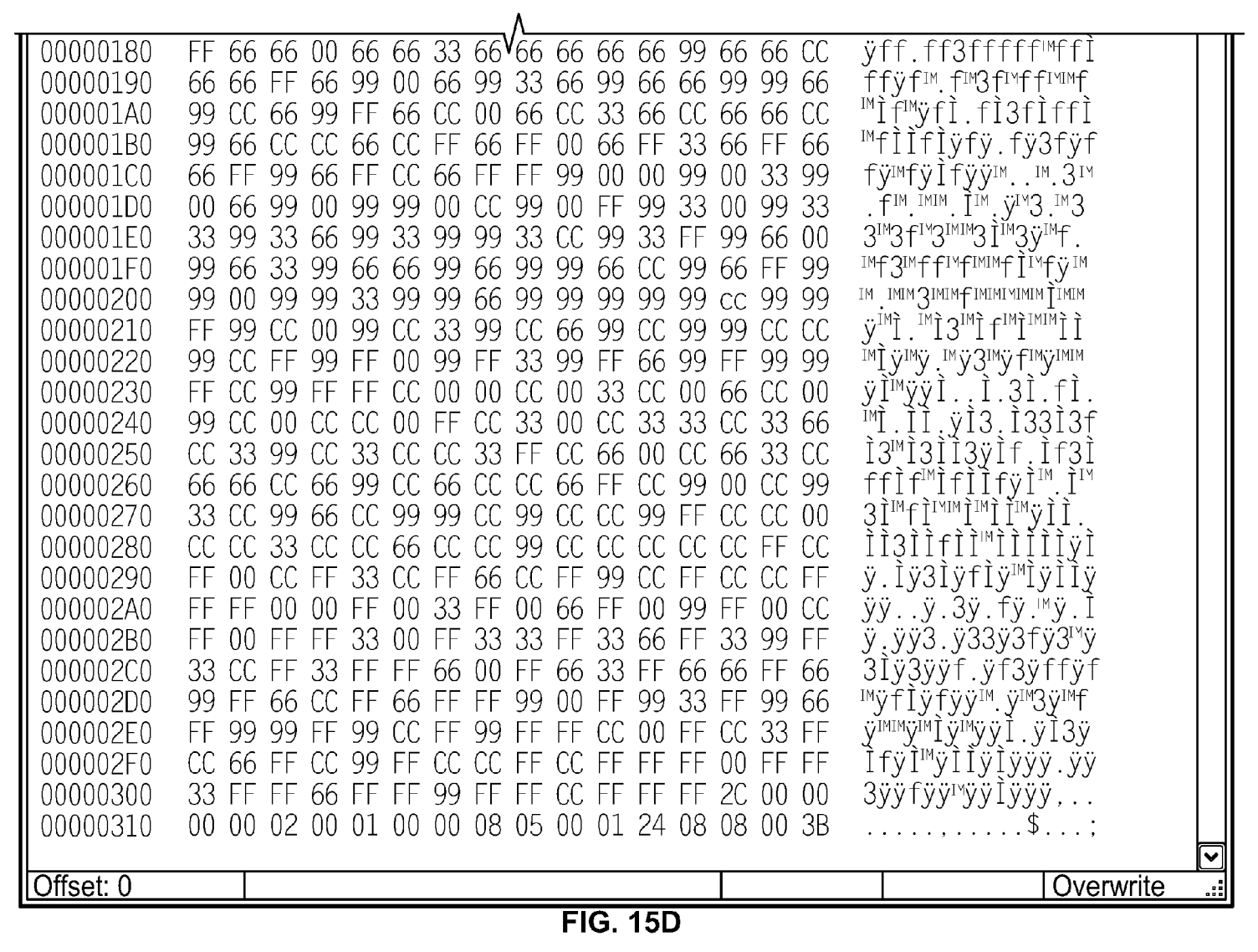

Looking at specific bytes in these segments, the following five bytes in FIGS. 15A and 15B are the data: "00 51 A0 08 08", and the following five bytes in FIGS. 15C and 15D are the data "00 01 24 08 08". In comparing these two byte segments, the bytes "51 A0" in FIGS. 15A and 15B are determined to be different from the bytes "01 24" in FIGS. 15C and 15D.

The byte locations of "51 A0" in the document corresponding to FIGS. 15A and 15B are located at decimal byte numbers 770 and 771 (hexadecimal by numbers 322 and 323, respectively). The location of the IBlock is at bytes 770 and 771 in the corresponding image. As a result, the number of bytes to transmit for the NIBlocks and IBlocks may be determined, as shown in the table below:

| Block Type | Binary Document Bytes |
|---|---|
| NIBlock | 0-769 |
| IBlock | 770-771 |
| NIBlock | 772-775 |

If the first document intended for the first recipient were formatted in plaintext instead of HTML, the SEB "marking" and "transmission" phases would be applied as previously described hereinabove, but a second version of the first plaintext document would be generated in rich text format (RTF) to permit the insertion of highlighted text via metadata, rather than tags. The metadata at the beginning of the content includes, for example, color/highlighting/italics information as well as the location of the text to be highlighted. In such circumstances, the tag insertion method is bypassed and an analogous metadata modification method is implemented.

If the first document intended for the first recipient were formatted in a version of binary plaintext or binary plaintext with tags (e.g., HTML, XML, etc.) instead of plaintext HTML, the binary text document is first converted to ASCII plaintext via optical character recognition, and then the SEB "marking" and "transmission" method just described for an ASCII plaintext document with RTF would be applied.

Embodiments of the method for transmitting binary-formatted documents are not strictly limited to text, but may be applicable to any binary image containing impactful information. For example, still images or video containing pixels that may be impactful to a trader may be formatted and transmitted by pacing and handicapping the entire binary image for transmission if the entire image is impactful, or a particular part of the image may be identified as impactful. In the latter case, an identification method may be applied to the image such as facial recognition, color location, or any other method for locating content within an image. Once the location of impactful content is identified and the bytes are located, the document is transmitted according to the PATH protocol.

In another embodiment of combining multiple simultaneous disclosure groups, trader markup, and individual groups containing a laggard, the following steps may be applied: 1) applying the PATH algorithm for distributing documents to the first simultaneous group, 2) moving laggards to the next simultaneous group or to the individuals group, 3) sending trader markup freely to subscribers after the simultaneous group has finished sync'ing immediately or after a specified time has passed, 4) repeating steps 1-3 for each simultaneous group after the previous action markup or simultaneous group has completed, and 5) transmitting to individuals and laggards that are not in the simultaneous group after the last simultaneous group or action markup subscribers have completed, either immediately or after a specified time has passed.

In another embodiment of Action Markup and PATH, a notification document to be transmitted via PATH to a Web server may be employed as a trigger mechanism for the Web server to activate or enable a Web page containing a source document (e.g., a press release) to be made available to one or more intended recipients. In such circumstances, the Web server may have installed and be running a software package that is configured to receive documents. To effect simultaneous receipt of the notification document along with a simultaneous group of intended recipients, the Web server may be included in the simultaneous group that employs the PATH protocol described previously. In certain embodiments of the trigger mechanism, a software module that is to receive the notification document may be located on another server distinct from the Web server that is configured to communicate with the Web Server or is operable to make the source document available through another method to be described hereinbelow.

Notice Exact Access Timing (NEAT)

As used herein, the term Notice Exact Access Timing (NEAT) refers to a method of including a Web server in a simultaneous group employing PATH, such that the Web server receives a notification document substantially simultaneously with all of the intended recipients in the simultaneous disclosure group (who may be receiving the notification or the source document). The notification document sent to the Web server acts a trigger for the Web server to display a source document on a Web page, and the notification document sent to a selection of other intended recipients in the simultaneous disclosure group includes a hyperlink linking to that Web page. By employing the PATH protocol in transmitting the notification document, the Web page containing the source document is posted on the Web server and the other recipients receive the hyperlink substantially simultaneously.

The Notification Document

According to an embodiment of the present invention, a notification document including a hyperlink linking to a source document may include, but is not limited to, the following:

"Company A Press Release

The press release can be viewed at www.CompanyA.com/PressRelease.html"

In such circumstances, the hyperlink is operable to link to a Web page located on the same Web server included in the simultaneous disclosure group. As a result, the Web server may receive a notification document (which may take one of many forms to be described hereinbelow, and which may or may not take the same form as a notification document sent to other intended recipients) substantially simultaneously as the notification document received by a selection of the rest of the intended recipients of the simultaneous disclosure group. As a result, the Web server may post a Web page containing a source document (i.e., the press release) at substantially the same time that the other recipients receive the link (i.e., the notification document).

According to an embodiment of the present invention, the notification document sent to the Web server may take the form of an HTML document that includes a source document linked to in the notification document sent to the other intended recipients. In such circumstances, the Web server may receive the source document and copy or move it to a directory recognized by the Web server to make it available to the other intended recipients. The HTML document may or may not include an action markup appended to the end of source document, after the HTML content. If included, the action markup may be used to specify special directions to the Web server, such as date and time to release the source document, or it may reiterate that the source document is a trigger and it needs to be posted for the other intended recipients to access. A non-limiting example of such an action markup is listed as follows:

"<html>HTML Content</html><Action Element="notice" Message="access" />"

In another embodiment of NEAT, the Web server may already have access to a stored source document that needs to be posted. In such circumstances, a notification document is sent to the Web server which need not include a source document. The notification document may simply be a message identifying the stored source document, or even the same URL link sent to the rest of the simultaneous disclosure group. A non-limiting example of a notification document may include the following:

"<ReleaseDoc name="DocumentName" />"

In circumstances in which a tag is used, the Web server is expecting a specific tag to identify the stored source document and release it. The Web server may parse the notification document to extract the stored source document name or a Web page address, and unlock or release the stored source document for access from a Web browser. The tag may include optional attributes such as a date and time stamp indicating a time to release the stored source document by the Web server.

Source Document Release

On the Web server, software modules such as, but not limited to, Apache HTTP Server, Internet Information Services (IIS), Lighttpd, Nginx, Documentum, SharePoint, and Alfresco are designed to serve Web pages and documents using HTTP to requesting Web browsers. Most Web server software packages and content or document management systems provide a mechanism to lock documents present on the Web server and prevent the locked documents from being viewed by requesting Web browsers. The Web server may have file system directories which are not available to the Web server software, or a lock file may be located in the same file system directory as the Web page. The Web server software may also be configured to block a particular file or directory from being available to requesting Web browsers.

Because there are several methods available in the art for Web server software to prevent a document from unauthorized access, such methods may be employed to enable access to a source document that has been locked. File and directory locking methods vary between Web servers, a few of which are described hereinbelow for illustrative purposes. Many of these mechanisms may be described as server side scripting or processing and atomic file operations.

If the source document is received by the Web server via a notification document and via receiving software located on the Web server, the source document may be moved into a file system directory that is recognized by the Web server software. The Web server may execute a move or copy command to place the source document in a Web server directory, permitting it to be available to an external Web browser. If the receiving software is located on another server, the source document may be transmitted to the Web server via any suitable file transmission method, including, but not limited to, SCP, FTP, or socket streaming and placed in a server directory. A directory containing the source document may be moved under a directory used by the Web server to render the source document available.

In one embodiment, a Web server may already include the source document stored thereon and may be waiting for a release notification. In such circumstances, the source document may be unlocked by removing a file lock from a directory where the source document is located, such as, but not limited to, an .htaccess file. Removing the file lock permits the Web server to make documents in the same directory available to requesting Web browsers. In another embodiment, the Web server, having an unlocked copy of the source document, may employ a move or copy command to place the source document in a Web server directory when the trigger is received.

In an advanced method for unlocking content, a Web page may be available before the release of the source document, but the Web page may employ a scripting language, such as PHP or Javascript, or other Web programming language, to request the source document from another source, such as a database or other content feeder. In such circumstances, when the Web server or another server receives the trigger, an unlock flag field is set in the database corresponding to the source document.

When a request is made for a source document from an external Web browser, the Web server requests the content (i.e., the source document) from its database or other content source to display the source document on the requesting Web page. If the source document is requested before the trigger has been received and the unlock flag is set, the external Web browser receives an unavailable message. When the unlock flag is set, the external Web browsers is permitted to view the source document. This method also works in circumstances where the source document is received when employing PATH protocol and is loaded into the database and the unlock flag is set immediately. Scripting software within a requesting Web page may already contain the source document, but does not display the source document unless a configuration file or other locking mechanism is found on the Web server to enable the source document to be displayed.

In an embodiment, another method for unlocking a source document is via a Web server that permits requests to an external Web page but withholds the transmission of the source document over the requesting connection or channel until such time that a Web server process receives a signal to release the requested source document. The Web server may return ephemeral content to the Web browser specifying a refresh period until the source document is available. External Web browsers requesting the source document will not view any content until the Web browser discontinues returning refreshes, such as a meta-refresh, and returns the requested source document.

In an embodiment, the Web server may be unlocked when the receiving software starts the Web server software if it was not running, or the Web server may enable itself at a specified time.

A person skilled in the art would appreciate that there are numerous methods by which the source document may be make available on a Web server, with each Web server software package operable to release a source document after receiving the source document or a trigger through Action Markup and PATH.

When a trigger includes a date and time attribute, the receiving software may wait until a specified time to execute any of the above unlocking methods. Other attributes may affect the execution of the above unlocking methods.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method, comprising:
   determining, by a computing device, impactful content in transmittable content;
   assigning, by the computing device, the impactful content in the transmittable content to one or more impactful block units, each impactful block unit comprising a determined numbers of characters;
   extracting, by the computing device, the one or more impactful block units from the transmittable content;
   placing, by the computing device, the one or more impactful block units at the end of the transmittable content; and
   transmitting, by the computing device, the transmittable content to a plurality of intended recipients, each character, or a small packet set of sequential characters, of the determined number of characters of the one or more impactful block units transmitted using a time delay for a particular intended recipient and a pacing method, the one or more impactful block units to be received substantially simultaneously by the plurality of intended recipients;
   wherein the time delay for the particular intended recipient is set to the difference between ½ of a longest round trip time among all of the intended recipients and ½ the round trip time of the particular intended recipient.

2. The method of claim 1, further comprising grouping the one or more impactful block units into a single impactful block before said transmitting the transmittable content.

3. The method of claim 1, further comprising filling the former locations of one or more impactful block units in the transmittable content with corresponding one or more placeholders.

4. The method of claim 3, wherein the one or more placeholders are one or more reference tags indicating a particular impactful block, wherein the impactful block comprises at least one of the one or more consecutive impactful block units.

5. The method of claim 3, further comprising filing the one or more placeholders with one or more padded content strings to hold the exact length of an impactful block comprising at least one of the one or more consecutive impactful block units.

6. The method of claim 3, wherein the one or more placeholders are configured to cause an intended recipient computing device to remove each of the one or more placeholders and place corresponding ones of the one or more impactful block units to their former locations in the transmittable content.

7. The method of claim 1, wherein impactful content refers to any portion of the transmittable content that impacts a financial-related action.

8. The method of claim 1, further comprising:
   assigning, by the computing device, the remainder of the transmittable content to one or more non-impactful block units, each non-impactful block unit comprising the determined numbers of characters.

9. The method of claim 8, wherein each character of the determined number of characters of the one or more non-impactful block units are transmitted without the time delay for a particular intended recipient and the pacing method.

10. The method of claim 1, wherein the pacing method comprises commencement of transmission of the one or more impactful block units over a pacing time interval to ensure an evenly-distributed flow of bytes across a plurality of receivers.

11. The method of claim 10, wherein the pacing time interval is equal to a reciprocal of a longest total transmission time taken for each intended recipient to receive the impactful block unit divided by each recipient's number of bytes in an impactful block unit.

12. The method of claim 1, further comprising synchronizing connections for each of the intended recipients.

13. The method of claim 1, wherein an impactful block unit comprises one or more sub block units, wherein synchronizing connections comprises waiting until all acknowledgement packets corresponding to a last transmitted sub block unit transmitted to each of the plurality of intended recipients has been received before transmitting a next sub block unit to each of the plurality of intended recipients.

14. A non-transitory computer-readable storage medium carrying one or more sequences of instructions that, when accessed by a computing device, causes the computing device to perform operations comprising:
   determining, by the computing device, impactful content in transmittable content;
   assigning, by the computing device, the impactful content in the transmittable content to one or more impactful block units, each impactful block unit comprising a determined numbers of characters;
   extracting, by the computing device, the one or more impactful block units from the transmittable content;
   placing, by the computing device, the one or more impactful block units at the end of the transmittable content; and
   transmitting, by the computing device, the transmittable content to a plurality of intended recipients, each character, or a small packet set of sequential characters, of the determined number of characters of the one or more impactful block units transmitted using a time delay for a particular intended recipient and a pacing method, the one or more impactful block units to be received substantially simultaneously by the plurality of intended recipients;
   wherein the time delay for the particular intended recipient is set to the difference between ½ of a longest round trip time among all of the intended recipients and ½ the round trip time of the particular intended recipient.

15. The non-transitory computer-readable storage medium of claim 14, further comprising grouping the one or more impactful block units into a single impactful block before said transmitting the transmittable content.

16. The non-transitory computer-readable storage medium of claim 14, further comprising filling the former locations of one or more impactful block units in the transmittable content with corresponding one or more placeholders.

17. A system, comprising:
   a memory;
   a computing device, operatively coupled to the memory, the computing device to:
      determine impactful content in transmittable content;
      assign the impactful content in the transmittable content to one or more impactful block units, each impactful block unit comprising a determined numbers of characters;
      extract the one or more impactful block units from the transmittable content;
      placing, by the computing device, the one or more impactful block units at the end of the transmittable content; and
      transmit the transmittable content to a plurality of intended recipients, each character, or a small packet set of sequential characters, of the determined number of characters of the one or more impactful block units transmitted using a time delay for a particular intended recipient and a pacing method, the one or more impactful block units to be received substantially simultaneously by the plurality of intended recipients;
      wherein the time delay for the particular intended recipient is set to the difference between ½ of a longest round trip time among all of the intended recipients and ½ the round trip time of the particular intended recipient.

18. The system of claim 17, further comprising grouping the one or more impactful block units into a single impactful block before said transmitting the transmittable content.

19. The system of claim 17, further comprising filling the former locations of one or more impactful block units in the transmittable content with corresponding one or more placeholders.

* * * * *